(12) United States Patent
Saito

(10) Patent No.: US 7,970,227 B2
(45) Date of Patent: Jun. 28, 2011

(54) IMAGE PROCESSING APPARATUS, IMAGE PROCESSING METHOD, AND COMPUTER PROGRAM

(75) Inventor: Yasushi Saito, Saito (JP)

(73) Assignee: Sony Corporation, Tokyo (JP)

( * ) Notice: Subject to any disclaimer, the term of this patent is extended or adjusted under 35 U.S.C. 154(b) by 1006 days.

(21) Appl. No.: 11/778,939

(22) Filed: Jul. 17, 2007

(65) Prior Publication Data

US 2008/0107358 A1     May 8, 2008

(30) Foreign Application Priority Data

Jul. 21, 2006    (JP) ................................ 2006-199926

(51) Int. Cl.
*G06K 9/40*     (2006.01)
(52) U.S. Cl. ........................................ 382/254; 348/607
(58) Field of Classification Search .................. 382/100, 382/162, 167, 256, 257, 254, 255; 348/606–624; 358/1.9–3.31
See application file for complete search history.

(56) References Cited

U.S. PATENT DOCUMENTS

| | | | | |
|---|---|---|---|---|
| 5,991,464 A | * | 11/1999 | Hsu et al. | 382/300 |
| 6,636,629 B1 | * | 10/2003 | Sasai | 382/167 |
| 6,654,492 B1 | * | 11/2003 | Sasai | 382/162 |
| 6,744,916 B1 | * | 6/2004 | Takahashi | 382/162 |
| 7,362,897 B2 | * | 4/2008 | Ishiga | 382/167 |
| 7,486,318 B2 | | 2/2009 | Ohki | |
| 7,554,583 B2 | * | 6/2009 | Kuno et al. | 348/241 |
| 2005/0201616 A1 | * | 9/2005 | Malvar et al. | 382/167 |

FOREIGN PATENT DOCUMENTS

| | | |
|---|---|---|
| JP | 2005-012660 | 1/2005 |
| JP | 2005-038396 | 2/2005 |

* cited by examiner

*Primary Examiner* — Anand Bhatnagar
(74) *Attorney, Agent, or Firm* — Finnegan, Henderson, Farabow, Garrett & Dunner, L.L.P.

(57) ABSTRACT

An image processing apparatus that generates one output image front plural input images includes a detecting unit that detects a positional relation among the plural input images, a pixel-value calculating unit that calculates a pixel value of a pixel of the output image using pixel values of pixels of the input images and an interpolation function, a determining unit that determines whether the pixel of the output image is a motion pixel, and an adjusting unit that adjusts a high-pass characteristic of the interpolation function on the basis of a result of the determination on whether the pixel of the output, image is a motion pixel.

10 Claims, 31 Drawing Sheets

IMAGE PROCESSING APPARATUS, IMAGE PROCESSING METHOD, AND COMPUTER PROGRAM

CROSS-REFERENCES TO RELATED APPLICATIONS

The present invention contains subject matter related to Japanese Patent Application JP 2006-199926 filed in the Japanese Patent Office on Jul. 21, 2006, the entire contents of which being incorporated herein by reference.

BACKGROUND OF THE INVENTION

1. Field of the Invention

The present invention relates to an image processing apparatus, an image processing method, and a computer program. More particularly, the present invention relates to an image processing apparatus, an image processing method, and a computer program that make it possible to reduce, when one output image is generated in a digital still camera or the like by interpolation performed by using plural input images, unnaturalness of the output image caused by a moving object, which is a moving subject, in an input image.

2. Description of the Related Art

For example, when a user photographs an image with a digital still camera or the like held by the hand, if an exposure time inevitably becomes long because an amount of light is insufficient, an image photographed by the digital still camera may be blurred because of hand shake. In order to prevent such a blurred image from being formed, there is a method of obtaining an image without a blur by, so to speak, superimposing plural dark images photographed with an exposure time short enough for preventing the image from being affected by hand shake (see, for example, JP-A-2005-38396).

In the method disclosed in JP-A-2005-38396, plural times of photographing are temporally continuously performed by a digital still camera to obtain temporally continuous plural photographed images as plural input images. With one of the plural photographed images set as a reference image, overall movements of the respective plural photographed images with respect to the reference image are calculated. Positioning of the plural photographed images is performed on the basis of the movements. One image (an output image) is obtained by superimposing (combining) the plural photographed images after the positioning.

FIG. 1 shows a method of obtaining an output image in the case in which there are two photographed images.

In FIG. 1, two photographed images $P_1$ and $P_2$ are photographed images continuously photographed by a digital still camera. In the photographed images $P_1$ and $P_2$, positions of subjects deviate from each other because of hand shake or the like.

When, for example, the photographed image of the two photographed images $P_1$ and $P_2$ is set as a reference image, movements of the respective photographed images $P_1$ and $P_2$ with respect to the reference image are calculated. Positioning of the photographed images $P_1$ and $P_2$ is performed on the basis of the movements to superimpose the subjects in the two photographed images $P_1$ and $P_2$. An output image $P_{out}$ is obtained by superimposing the photographed images and $P_1$ and $P_2$ after the positioning.

In this case, the plural photographed images are photographed with a short exposure time. However, the plural photographed images may be photographed with proper exposure. When the plural photographed images are photographed with the proper exposure and superimposed as described above, it is possible to obtain an output image with a nigh S/N (signal to Noise ratio).

When the plural photographed images are superimposed to obtain one output image as described, above, a moving object, which is a moving subject, may be in the plural photographed images.

When the moving object as the moving subject appears in the plural photographed, images, if a difference between a pixel value of a moving object portion and a pixel value of a background portion seen off and on according to the movement of the moving object is large, granularity noise called zipper noise and false colors may appear in an output image. As a result, the output image may be an unnatural image. The background (portion) means a portion other than the portion where the moving object appears.

FIG. 2 shows an output image obtained by superimposing plural photographed images.

The plural photographed images used for obtaining the output image in FIG. 2 are photographed image obtained by continuously photographing a scene of a running car on a road plural times at fixed time intervals. The moving car appears in the output image in FIG. 2 at fixed intervals.

FIG. 3 shows an enlarged image obtained by enlarging a part of the output image in FIG. 2.

In the enlarged image in FIG. 3, zipper noise appears particularly conspicuously near edges.

The zipper noise (and the false colors) appears in the output image obtained, by superimposing the plural photographed images including the moving object as described above because of a principle described below.

When the positioning of the plural photographed images is performed and the plural photographed images after the positioning are superimposed, to generate one output image as described above, positions of pixels of the plural photographed images after the positioning do not always coincide with positions of pixels of the output image.

Therefore, if a pixel for which a pixel value is calculated among the pixels of the output image is referred to as pixel of interest, superimposition of the plural photographed images after the positioning is performed by interpolating the pixel value of the pixel of interest using, among the pixels of the plural photographed images (herein after also referred to as photographed pixels as appropriate) after the positioning, pixel values of photographed pixels in positions near the position of the pixel of interest.

Examples of a method of the interpolation of the pixel value of the pixel of interest include a method of performing a simple addition for directly adding up pixel values of one or more photographed pixels in positions near the position of the pixel of interest and a method of performing interpolation using pixel values of one or more photographed pixels in positions near the position of the pixel of interest and an interpolation function.

The interpolation function is a function that changes according to a relative position of the photographed pixel used for the interpolation with respect to the pixel of interest of (a distance between the pixel used for the interpolation and the pixel of interest). For example, a linear function represented by a primary expression, a cubic function, and the like are used. The simple addition is equivalent to using a function with a value of 1 as the interpolation function regardless of the (relative) position of the photographed pixel used for the interpolation.

When it is assumed that, for example, an imaging element of the Bayer array is adopted as an imaging element of the digital still camera used for photographing of plural photographed images, respective pixels of a photographed image obtained from the imaging element has pixel values shown in FIG. 4.

FIG. 4 shows a photographed image obtained from the imaging element of the Bayer array (herein after also referred to as Bayer image as appropriate).

In the Bayer image, the respective pixels have one color signal (color component) among an R (Red) signal, a G (Green) signal, and a B (Blue) signal as a pixel value. A certain pixel and pixels adjacent to the pixel in the four directions, above and below and the left and right, have different color signals as pixel, values.

Here, it is assumed that two Bayer images are used as plural photographed images to generate an output image. Moreover, it is assumed that, as a result of performing positioning of the two photographed images as the Bayer images, pixels of one of the two photographed images after the positioning are in positions deviating by one pixel in the horizontal (left to right) direction and deviating by one pixel in the vertical (up to down) direction with respect to pixels of the other photographed image.

Moreover, it is assumed that, for example, a linear function represented by Equation (1) is adopted as an interpolation function.

$$f(z) = \begin{cases} az + 1 & (-a < z \leq 0) \\ -az + 1 & (0 \leq z < a) \\ 0 & (a \leq |z|) \end{cases} \quad (1)$$

In Equation (1), "z" indicates a position in the horizontal direction or the vertical direction of a photographed pixel with the position of the pixel of interest set as a reference (an x coordinate or a y coordinate of the photographed pixel in an xy coordinate system with the position of the pixel of interest set as an origin).

In Equation (1), "a" is a constant satisfying an expression $0 < a$. As the constant "a", for example, an appropriate value is used out of values in a range satisfying an expression $0 < a \leq 2$. Here, in order to simplify the explanation, it is assumed that the constant "a" is 1.

FIGS. 5 and 6 show pixel values of pixels on one line after the positioning of the two photographed images as the Bayer images and pixel values of pixels of the two photographed images after the positioning and pixels of an output image generated by interpolation performed by using an interpolation function f(z) represented by Equation (1).

A first figure from the top of FIG. 5 shows pixel values of pixels of a first photographed image $P_1$ among the two photographed images after the positioning. A second figure from the top of FIG. 5 shows pixel values of pixels of a second photographed image $P_2$.

As described above, pixels of one photographed image of the two photographed images $P_1$ and $P_2$ after the positioning are in positions deviating by one pixel in the horizontal and the vertical directions, respectively, with respect to pixels of the other photographed image. Therefore, in FIG. 5, positions of the pixels of the second photographed image $P_2$ after the positioning deviate by one pixel with respect to positions of the pixels of the first photographed image $P_1$ after the positioning.

In FIGS. 5 and 6, for example, only the G signals among the three color signals of P., G, and B signals are shown as the pixel values. Pixels having the G signals among the pixels of the two photographed, images $P_1$ and $P_2$ as the Bayer images are herein after referred to as G pixels as appropriate.

As shown in FIG. 4, the G pixels appear every other pixel in one line of the Bayer image. The positions of the pixels of the second photographed image $P_2$ after the positioning deviate by one pixel with respect to the positions of the pixels of the first photographed image $P_1$ after the positioning. Therefore, in the first and second figure from the top of FIG. 5, the G pixels are arranged every other pixel. Positions of the G pixels in the second figure from the top of FIG. 5 deviate by one pixel with respect to the G pixels in the first figure from the top of FIG. 5.

A third figure from the top of FIG. 5 shows pixel values of an output image $P_{out}$ generated by interpolation performed by using the two photographed images $P_1$ and $P_2$ after the positioning and the interpolation function f(z) of Equation (1).

When a subject in the two photographed images $P_1$ and $P_2$ is not moving, the identical subject appears in the G pixels of the photographed image $P_1$ after the positioning and the G pixels of the photographed image $P_2$ after the positioning close to the G pixels. Thus, pixel values (G signals) of the G pixels of the photographed image $P_1$ after the positioning and the G pixels of the photographed image $P_2$ after the positioning take substantially the same values.

When attention is paid to only pixels on one line shown in FIG. 5 in the two photographed images $P_1$ and $P_2$, as described above, the constant "a" of the interpolation function f(z) of Equation (1) is 1. Thus, a photographed pixel used for interpolation of the G signal of the pixel of interest using such an interpolation function f(z) is a G pixel in a range of a horizontal direction distance of 1 or less from the position of the pixel of interest, i.e., one G pixel in a position nearest from the pixel of interest among the G pixels of the two photographed images $P_1$ and $P_2$ after the positioning.

As described above, the photographed pixel used for the interpolation of the G signal of the pixel of interest is only one G pixel in the position nearest from the pixel of interest among the G pixels of the two photographed images $P_1$ and $P_2$ after the positioning. However, in FIG. 5, the G signals of the G pixels of the photographed image after the positioning and the G signals of the G pixels of the photographed image $P_2$ after the positioning near pixels in a local small area "r" of the output image $P_{out}$ take substantially the same values.

Therefore, interpolation for generating (obtaining) G signals of plural pixels in the local small area "r" of the output image $P_{out}$ is performed, for any one of the plural pixels, using the G signals of substantially the same values among the G pixels of the photographed images $P_1$ and $P_2$ after the positioning. Thus, as shown in the third figure from the top of FIG. 5, all the G signals of the plural pixels in the local small area "r" of the output image $P_{out}$ take substantially the same values.

On the other hand, FIG. 6 shows pixel values of pixels on one line of the two photographed images $P_1$ and $P_2$ after the positioning and pixel values of pixels of the output image generated by the interpolation performed by using the two photographed images $P_1$ and $P_2$ after the positioning and the interpolation function f(z) represented by Equation (1) in the case in which subjects in the two photographed images $P_1$ and $P_2$ are moving.

A first figure from the top of FIG. 6 shows pixel values of pixels of the first photographed image $P_1$ of the two photographed images after the positioning. A second figure from the top of FIG. 6 shows pixel values of pixels of the second photographed image $P_2$.

In FIG. 6, as in FIG. 5, in the first and second figure from the top of FIG. 6, G pixels are arranged every other pixel. Positions of the G pixels in the second figure from the too of FIG. 6 deviate by one pixel with respect to the G pixels in the first figure from the top of FIG. 6.

A third figure from the top of FIG. 6 shows pixel values of the output image $P_{out}$ generated by interpolation performed by using the first photographed image $P_1$ in the first figure from the top of FIG. 6, the second photographed image $P_2$ in the second figure from the top of FIG. 6, and the interpolation function f(z) of Equation (1).

As described above, in FIG. 6, the subject in the two photographed images $P_1$ and $P_2$ is moving. Therefore, different subjects (e.g., a moving subject and a background seen because of the movement of the subject) appear in the G pixels of the photographed image $P_1$ after the positioning and the G pixels of the photographed image $P_2$ after the positioning close to the G pixels. As a result, the G signals of the G pixels of the photographed image $P_1$ after the positioning and the G signals of the G pixels of the photographed image $P_2$ after the positioning near the G pixels take values significantly different from each other.

As explained with reference to FIG. 5, the photographed pixel used for the interpolation of the G signal of the pixel of interest using the interpolation function f(z) with the constant "a" of 1 in Equation (1) is only the G pixel in the range of the horizontal direction distance of 1 or less from the position of the pixel of interest, i.e., one G pixel in the position nearest from the pixel of interest among the G pixels of the two photographed images $P_1$ and $P_2$ after the positioning.

As described above, the photographed pixel used for the interpolation of the G signal of the pixel of interest is only one G pixel in the position nearest from the pixel of interest among the G pixels of the two photographed images $P_1$ and $P_2$ after the positioning. In FIG. 6, the G signals of the G pixels of the photographed image $P_1$ after the positioning and the G signals of the G pixels of the photographed image $P_2$ after the positioning near the pixels in the local small area "r" of the output image $P_{out}$ take values significantly different from each other.

Therefore, the interpolation for generating the G signals of the plural pixels in the local small area "r" of the output image $P_{out}$ may be performed using the G signal of the G pixels of the photographed image $P_1$ after the positioning or may be performed using the G signals of the G pixels of the photographed image $P_2$ after the positioning having a value significantly different from that of the G pixels. Thus, as shown in the third figure from the top of FIG. 6, the G signals of the plural pixels in the local small area "r" of the output image $P_{out}$ take a value significantly different depending on a value of the G signals used for the interpolation.

In this way, the pixel value of the plural pixels in the local small area "r" of the output image $P_{out}$ becomes a value significantly different because the moving object (the moving subject) appears in the photographed images $P_1$ and $P_2$ used for the interpolation. Consequently, zipper noise and false colors occur.

As shown in FIGS. 5 and 6, when the positions of the pixels of the first photographed image $P_1$ after the positioning and the positions of the pixels of the second photographed image $P_2$ after the positioning deviate from each other by one pixel in the horizontal direction and the vertical direction, respectively, zipper noise occurs most conspicuously.

As described above, when one output image is generated using the plural photographed images including the moving object, besides zipper noise and false colors, a lost area in which a background is lost may be generated in the output image.

For example, JP-A-2005-12660 discloses a method, of generating an output image with a moving object removed using plural photographed images including the moving object.

FIG. 7 is a diagram for explaining the method of generating an output image with a moving object removed disclosed in JP-A-2005-12660.

Figures at the upper left and the upper right of FIG. 7 show a first photographed image $P_1$ and a second photographed image $P_2$ as the plural photographed images.

A moving object appears in both the first photographed image $P_1$ and the second photographed image $P_2$. However, positions where the moving object appears are different in the first photographed image $P_1$ and the second photographed image $P_2$.

A figure at the lower left of figure shows an output image $P_{out}$ generated using the photographed images $P_1$ and $P_2$.

The moving object is removed in the output image $P_{out}$.

In the method disclosed in JP-A-2005-12660, the moving object is detected from the photographed images $P_1$ and $P_2$ by some method. An area of the moving object is deleted from one of the photographed images $P_1$ and $P_2$. An output image including only a background with the moving object removed shown in the figure at the lower left of FIG. 7 is generated by filling the deleted area with the identical area of the other photographed image.

According to the method disclosed in JP-A-2005-12660, as shown in figure when areas where the moving object appears do not overlap in the two photographed images $P_1$ and $P_2$, it is possible to obtain an output image without a lost area in which a background is lost.

However, as shown in FIG. 8, when areas in which the moving object appears overlap at least partially in the two photographed images $P_1$ and $P_2$, the overlapping area appears as a lost area in an output image.

FIG. 8 shows the two photographed images $P_1$ and $P_2$ as the plural photographed images and an output image generated using the two photographed images $P_1$ and $P_2$.

A figure at the upper left of FIG. 8 show the first photographed image $P_1$. A figure at the upper right of FIG. 8 shows the second photographed image $P_2$. A figure at the lower left of FIG. 8 shows the output image $P_{out}$ it generated using the photographed images $P_1$ and $P_2$.

In FIG. 8, as in FIG. 7, the moving object appears in the first photographed image $P_1$ and the second photographed image $P_2$. However, a part of an area of the moving object in the first photographed image $P_1$ and a part of an area of the moving object in the second photographed image $P_2$ overlap each other.

In an overlapping area where the area of the moving object in the first photographed image $P_1$ and the area of the moving object in the second photographed image $P_2$ overlap each other, the background does not appear in both the two photographed images $P_1$ and $P_2$.

Therefore, when the area of the moving object is deleted from one of the photographed images $P_1$ and $P_2$ and the deleted area is filled by the identical area of the other photographed image, an output image in which the moving object is displayed only in the overlapping area indicated by hatching in the figure at the lower left of FIG. 8, i.e., an output image the overlapping area is a lost area in which the background is lost is obtained.

SUMMARY OF THE INVENTION

As described above, when the output image is generated using the plural photographed images including the moving object, for example, an unnatural output image in which zipper noise, false colors, and a lost area appear may be obtained.

Therefore, it is desirable to make it possible to reduce unnaturalness of an output image caused by a moving object therein when the output image is generated using plural images.

According to a first embodiment of the present invention, there is provided an image processing apparatus that generates one output image from plural input images, the image processing apparatus including detecting means for detecting a positional relation among the plural input images photographed by imaging means for photographing an image, pixel-value calculating means for calculating a pixel value of a pixel of the output image using pixel values of pixels of the input images and an interpolation function that changes according to positions of the pixels of the input images after positioning obtained by performing positioning of the plural input images on the basis of the positional relation, determining means for determining whether the pixel of the output, image is a motion pixel that is a pixel in an area in which a moving subject appears, and adjusting means for adjusting a high-pass characteristic of the interpolation function on the basis of a result of the determination on whether the pixel of the output image is a motion pixel.

According to the first embodiment of the present invention, there is provided an image processing method of generating one output image from plural input images or a computer program for causing an computer to execute image processing for generating one output image from plural input images, the image processing method or the computer program including a step of detecting a positional relation among the plural input images photographed by imaging means for photographing an image, a step of calculating a pixel value of a pixel of the output image using pixel values of pixels of the input images and an interpolation function that changes according to positions of the pixels of the input images after positioning obtained by performing positioning of the plural input images on the basis of the positional relation, a step of determining whether the pixel of the output image is a motion pixel that is a pixel in an area in which a moving subject appears, and a step of adjusting a high-pass characteristic of the interpolation function on the basis of a result of the determination on whether the pixel of the output image is a motion pixel.

According to the first embodiment described above, the positional relation among the plural input images photographed by the imaging means for photographing an image is detected. The pixel value of the pixel of the output image is calculated using the pixel values of the pixels of the input images and the interpolation function that changes according to the positions of the pixels of the input images after positioning obtained by performing positioning of the plural input images on the basis of the positional relation. It is determined whether the pixel of the output image is a motion pixel that is a pixel in the area in which the moving subject appears. The high-pass characteristic of the interpolation function is adjusted on the basis of a result of the determination on whether the pixel of the output, image is a motion pixel.

According to a second embodiment of the present invention, there is provided an image processing apparatus that generates one output image from plural, input images, the image processing apparatus including detecting means for detecting a positional relation among the plural input images photographed by imaging means for photographing an image, pixel-value calculating means for calculating a pixel value of a pixel of the output image using pixel, values of pixels of the input images, an interpolation function that changes according to positions of the pixels of the input images after positioning obtained by performing positioning of the plural input images on the basis of the positional relation, and an influence parameter indicating a degree of an influence of the pixel values of the pixels of the input images after the positioning on the pixel value of the pixel of the output image, and influence-parameter calculating means for calculating, with a near area in a range near from a position of the pixel of the output image in the input images after the positioning set as an influential area used for calculating the influence parameter, the influence parameter on the basis of pixels values of pixels in the influential area among the pixels of the input images after the positioning.

According to the second embodiment of the present invention, there is provided an image processing method of generating one output, image from plural input images or a computer program for causing a computer to execute image processing for generating one output image from plural input images, the image processing method or the computer program including a step of detecting a positional relation among the plural input images photographed by imaging means for photographing an image, a step of calculating a pixel value of a pixel of the output image using pixel values of pixels of the input images, an interpolation function that changes according to positions of the pixels of the input images after positioning obtained by performing positioning of the plural input images on the basis of the positional relation, and an influence parameter indicating a degree of an influence of the pixel values of the pixels of the input images after the positioning on the pixel value of the pixel of the output image, and a step of calculating, with a near area in a range near from a position of the pixel, of the output image in the input images after the positioning set as an influential area used for calculating the influence parameter, the influence parameter on the basis of pixels values of pixels in the influential area among the pixels of the input images after the positioning.

According to the second embodiment described above, the positional relation among the plural input images photographed by imaging means for photographing an image is detected. The pixel value of the pixel of the output image is calculated using the pixel values of the pixels of the input images, the interpolation function that changes according to the positions of the pixels of the input images after positioning obtained by performing positioning of the plural input images on the basis of the positional relation, and the influence parameter indicating a degree of an influence of the pixel values of the pixels of the input images after the positioning on the pixel value of the pixel of the output image. With the near area in the range near from the position of the pixel of the output image in the input images after the positioning set as the influential area used for calculating the influence parameter, the influence parameter is calculated on the basis of the pixels values of the pixels in the influential area among the pixels of the input images after the positioning.

It is possible to record the computer program in various recording media. It is possible to transmit the computer program via various transmission media.

According to the first and the second embodiments of the present invention, when one output image is generated by interpolation performed by using plural input images, it is possible to reduce unnaturalness of the output, image caused by a moving object in the input images.

BRIEF DESCRIPTION OF THE DRAWINGS

FIG. 13 is a flowchart for explaining image generation processing;

DESCRIPTION OF THE PREFERRED EMBODIMENTS

Embodiments of the present invention will be herein after explained. A correspondence relation between elements of the present invention and the embodiments described or shown in the specification or the drawings is described as follows. This description is a description for confirming that the embodiments supporting the present invention are described or shown in the specification or the drawings. Therefore, even if there is an embodiment that is described or shown in the specification or the drawings but is not described herein as an embodiment corresponding to an element of the present invention, this does not means that the embodiment does not correspond to the element. Conversely, even if an embodiment is described herein as an embodiment corresponding to an element of the present invention, this does not means that, the embodiment does not correspond to elements other than the element.

Figure 1:
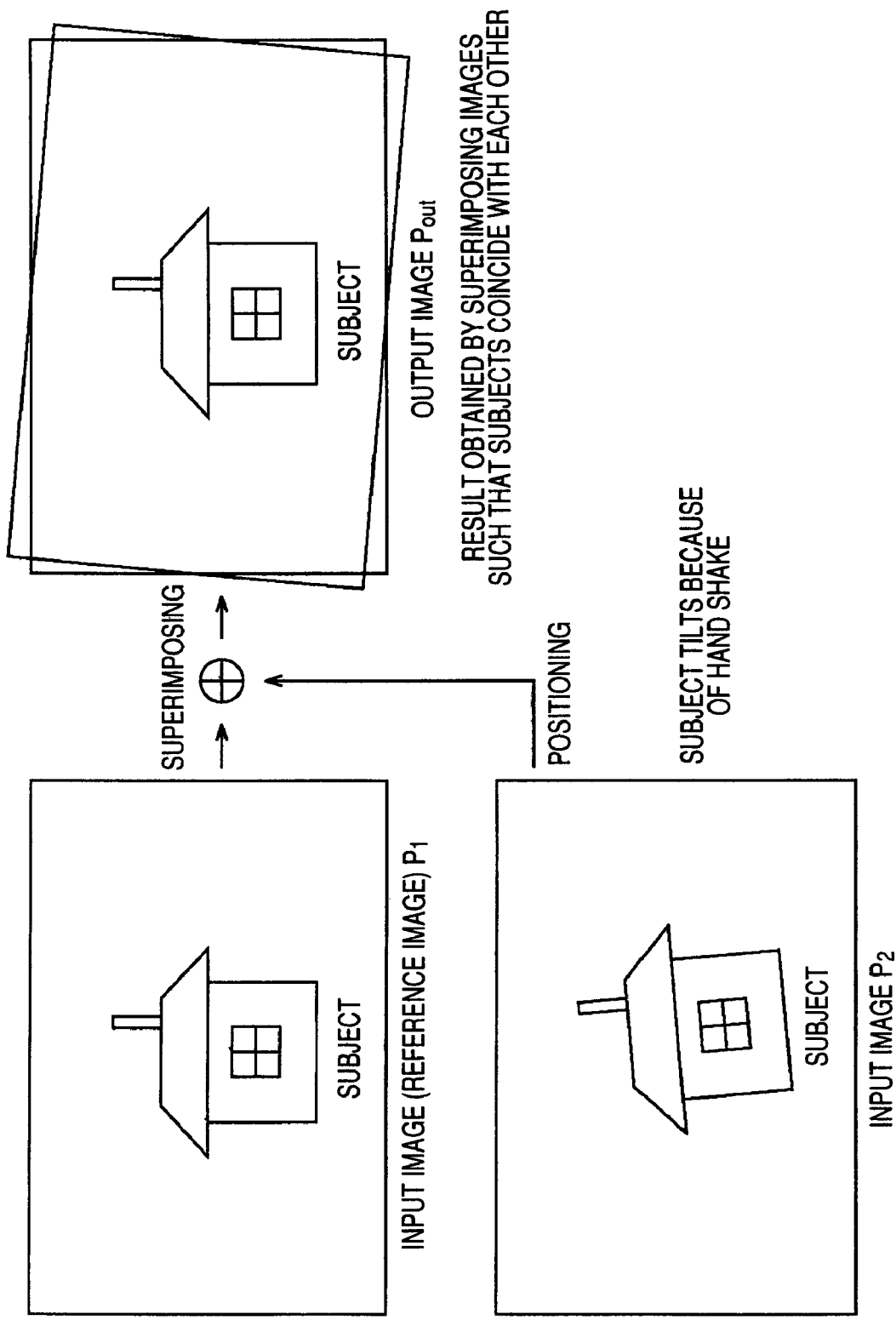
FIG. 1 is a diagram for explaining a method of obtaining an output image in the case in which there are two photographed images.

An image processing apparatus according to a first embodiment of the present invention is an image processing apparatus (e.g., a digital still camera 1 in FIG. 9) that generates one output image from plural input images. The image processing apparatus includes detecting means (e.g., a signal processing circuit 7 in FIG. 1 that performs processing in step S3 in FIG. 10) for detecting a positional relation among the plural input images photographed by imaging means (e.g., an imaging element 4 in FIG. 9) for photographing an image, pixel-value calculating means (e.g., an arithmetic circuit 24 in FIG. 12 that performs processing in steps S106, S108, and S110 in FIG. 25) for calculating a pixel value of a pixel of the output image using pixel values of pixels of the input images and an interpolation function that changes according to positions of the pixels of the input images after positioning obtained by performing positioning of the plural input images on the basis of the positional relation, determining means (the arithmetic circuit 24 in FIG. 12 that performs processing in steps S102 and 3103 in FIG. 25) for determining whether the pixel of the output image is a motion pixel that is a pixel in an area in which a moving subject appears, and adjusting means (e.g., the arithmetic circuit 24 in FIG. 12 that performs processing in step S104 in FIG. 25) for adjusting a high-pass characteristic of the interpolation function on the basis of a result of the determination on whether the pixel of the output image is a motion pixel.

In the image processing apparatus according to the first embodiment, it is possible to further provide influence-parameter calculating means (e.g., the arithmetic circuit 24 in FIG. 12 that performs processing in steps 3165 and S166 in FIG. 31) for calculating, with a near area in a range near from a position of the pixel of the output image in the input images after the positioning set as an influential area used for calculating an influence parameter indicating a degree of an influence of the pixel values of the pixels of the input images after the positioning on the pixel value of the pixel of the output image, the influence parameter on the basis of pixels values of pixels in the influential area among the pixels of the input images after the positioning.

It is possible to cause the pixel-value calculating means to calculate a pixel value of the pixel of the output image using the pixel values of the pixels of the input image after the positioning, the interpolation function, and the influence parameter.

An image processing method or a computer program according to the first embodiment of the present invention is an image processing method of generating one output image from plural input images or a computer program for causing a computer to execute image processing for generating one output image from plural input images. The image processing method or the computer program includes a step (e.g., step S3 in FIG. 10) of detecting a positional relation among the plural input images photographed by imaging means (e.g., the imaging element 4 in FIG. 9) for photographing an image, a step (e.g., steps S106, S108, and S110 in FIG. 25) of calculating a pixel value of a pixel of the output image using pixel values of pixels of the input images and an interpolation function that changes according to positions of the pixels of the input images after positioning obtained by performing positioning of the plural input images on the basis of the positional relation, a step (e.g., steps 3102 and S103 in FIG. 25) of determining whether the pixel of the output image is a motion pixel that is a pixel in an area in which a moving subject appears, and a step (e.g., step S104 in FIG. 25) of adjusting a high-pass characteristic of the interpolation function on the basis of a result of the determination on whether the pixel of the output image is a motion pixel.

An image processing apparatus according to the second embodiment of the present invention is an image processing apparatus (e.g., the digital still camera 1 in FIG. 9) that generates one output image from plural input images. The image processing apparatus includes detecting means (e.g., the signal processing circuit 7 in FIG. 1 that performs processing in step S3 in FIG. 10) for detecting a positional relation among the plural input images photographed by imaging means (e.g., the imaging element 4 in FIG. 9) for photographing an image, pixel-value calculating means (e.g., the arithmetic circuit 24 in FIG. 12 that performs processing in steps S135, S137, and S139 in FIG. 30) for calculating a pixel value of a pixel of the output image using pixel values of pixels of the input images, an interpolation function that changes according to positions of the pixels of the input images after positioning obtained by performing positioning of the plural input images on the basis of the positional relation, and an influence parameter indicating a degree of an influence of the pixel values of the pixels of the input, images after the positioning on the pixel value of the pixel of the output image, and influence-parameter calculating means (e.g., the arithmetic circuit 24 in FIG. 12 that performs processing in steps S132 and S133 in FIG. 30) for calculating, with a near area in a range near from a position of the pixel of the output image in the input images after the positioning set as an influential area used for calculating the influence parameter, the influence parameter on the basis of pixels values of pixels in the influential area among the pixels of the input images after the positioning.

An image processing method or a computer program according to the second embodiment, of the present invention is an image processing method of generating one output image from plural input images or a computer program for causing a computer to execute image processing for generating one output image from plural input images. The image processing method or the computer program includes a step (e.g., step S3 in FIG. 10) of detecting a positional relation among the plural input images photographed by imaging means for photographing an image, a step (steps S133, S137, and S139 in FIG. 30) of calculating a pixel value of a pixel of the output image using pixel values of pixels of the input images, an interpolation function that changes according to positions of the pixels of the input images after positioning obtained by performing positioning of the plural input images on the basis of the positional relation, and an influence parameter indicating a degree of an influence of the pixel values of the pixels of the input images after the positioning on the pixel value of the pixel of the output image, and a step (e.g., steps S132 and S133 in FIG. 30) of calculating, with a near area in a range near from a position of the pixel of the output image in the input images after the positioning set as an influential area used for calculating the influence parameter, the influence parameter on the basis of pixels values of pixels in the influential area among the pixels of the input images after the positioning.

Embodiments of the present invention will be herein after explained with reference to the drawings.

Figure 9:
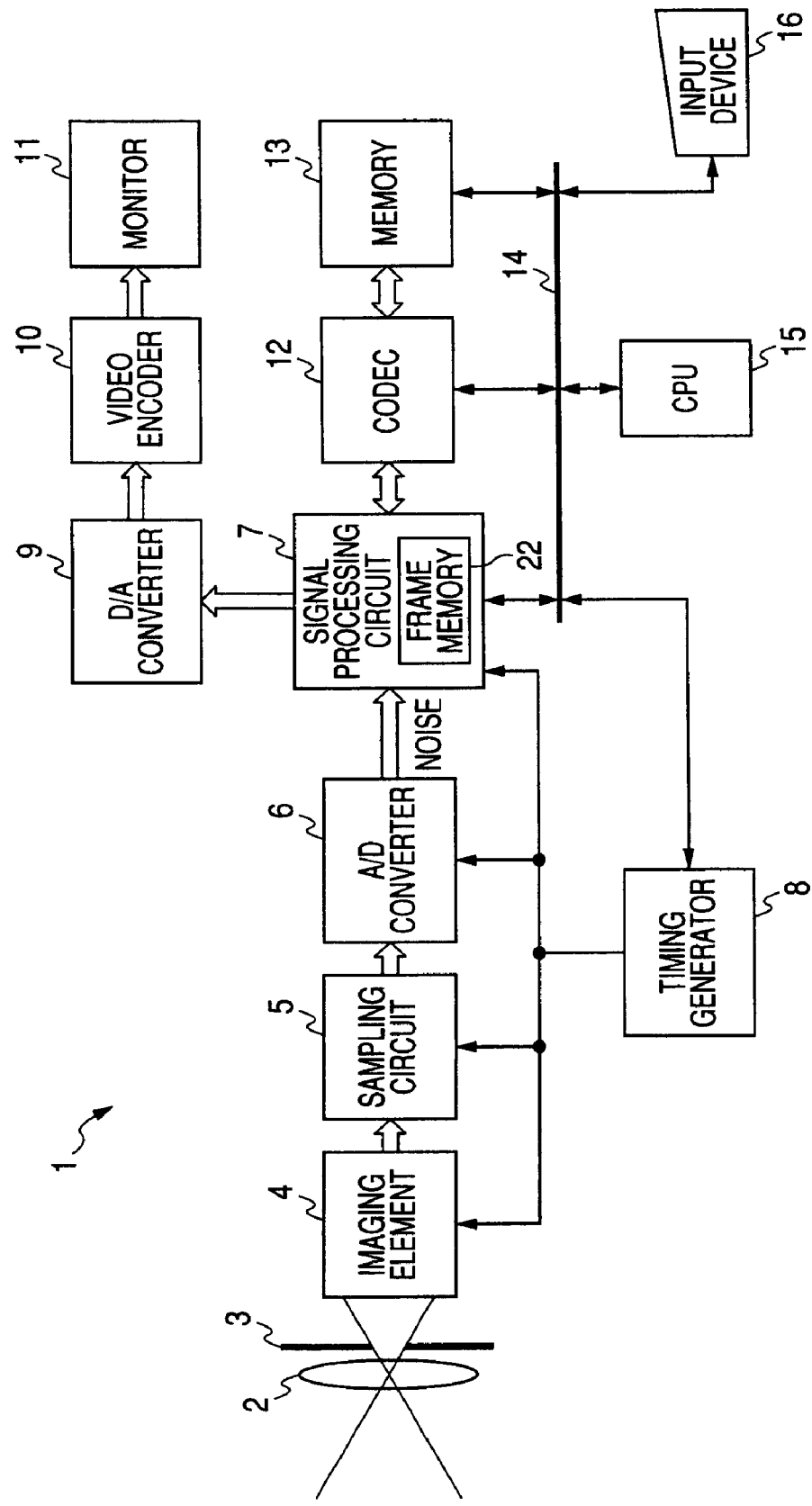
FIG. 9 is a block diagram showing an example of a structure of a digital still camera according to one embodiment of the present invention.

FIG. 9 is a block diagram showing an example of a structure of a digital still camera according to an embodiment of the present invention.

A digital still camera 1 in FIG. 9 includes a lens 2, a stop 3, an imaging element 4, a correlated double sampling circuit 5, an A/D (Analog/Digital) converter 6, a signal processing circuit 7, a timing generator 8, a D/A (Digital/Analog) converter 9, a video encoder 10, a monitor 11, a CODEC 12, a memory 13, a bus 14, a CPU (Central Processing Unit) 15, and an input device 16. The signal processing circuit 7 has a frame memory 22.

Light from a not-shown subject passes through an optical system of the lens 2, the stop 3, and the like and is made incident on the imaging element 4. The imaging element 4 is constituted by a single plate sensor formed by a CCD (Charge Coupled Device), a CMOS (Complementary Metal Oxide Semiconductor), or the like and has a predetermined number of pixels (light receiving elements).

The imaging element 4 receives the light of the subject made incident thereon at a predetermined interval and for a predetermined time (shutter time) in accordance with an exposure timing signal supplied from the timing generator 8. Moreover, the imaging element 4 converts a light reception amount of the light received by the respective light receiving elements serving as the pixels into an image signal as an electric signal according to photoelectric conversion and supplies the image signal to the correlated double sampling circuit 5. The imaging element 4 is, for example, the single plate sensor. The image signal supplied from the imaging element 4 to the correlated double sampling circuit 5 is a color signal (data) of any one of an R signal, a G signal, and a B signal for one pixel.

Even if camera shake (hand shake) occurs, in order to output a clearer image, the imaging element 4 performs, by performing photographing once (operating a release button once), imaging K times at speed higher than a shutter speed in proper exposure (in a shutter time shorter than a shutter time (exposure time) in proper exposure). Consequently, the imaging element 4 outputs image signals of N photographed images in time series as input images to be inputs to the signal processing circuit at the post stage.

The correlated double sampling circuit 5 removes noise components of the image signals of the photographed images supplied from the imaging element 4 according to correlated double sampling and supplies the image signals to the A/D converter 6.

A/D converter 6 subjects the image signals supplied from the correlated double sampling circuit 5 to A/D conversion, i.e., sampling and quantizes the image signals.

The A/D converter subjects (the digital image signals of) the photographed images after the A/D conversion to, for example, bit shift to increase a gain of the photographed images to have photographed images of proper exposure and supplies the photographed images to the signal processing circuit 7.

The signal processing circuit 7 is constituted by, for example, a DSP (Digital Signal Processor). The Signal processing circuit 7 temporarily stores the photographed images supplied from the A/D converter in the frame memory 22 built, therein and applies predetermined image processing to the photographed images.

As described above, the imaging element 4 outputs the N photographed images in time series in one photographing. Thus, the N photographed images are sequentially supplied to the signal processing circuit 7 from the imaging element 4 through the sampling circuit 5 and the A/D converter 6.

The signal processing circuit 7 supplies the N photographed images supplied thereto to the frame memory 22 built therein and causes the frame memory 22 to temporarily store the N photographed images. Moreover, the signal processing circuit 7 applies predetermined image processing to the K photographed images stored in the frame memory 22.

The signal processing circuit 7 sets, for example, a first photographed image among the N photographed images as a reference image and sets second to Nth photographed images as target images, respectively. The signal processing circuit 7 detects what kind of positional deviation the targets images cause with respect to the reference image, respectively, i.e., a positional relation between the reference image and the target images (a positional relation of an identical subject in the reference image and the target images).

The signal processing circuit 7 obtains an output image having all a G signal, an R signal, and a B signal for one pixel, which is one clear image with camera shake corrected, on the basis of the positional relation between the reference image and the target, images. The signal processing circuit 7 supplies the output image to one or both of the D/A converter 9 and the CODEC 12.

The timing generator 8 supplies an exposure timing signal to the imaging element 4, the correlated double sampling circuit 5, the A/D converter 6, and the signal processing circuit 7 such that high-speed imaging for the N photographed images is performed at predetermined intervals in one photographing. A user can change an exposure time of the high-speed imaging (or the number N of photographed images imaged by the high-speed imaging) according to, for example, brightness of a subject. When the user changes the exposure time of the high-speed imaging, the user operates the input device 16 to supply a changed value of the exposure time determined by the CPU 15 from the CPU 15 to the timing generator 8 through the bus 14.

The D/A converter S subjects an image signal of an output image supplied from the signal processing circuit 7 to D/A conversion and supplies the image signal to the video encoder 10.

The video encoder 1Q converts the image signal (the analog signal) supplied from the D/A converter 9 into an image signal that can be displayed on the monitor 11 and supplies the image signal to the monitor 11. The monitor 11 plays a role of a finder or the like of the digital still camera 1. The monitor 11 is constituted by an LCD or the like and displays an image signal supplied from the video encoder 10. Consequently, the output image is displayed on the monitor 11.

The CODEC 12 encodes the image signal of the output image supplied from the signal processing circuit 7 in accordance with a predetermined system such as the JPEG (Joint Photographic Experts Group) system and supplies the image signal to the memory 13.

The memory 13 is constituted by a semiconductor memory such as a flash memory and stores (records) the encoded image signal supplied from the CODEC 12. It is possible to use a recording medium such as a magnetic disk or an optical (magneto-optical) disk instead of the memory 13. The memory 13 or the recording medium used instead of the memory 13 is detachably insertable in the digital still camera 1. It is possible to provide both the recording medium built, in the digital still camera 1 and the recording medium detachably insertable in the digital still camera 1.

The CPU 15 supplies control signals to the respective units through the bus 14 and controls various kinds of processing. For example, the CPU 15 supplies the control signals to the respective units such that the subject is photographed in accordance with an operation signal for starting photographing supplied from the input device 16 according to operation of the user and an output image finally obtained by the photographing is stored in the memory 13.

The input device 16 has operation buttons such as a release button provided in a main body of the digital still camera 1. Various operation signals generated by the operation of the operation buttons by the user are supplied from the input device 16 to the CPU 15 through the bus 14. The CPU 15 controls the respective units to execute processing conforming to the various operation signals supplied from the input device 16 through the bus 14. It is possible to display one or more operation buttons of the input device 16 on the monitor 11. For example, a transparent, tablet is provided on the monitor 11. If is possible to detect the operation of the operation buttons displayed on the monitor 11 using the tablet.

Photographing processing of the digital still camera 1 will be explained with reference to a flowchart in FIG. 10.

First, in step S1, the imaging element 4 photographs a subject. In photographing performed by depressing the release button (a shutter button) once, the imaging element 4 receives light of the subject continuously made incident thereon N times at predetermined intervals in accordance with an exposure timing signal supplied from the timing generator 8 and photoelectrically converts the light to perform high-speed imaging N times. Therefore, N photographed images are obtained in one photographing and the respective photographed images are dark images with exposure equal to or lower than (or lower than) proper exposure. Image signals of the N photographed images obtained by the photoelectric conversion in the imaging element 4 are sequentially supplied to the correlated double sampling circuit 5 and, after noise components are removed, supplied to the A/D converter 6.

Thereafter, the processing proceeds from step S1 to step S2. The A/D converter 6 subjects image signals of the N photographed images sequentially supplied from the correlated double sampling circuit 5 to A/D conversion. Thereafter, the A/D converter 6 subjects the dark photographed images with exposure equal to or lower than the proper exposure to bit shift to convert the dark photographed images into image signals with brightness of the proper exposure and supplies the image signals to the signal processing circuit 7. The processing proceeds to step S3.

In step S3, the signal processing circuit 7 sets, for example, a first photographed image among the M photographed images from the A/D converter 6 as a reference image and detects what kind of positional deviation the N photographed images cause with respect to the reference image, respectively, i.e., a positional relation of the N photographed images to the reference image. The processing proceeds to step 34.

In step S4, the signal processing circuit 7 performs image generation processing for generating one output image from the N photographed images on the basis of the N photographed images and the positional relation of the N photographed images detected in step S3. The processing proceeds to step 35.

Although details of the image generation processing will be described later, an output image having all of a G signal, an R signal, and a B signal for one pixel, which is one clear image without camera shake (with little camera shake) and with the proper exposure, is generated by this image generation processing. An image signal of the output image obtained by the image generation processing is supplied from the signal processing circuit 7 to one or both of the D/A converter 9 and the CODEC 12.

In step S5, the output image obtained by the signal processing circuit 7 is displayed on the monitor 11 and recorded in the memory 13 such as a flash memory. Then, the processing is finished.

In step S5, the image signal supplied from the signal processing circuit 7 to the D/A converter 9 in step S4 is converted into an analog signal and supplied to the video encoder 10. Moreover, in step S5, the video encoder 10 converts the analog image signal supplied from the D/A converter 9 into an image signal that can be displayed on the monitor 11 and supplies the image signal to the monitor 11. In step S5, the monitor 11 displays an output image on the basis of the image signal supplied from the video encoder 10. In step S5, predetermined encoding of JPEG or the like is applied to the image signal supplied from the signal processing circuit 7 to the CODEC 12 in step S4 and the image signal is recorded in the memory 13 such as a flash memory.

Figure 11:
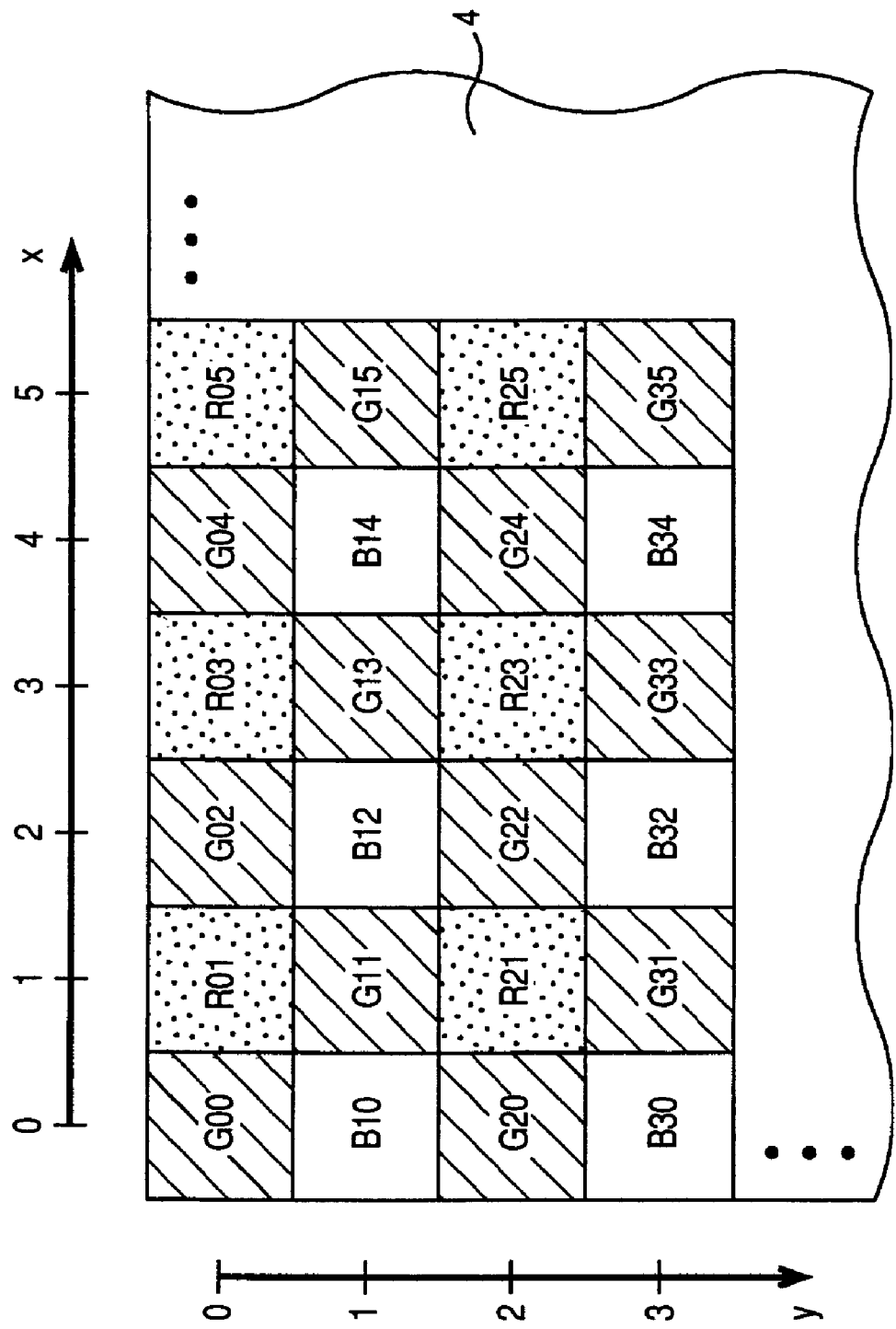
FIG. 11 is a diagram showing an array of pixels of an imaging element 4 in FIG. 9.

FIG. 11 shows an array of pixels of the imaging element 4 in FIG. 9.

In FIG. 11, pixels in a portion at the upper left of the imaging element 4 (six pixels in the horizontal direction and the four pixels in the vertical direction; twenty-four pixels in total) are shown. Pixels in other portions are arranged in the same way.

In FIG. 11, with the center (the center of gravity) of the pixels at the upper left of the imaging element 4 as an origin, an xy coordinate system with the horizontal (right) direction set as an x direction and the vertical (down) direction set as a y direction is set. It is assumed that the pixels have a rectangular shape and the lengths (the widths) in the horizontal and vertical direction of one pixel is 1, respectively.

When a position of a pixel is represented by a coordinate of the center of gravity of the rectangle as the pixel having the lengths in the horizontal and vertical direction of 1, (a coordinate of) a position (x,y) of a pixel ith from the left and jth from the top can be represented as (i−1,j−1).

In FIG. 11, an array of the pixels of the imaging element 4 is a so-called Bayer array. The array of the pixels of the imaging element 4 is not limited to the Bayer array and may be other arrays.

An image having pixel values of color signals corresponding to positions of pixels is outputted from the imaging element 4 of the Bayer array.

In the Bayer array, as pixels from which the G signal can be extracted, a pixel G00 that is a pixel first in the x direction and first in the y direction from the origin, a pixel G02 that is a pixel third in the x direction and first in the y direction from the origin, a pixel G04 that is a pixel fifth in the x direction and first in the y direction from the origin, and a pixel G11 that is a pixel second in the x direction and second in the y direction from the origin are arranged. In the same manner, a pixel G13, a pixel G15, a pixel G20, a pixel G22, a pixel G24, a pixel G31, a pixel G33, and a pixel G35 are arranged.

As pixels from which the R signal can be extracted, a pixel R01 that is a pixel second in the x direction and first in the y direction from the origin, a pixel R03 that is a pixel fourth in the x direction and first in the y direction from the origin, a pixel R05 that is a pixel sixth in the x direction and first in the y direction from the origin, and a pixel R21 that is a pixel second in the x direction and third in the y direction from the origin are arranged. In the same manner, a pixel R23 and a pixel R25 are arranged.

As pixels from which the B signal can be extracted, a pixel R10 that is a pixel first in the x direction and second in the y direction from the origin, a pixel B12 that is a pixel third in the x direction and second in the y direction from the origin, a pixel B14 that is a pixel fifth in the x direction and second in the y direction from the origin, and a pixel B30 that is a pixel first in the x direction and fourth in the y direction front the origin are arranged. In the same manner, a pixel E32 and a pixel B34 are arranged.

It is assumed, here that the imaging element 4 is an imaging element in which the G signal, the R signal, and the B signal are obtained in respective pixels. An ideal image photographed without camera shake and with the proper exposure using such an imaging element 4 is assumed. The G signal, the R signal, and the B signal of the ideal image are represented as $Lg(x,y)$, $Lr(x,y)$, and $Lb(x,y)$, respectively, using a position (x,y) on an xy coordinate system with the imaging element 4 set as a reference.

Figure 10:
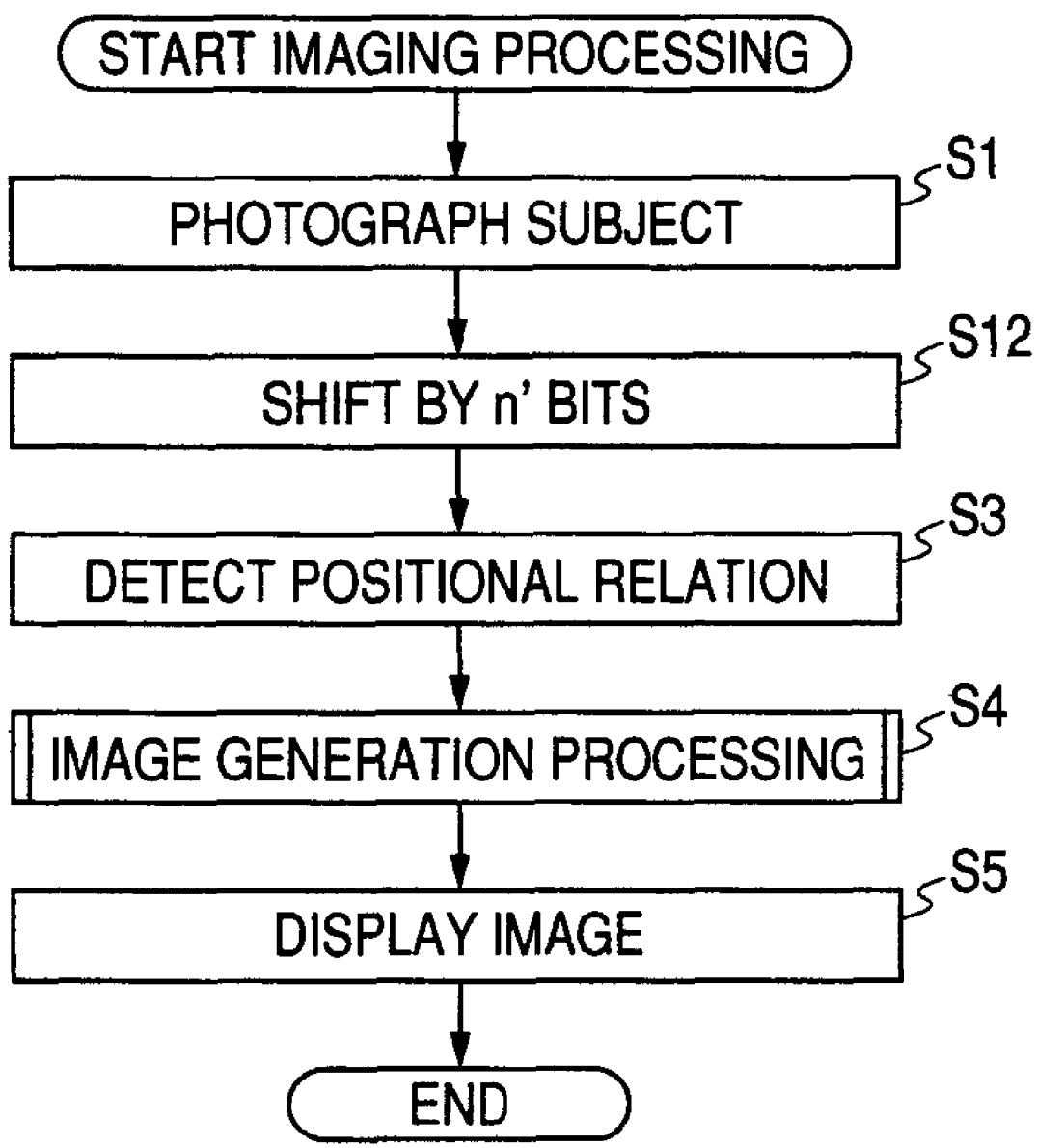
FIG. 10 is a flowchart for explaining photographing processing of a digital still camera 1 in FIG. 9.

This ideal image is an output, image that, is desired to be obtained in the image generation processing in step S4 in FIG. 10. The G signal, the R signal, and the B signal of an "1−1th and j+1th pixel" i+1th from the left and j+1th from the top of the output image can be represented as $Lg(i,j)$, $Lr(i,j)$, $Lb(i,j)$, respectively.

When the "i+1th and j−1th pixel" i+1th from the left and j+1th from the top of the imaging element 4 is a pixel that outputs the G signal, i and j representing a position of the pixel are also described, as ig and jg, respectively. Similarly, when the "i+1th and j+1th pixel" i+1th from the left and j+1th from the top of the imaging element 4 is a pixel that outputs the R signal, i and j representing a position of the pixel are also described as ir and jr, respectively. When the "i+1th and j+1th pixel" i+1th from the left and j+1th from the top of the imaging element 4 is a pixel that outputs the B signal, and j representing a position of the pixel are also described as ib and jb, respectively.

A combination of the variables ig and jg is equal to a combination of the variables i and j representing the position of the pixel that outputs the G signal. A combination of the variables ir and jr is equal to a combination of the variables and j representing the position of the pixel that outputs the R signal. A combination of the variables ib and jb is equal to a combination of the variables i and j representing the position of the pixel that outputs the B signal.

When the imaging element 4 is an imaging element of the Bayer array as described above, the variables ig and jg are the variables i and j that satisfy a condition that a difference (i−j) between the variables i and j is an even number. The variables ir and jr are the variables i and j that satisfy a condition that the variable i is an even number and a difference (i−j) between the variables i and j is an odd number. Moreover, the variables ib and jb are the variables i and j that satisfy a condition that the variable i is an odd number and a difference (i−j) between the variables i and j is an even number.

However, when the imaging element 4 is a single plate sensor of an array other than the Bayer array, conditions of the variables i and j forming the variables ig and jg, the variables ir and jr, and the variables ib and jb are different according to characteristics of the array.

When an "i+1th and j+1th pixel" if 1th from the left and j+1th from the top of a kth (k=1, 2, . . . , N) photographed image among the N photographed images outputted by the imaging element 4 in one photographing is a pixel having only the G signal as a pixel value, the G signal as the pixel value is represented as Gobs(k,i,j).

Similarly, when the "i+1th and j+1th pixel" i+1th from the left and j+1th from the top of the kth photographed image is a pixel having only the R signal as a pixel value, the R signal as the pixel, value is represented as Robs(k,i,j). When the "i+1th and j+1th pixel" i+1th from the left and j+1th from the top of the kth photographed image is a pixel having only the B signal as a pixel value, the B signal as the pixel value is represented as Bobs(k,i,j).

The pixel values Gobs(k,i,j), Robs (k,i,j), and Bobs(k,i,j) can also be represented as Gob(k,ig,jg), Robs(k,ir,jr), and Bobs(k,ib,jb).

Figure 12:
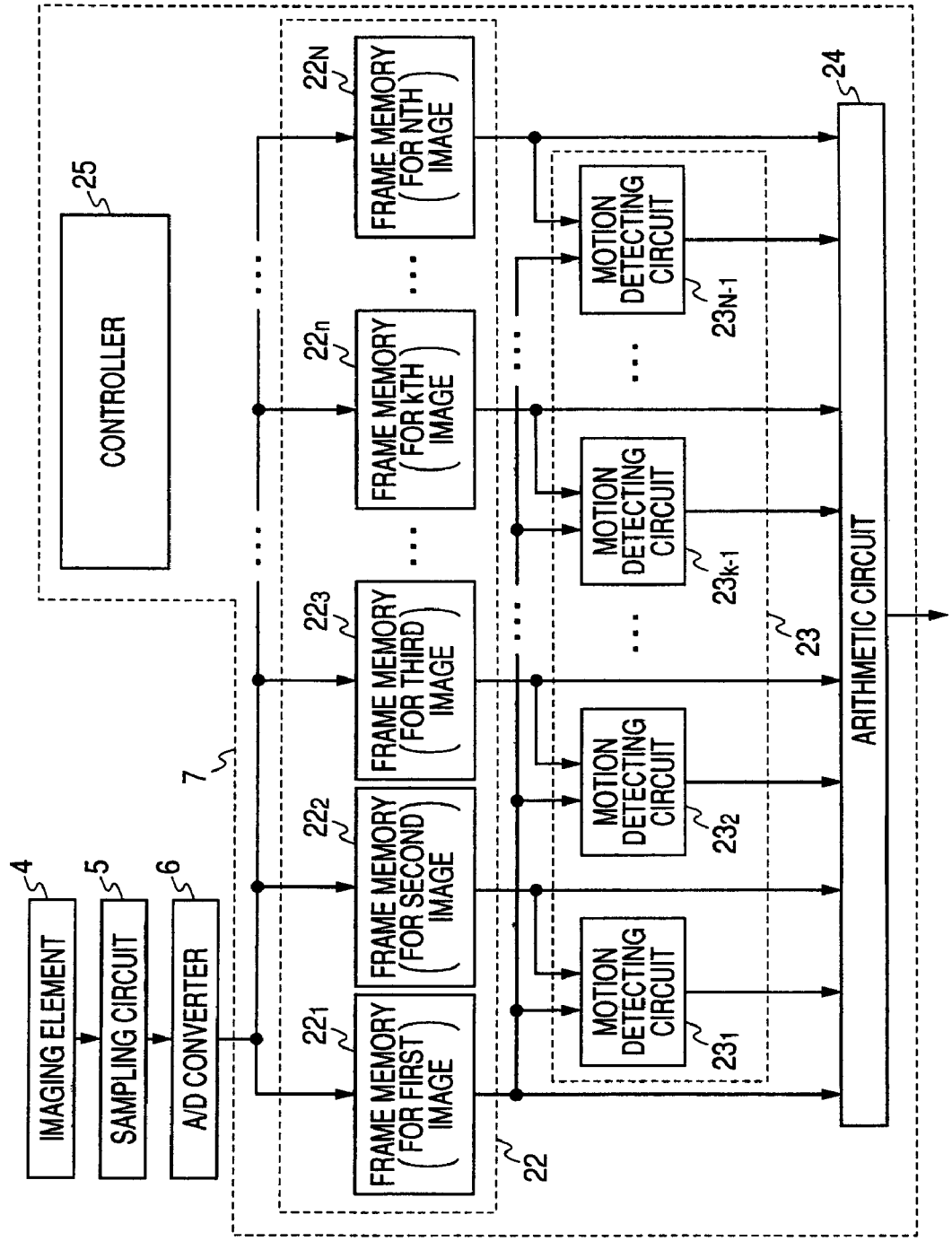
FIG. 12 is a block diagram showing an example of a detailed structure of a signal processing circuit 7 in FIG. 9.

FIG. 12 shows an example of a detailed structure of a part of the signal processing circuit 7 in FIG. 9.

The signal processing circuit 7 includes the frame memory 22, a motion detecting circuit 23, an arithmetic circuit 24, and a controller 25. The frame memory 22 includes N frame memories 22₁ to 22_N. The motion detecting circuit 23 includes N−1 motion detecting circuits 23₁ to 23_{N-1}.

As described above, the N photographed images are sequentially suppiled from the A/D converter 6 to the frame memory 22. The frame memory 22₁ temporarily stores a first photographed image supplied from the A/D converter 6. The frame memory 22₂ stores a second photographed image supplied from the A/D converter 6. In the same manner, the frame memory 22_k stores a kth photographed image supplied from, the A/D converter 6.

The frame memory 22₁ supplies the first photographed image stored therein to the arithmetic circuit 24 and the motion detecting circuits 23₁ to 23_{N-1} at predetermined timing. The frame memory 22₂ supplies the second photographed image stored therein to the arithmetic circuit 24 an a the motion detecting circuit 23₁ at predetermined timing. In the same manner, the frame memory 22_k supplies the kth photographed image stored therein to the arithmetic circuit 24 and the motion detecting circuits 23_{k-1} at predetermined timing.

The motion detecting circuit 23 detects a positional relation between two photographed images. The motion detecting circuit 23 sets the first photographed image as a reference image serving as a reference for detection of the positional relation and sets the second to Nth photographed images as target, images. The motion detecting circuit 23 detects deviation amounts of positional deviation of the target images with respect to the reference image indicating what kind of positional deviation the targets images (the second to Nth images) cause with respect to the reference image. The deviation is caused by hand shake.

The motion detecting circuit 23 detects a positional relation between the reference image and the target images on the basis of the deviation amounts of the positional deviation of the target, images with respect to the reference image.

In a state in which the camera is aimed at the subject, as components of the positional deviation of the images caused by hand shake, there are a translation component generated when the camera deviates to the left and right and a rotation component around an optical axis of a lens generated when the camera rotates in the clockwise direction or the counterclockwise direction. There are also a rotation component around an axis perpendicular to the optical axis of the lens of the camera and an expansion and reduction component due to the movement in the depth direction of the camera.

The positional relation between the reference image and the target image in which hand shake occurs can be represented by, for example, affine transformation. In the affine transformation, a positional relation between a position (x,y) on the reference image and a position (x',y') on the target images is represented by the following Equation (2).

$$\begin{pmatrix} x \\ y \end{pmatrix} = \begin{pmatrix} a & b \\ c & d \end{pmatrix} \begin{pmatrix} x' \\ y' \end{pmatrix} + \begin{pmatrix} s \\ t \end{pmatrix} \qquad (2)$$

For example, when a=E×cos θ, b=K=sin θθ, c=K×sin θ, and d=K×cos θ in Equation (2), Equation (2) represents the affine transformation for applying rotation at an angle θ, translation of (s,t), and expansion and reduction of K times with respect to the position (x',y').

A matrix (a,b,c,d) and a two-dimensional vector (s,t) of the affine transformation are collectively referred to as transformation parameters (a,b,c,d,s,t) as appropriate.

The affine transformation of Equation (2) defined by the transformation parameters represents a positional relation between the reference image and the target image. The motion detecting circuit 23 calculates the transformation parameters defining Equation (2), for example, as described below.

The motion detecting circuit 23 divides the target images into plural blocks and detects motion vectors of the respective blocks with respect to the reference image as deviation amounts of positional deviation of the target images with respect to the reference image.

The motion detecting circuit 23 calculates, as the positional relation, the transformation parameters (a,b,c,d,s,t) of Equation (2) for minimizing a sum of square errors between a position (x",y") after movement of (positions) of the respective pixels (x',y') of the target, images onto the reference image and positions (x,y) after conversion of the respective pixels (x',y') of the target images by Equation (2) into positions (x,y) on the reference image in accordance with the motion vectors of the respective blocks of the target images.

Specifically, the first photographed image as the reference image is supplied to the motion detecting circuit 23₁ from the frame memory 22₁. The second photographed image as the target image is supplied to the motion detecting circuit 23₁ from the frame memory 22₂.

The motion detecting circuit 23₁ detects motion vectors indicating which positions of the first photographed image the respective blocks obtained by dividing the second photographed image into plural blocks correspond to. In other words, the motion detecting circuit 23₁ detects a position on the first photographed image in which a portion identical with a portion of the subject projected in a certain position of the second photographed image is projected. The motion detecting circuit 23₁ calculates, on the basis of the motion vectors as a result of the detection, transformation parameters (a₂,b₂,c₂, d₂,s₂,t₂) defining Equation (3) identical with Equation (2) representing a positional relation between the first photographed image and the second photographed image and supplies the transformation parameters to the arithmetic circuit 24.

$$\begin{pmatrix} x_{1(2)} \\ y_{1(2)} \end{pmatrix} = \begin{pmatrix} a_2 & b_2 \\ c_2 & d_2 \end{pmatrix} \begin{pmatrix} x_2 \\ y_2 \end{pmatrix} + \begin{pmatrix} s_2 \\ t_2 \end{pmatrix} \quad (3)$$

As in the case of the imaging element 4 in FIG. 11, as a coordinate system of an image, with the center of pixels at the upper left of the image set as an origin, an xy coordinate system with the horizontal direction (the right direction) set as an x direction and the vertical direction (the down direction) set as a y direction is defined. Then, in Equation (3), $(x_2,y_2)$ represents a position of a pixel of the second photographed image on the coordinate system of the second photographed image and $(x_{1(2)},y_{1(2)})$ represents the position at the time when the position $(x_2,y_2)$ of the pixel of the second photographed image is converted into a position where an identical portion of the subject is projected on the coordinate system of the first photographed image. The subscript (2) in the position $(x_{1(2)},y_{1(2)})$ indicates that the position $(x_2,y_2)$ on the coordinate system of the second photographed image is converted into a position on the coordinate system of the first photographed image. A portion identical with the portion of the subject projected in the position $(x_2,y_2)$ of the pixel of the second photographed image is (ideally) projected in the position $(x_{1(2)},y_{1(2)})$ on the coordinate system of the first photographed image.

The first photographed image as the reference image is supplied to the motion detecting circuit 23₂ from the frame memory 22₁. The third photographed image as the target image is supplied to the motion defecting circuit 23₂ from the frame memory 22₃.

Like the motion detecting circuit 23₁, the motion detecting circuit 23₂ detects motion vectors indicating which positions of the first photographed image respective blocks obtained by dividing the third photographed image into plural blocks correspond to. The motion detecting circuit 23₂ calculates, on the basis of the motion vectors, transformation parameters $(a_3,b_3,c_3,d_3,s_3,t_3)$ defining the affine transformation of Equation (4) identical with Equation (2) representing a positional relation between the first photographed image and the third photographed image and supplies the transformation parameters to the arithmetic circuit 24.

$$\begin{pmatrix} x_{1(3)} \\ y_{1(3)} \end{pmatrix} = \begin{pmatrix} a_3 & b_3 \\ c_3 & d_3 \end{pmatrix} \begin{pmatrix} x_3 \\ y_3 \end{pmatrix} + \begin{pmatrix} s_3 \\ t_3 \end{pmatrix} \quad (4)$$

In Equation (4), $(x_3,y_3)$ represents a position of a pixel of the third photographed image on the coordinate system, of the third photographed image and $(x_{1(3)},y_{1(3)})$ represents the position at the time when the position $(x_3,y_3)$ of the pixel of the third photographed image is converted into a position where an identical portion of the subject is projected on the coordinate system of the first photographed image. As in the case of the Equation (3), the subscript (3) in the position $(x_{1(3)},y_{1(3)})$ indicates that the position $(X_3,y_3)$ on the coordinate system of the third photographed image is converted into a position on the coordinate system of the first photographed image.

In the same manner, the motion detecting circuit 23$_{k-1}$ detects a positional relation between the first photographed image and the kth photographed image and supplies the positional relation to the arithmetic circuit 24.

The first photographed image as the reference image is supplied to the motion detecting circuit 23$_{k-1}$ from the frame memory 22₁. The kth photographed image as the target image is supplied to the motion detecting circuit 23$_{k-1}$ from the frame memory 22$_k$.

The motion detecting circuit 23$_{k-1}$ detects motion vectors of respective blocks of the kth photographed image with respect to the first photographed image. The motion detecting circuit 23$_{k-1}$ calculates, on the basis of the motion vectors, transformation parameters $(a_k,b_k,c_k,d_k,s_k,t_k)$ defining the affine transformation of Equation (5) identical with Equation (2) representing a positional relation between the first photographed image and the kth photographed image and supplies the transformation parameters to the arithmetic circuit 24.

$$\begin{pmatrix} x_{1(k)} \\ y_{1(k)} \end{pmatrix} = \begin{pmatrix} a_k & b_k \\ c_k & d_k \end{pmatrix} \begin{pmatrix} x_k \\ y_k \end{pmatrix} + \begin{pmatrix} s_k \\ t_k \end{pmatrix} \quad (5)$$

In Equation (5), $(x_k,y_k)$ represents a position of a pixel of the kth photographed image on the coordinate system of the kth photographed image and $(x_{1(k)},y_{1(k)})$ represents the position at the time when the position $(x_k,y_k)$ of the pixel of the kth photographed image is converted into a position where an identical portion of the subject is projected on the coordinate system of the first photographed image. As in the case of the Equation (3), the subscript (k) in the position $(x_{1(k)},y_{1(k)})$ indicates that the position $(x_k,y_k)$ on the coordinate system of the kth photographed image is converted into a position on the coordinate system of the first photographed image.

The N photographed images are supplied to the arithmetic circuit 24 from the frame memories 22₁ to 22$_N$. The transformation parameters $(a_k,b_k,c_k,d_k,s_k,t_k)$ representing the positional relation between the first photographed image and the kth photographed image are supplied to the arithmetic circuit 24 from the motion detecting circuits 23₁ to 23$_{N-1}$.

The arithmetic circuit 24 calculates the G signal, the R signal, and the B signal as the pixel values of the pixels of an output image using at least the pixel values of the pixels of the photographed images supplied from the frame memories 22₁ to 22$_N$ and the interpolation function that changes according to positions of the pixels of the photographed images after positioning. The positions of the pixels are obtained by performing positioning of the N photographed images on the basis of the transformation parameters $(a_k,b_k,c_k,d_k,s_k,t_k)$ representing the positional relation between each of the second to Kth photographed images supplied from the motion detecting circuits 23₁ to 23$_{N-1}$ and the first photographed image. The arithmetic circuit 24 performs image generation processing for generating an output image and supplies the output image obtained as a result of the image generation processing to the D/A converter 9 or the CODEC 12.

Each of the N photographed images supplied from the A/D converter 6 to the signal processing circuit 7 is an image, one pixel of which has a pixel value of any one of the G signal, the R signal, and the B signal. On the other hand, the output image generated by the arithmetic circuit 24 is an image having three pixel values (color signals) of the G signal, the R signal, and the B signal for one pixel.

The controller 25 performs control of the frame memories 22₁ to 22$_N$, the motion detecting circuits 23₁ to 23$_{N-1}$, the arithmetic circuit 24, and the like in the signal processing circuit 7 in accordance with the control, by the CPU 15.

In the signal processing circuit 7 constituted as described above, in step S3 in FIG. 10, the motion detecting circuit 23 detects transformation parameters as a positional relation among the N photographed images from the A/D converter 6.

Moreover, in the signal processing circuit 7, in step S4 in FIG. 10, the arithmetic circuit 24 calculates the G signal, the R signal, and the B signal as pixel values of pixels of an output image using pixel values of the pixels of the photographed images, the interpolation function that changes according to positions of the pixels of the photographed images after positioning obtained by performing positioning of the N photographed images on the basis of the transformation parameters, and the like. The arithmetic circuit 24 performs the image generation processing for generating an output image.

In other words, in the image generation processing in step S4, the arithmetic circuit 24 generates, from the N photographed images, a photographed image serving as a reference in detecting the positional relation among the N photographed images, i.e., an image in a range of the subject photographed in the first photographed image as an output image.

In generating the output image from the N photographed images, the arithmetic circuit 24 calculates pixel values of respective pixels of the output image by interpolation.

In order to calculate the pixel values of the output image by interpolation in this way, the arithmetic circuit 24 performs positioning for converting (positions of) the pixels of the N photographed images into positions on the output image, i.e., positions on the first photographed image as the reference image such that respective portions of the subject projected on the respective N photographed images coincide with (correspond to) one another.

In the following explanation, a kth photographed image among the N photographed images used for generation of the output image is also referred to as a kth image as appropriate.

In the arithmetic circuit 24, the conversion of the position of the pixels of the N photographed images into the positions on the output image, which are the positions on the first photographed image as the reference image, i.e., the positioning of the N photographed images is performed according to the affine transformation of Equation (2) defined by the transformation parameters calculated by the motion detecting circuit 23 (FIG. 12).

The arithmetic circuit 24 calculates the G signal Lg(i,j) among the pixel values of the pixels in the positions (i,j) on the coordinate system of the output image by interpolation performed by using the G signal Gobs (k,i,j)=Gobs (k,ig,jg) (k=1, 2, ..., N) among the pixel values of the pixels in the positions after the affine transformation obtained by affine-transforming the positions of the pixels of the N photographed images.

Similarly, the arithmetic circuit 24 calculates the R signal Lr(i,j) among the pixel values of the pixels in the positions (i,j) on the coordinate system of the output image by interpolation performed by using the R signal Robs(k,i,j)=Robs (k,ir, jr) among the pixel values of the pixels in the positions after the affine transformation obtained by affine-transforming the positions of the pixels of the N photographed images. The arithmetic circuit 24 calculates the B signal Lb(i,j) among the pixel values of the pixels in the positions (i,j) on the coordinate system of the output image by interpolation performed by using the B signal Bobs(k,i,j)=Bobs(k,ib,jb).

In the coordinate system of the output image, which is the coordinate system of the reference image, a position (i−1,j−1) of an "ith and jth pixel" of the output image is represented as (I',J'). In other words, I'i−1 and J'j−1. I' and J' are integers equal to or larger than 0.

In the following explanation, the coordinate system of the output image which is the coordinate system of the reference image, is also referred to as a reference coordinate system as appropriate. The pixels of the output, image are also referred to as output pixels as appropriate.

As described above, the arithmetic circuit 24 affine-transforms (the positions) of the pixels of the first to Nth images into the positions on the reference coordinate system. The arithmetic circuit 24 calculates a G signal Lg(I',J') of the output pixel in the position (I',J') on the reference coordinate by interpolation performed by using the G signals Gobs(k,ig, jg) in the positions after the affine transformation.

However, accuracy of interpolation is deteriorated if all the G signals Gobs(k,ig,jg) of the pixels in the positrons after the affine transformation onto the reference coordinate system of the pixels of the first to Nth images are used for the interpolation of the G signal Lg(I',J') of the output pixel in the position (I',J') on the reference coordinate system.

Thus, the arithmetic circuit 24 specifies pixels of the first to Nth images, positions of which after the affine transformation onto the reference coordinate system of the pixels of the first to Kth images are near the position (I',J') of the output pixel for interpolating the G signal Lg(I',J'), as pixels used for the interpolation of the G signal Lg (I',J'). The arithmetic circuit 24 interpolates the G signal Lg(I',J') using the G signals Gobs (k,ig,jg) of the pixels of the first to Nth images specified.

Specifically, the arithmetic circuit 24 sets an area near the position (I',J') of the reference coordinate system as a contributing area in which pixels contributing to interpolation of a pixel value of the output pixel in the position (I',J') are present. The arithmetic circuit 24 specifies pixels of the first to Nth images, positions of which after the affine transformation onto the reference coordinate system are in the contributing area, as pixels used for the interpolation of the pixel value of the output pixel in the position (I',J').

Figure 13:
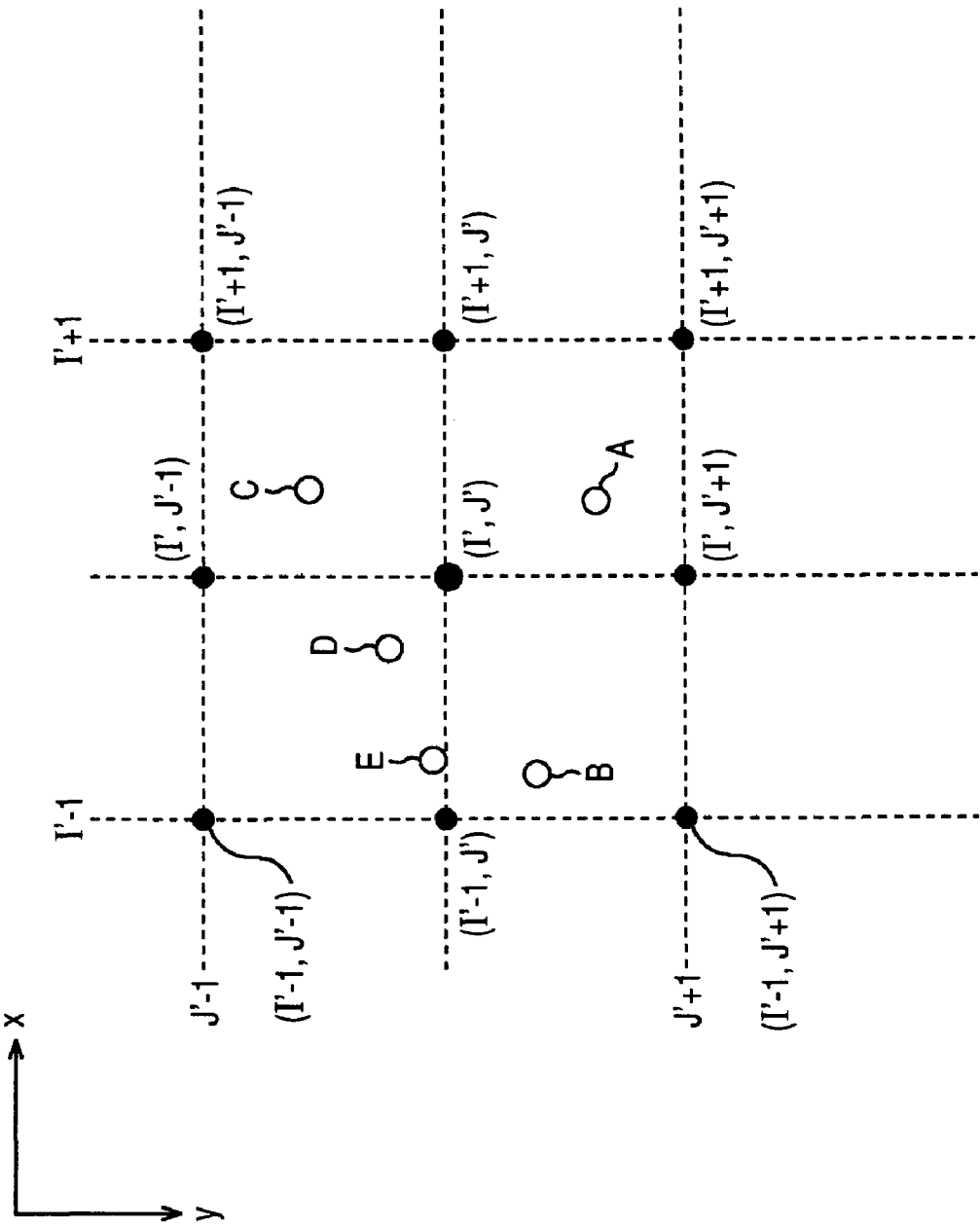
FIG. 13 is a diagram showing a reference coordinate system in which positions of pixels are plotted.

FIG. 13 shows a reference coordinate system in which positions of the pixels of the first to Nth images used for the interpolation of the pixel value of the output, pixel in the position (I',J') by the arithmetic circuit 24 are plotted.

The arithmetic circuit 24 sets, for the position (I',J') on the reference coordinate system, an area of a range 2×2 around the position (I',J') satisfying, for example, an expression I'−1≦x<I'+1 and an expression J'−1≦y<J'+1 as a contributing area. The arithmetic circuit 24 specifies pixels of the first to Nth images, positions of which after the affine transformation onto the reference coordinate system are in the contributing area, as pixels used for the interpolation of the G signal Lg(I',J') of the output pixel.

In other words, the arithmetic circuit 24 calculates, for the position (I',J'), all sets of integers k, ig, and jg, with which the positions (x,y) on the reference coordinate system obtained by affine-transforming the position (ig−1, jg−1) with the transformation parameters $(a_k, b_k, c_k, d_k, s_k, t_k)$ satisfy the expression I'−1≦x<I'+1 and the expression J'−1≦y<J'+1. The arithmetic circuit 24 specifies pixels represented by (k,ig, jg) as pixels used for the interpolation of the G signal Lg (I',J') of the output, pixel.

In FIG. 13, there are five G pixels A, B, C, D, and E as pixels, positions of which after the affine transformation onto the reference coordinate system are in the contributing area in the range of the expression I'−1≦x<I'+1 and the expression J'−1≦y<J'+1, among pixels having the G signals as pixels values (herein after also referred to as G pixels as appropriate) in the pixels of the first to Nth images.

Therefore, the arithmetic circuit 24 specifies the five G pixels A to E as pixels used for the interpolation of the G signal Lg(I',J').

The arithmetic circuit 24 interpolates the G signal Lg(I',J') of the output pixel in the position (I',J') using the pixel values (G signals) Gobs(k,ig,jg) of the respective G pixels A to E.

In FIG. 13, the area of the range of 2×2 around the position (I',J') is adopted as the contributing area for the position (I',J').

However, the contributing area for the position (I',J') only has to be an area near the position (I',J') and is not limited to the area of the range of 2×2 around the position (I',J'). In other words, in FIG. 13, as the contributing area for the position (I',J'), other than the area of the range of 2×2 around the position (I'd J'), it is possible to adopt, for example, an area of a range of 4×4 around the position (I',J'), i.e., an area satisfying an expression I'−2≦x<I'+2 and an expression J'−2≦y<J'+2, and an area of a range of 1×1.

An interpolation method of interpolating the G signal Lg(I',J') in the position (I',J') using the pixel values (G signals) Gobs(k,ig,jg) of the G pixels, the positions of which after the affine transformation onto the reference coordinate is in the contributing area, among the G pixels of the first to Nth images will be explained with reference to FIG. 14.

Figure 14:
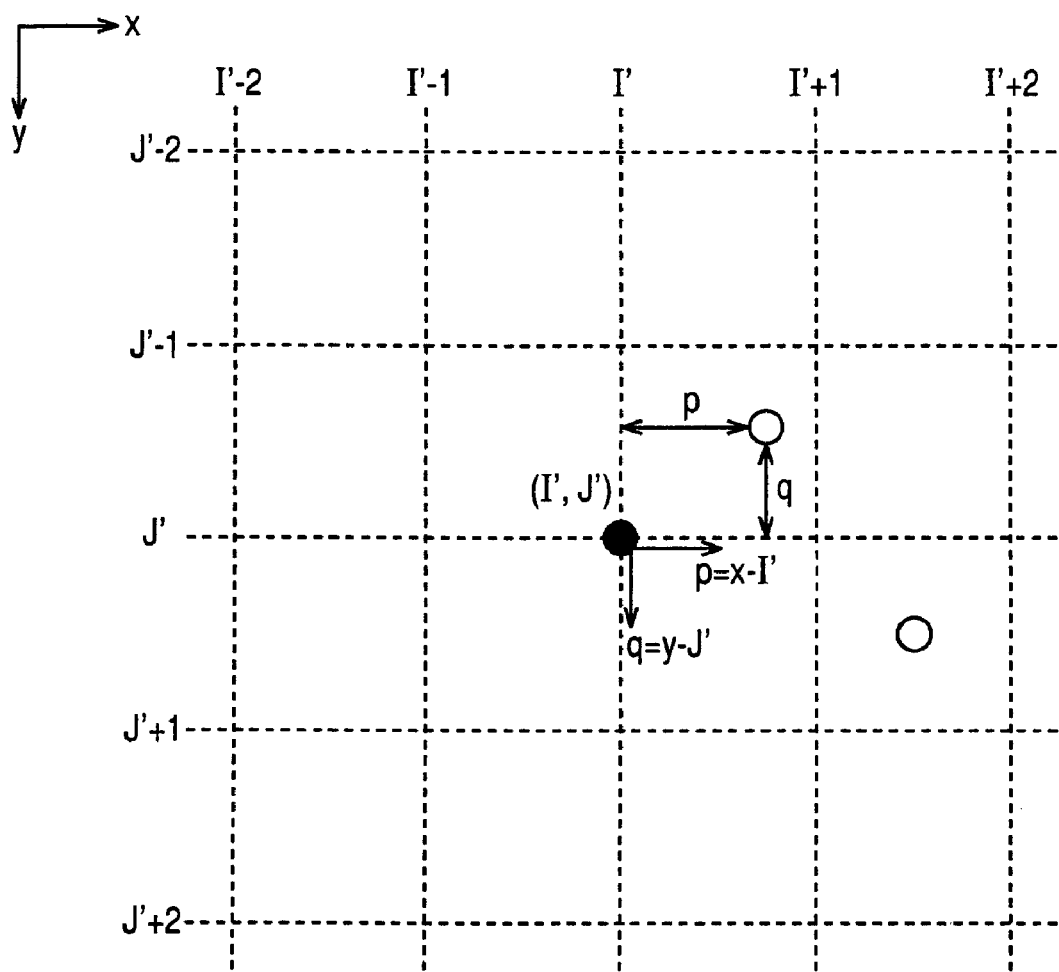
FIG. 14 is a diagram for explaining an interpolation method of interpolating a G signal Lg (I',J') in a position (I',J')

In FIG. 14 (and in the FIG. 15 described later), an area of a range of 4×4 is set as the contributing area.

The arithmetic circuit 24 calculates the G signal Lg(I',J') of the output pixel in the position (I',J') by interpolation indicated by the following equation using the pixel values Gobs (k,ig,jg) of the G pixels in the contributing area for the position (I',J') and an interpolation function that changes according to the positions of the G pixels in the contributing area.

$$Lg(I', J') = \frac{\sum \{w((x, y), (I', J')) \times Gobs(k, ig, jg)\}}{\sum w((x, y), (I', J'))} \quad (6)$$

Σ in Equation (6) indicates a sum for all the G pixels, the positions of which after the positioning of the N photographed images are in the contributing area. In other words, Σ indicates a sum for sets of (k,ig,jg), with which the positions (x,y) on the reference coordinate system obtained by affine-transforming the positions (ig,jg) of the G pixels of the photographed images with the transformation parameters $(a_k,b_k,c_k,d_k,s_k,t_k)$ satisfy the expression I'−2≦x<I'+2 and the expression J'−2≦y<J'+2.

In Equation (6), w((x,y), (I',J')) is an interpolation function having, as arguments, the positions (x,y) on the reference coordinate obtained by affine-transforming the positions (ig, jg) of the G pixels of the photographed images with the transformation parameters $(a_k,b_k,c_k,d_k,s_k,t_k)$ and the position (I',J') of the pixel for interpolating the G signal Lg(I',J'). In this way, the interpolation function w((x,y),(I',J')) has, as the argument, the positions (x,y) on the reference coordinate obtained by affine-transforming the positions (ig,jg) of the G pixels of the photographed images with the transformation parameters $(a_k,b_k,c_k,d_k,s_k,t_k)$, i.e., the positions (x,y) of the G pixels after the positioning of the photographed images. Thus, the interpolation function w((x,y),(I',J')) is a function that changes according to the positions (x,y) of the G pixels after the positioning of the photographed images.

For example, when a variable "p" is defined by an equation p=x−I' and a variable "q" is defined by an equation q=y−J', as shown in FIG. 14, (p,q) indicates a relative position of the G pixels after the positioning of the photographed images with the position (I',J') sot as a reference.

The arithmetic circuit 24 calculates an R signal Lr(I',J') and a B signal Lb(I',J') of the output pixel in the position (I',J') by interpolation in the same manner as the calculation of the G signal Lg (I',J'). The arithmetic circuit 24 calculates the R signal Lr(I',J') and the B signal Lb(I',J') in accordance with Equation (7) and Equation (8) similar to Equation (6).

$$Lr(I', J') = \frac{\sum \{w((x, y), (I', J')) \times Robs(k, ir, jr)\}}{\sum w((x, y), (I', J'))} \quad (7)$$

$$Lb(I', J') = \frac{\sum \{w((x, y), (I', J')) \times Bobs(k, ib, jb)\}}{\sum w((x, y), (I', J'))} \quad (8)$$

Σ in Equation (7) indicates a sum for all pixels having only the R signal as pixel values (herein after also referred to as R pixels as appropriate), positions of which after the positioning of the N photographed images are in the contributing area. In other words, Σ indicates a sum for sets of (k,ir,jr), with which the positions (x,y) on the reference coordinate system obtained by affine-trans forming the positions (ir, jr) of the R pixels of the photographed images with the transformation parameters $(a_k,b_k,c_k,d_k,s_k,t_k)$ satisfy the expression I'−2≦x<I'+2 and the expression J'−2≦y<J'+2.

Σ in Equation (8) indicates a sum for all pixels having only the B signal as pixel values (herein after also referred to as B pixels as appropriate), positions of which after the positioning of the N photographed images are in the contributing area. In other words, Σ indicates a sum for sets of (k,ib,jb), with which the positions (x,y) on the reference coordinate system obtained by affine-transforming the positions (ib, ib) of the E pixels of the photographed images with the transformation parameters $(a_k,b_k,c_k,d_k,s_k,t_k)$ satisfy the expression I'−2≦x<I'+2 and the expression J'−2≦y<J'+2.

Figure 15:
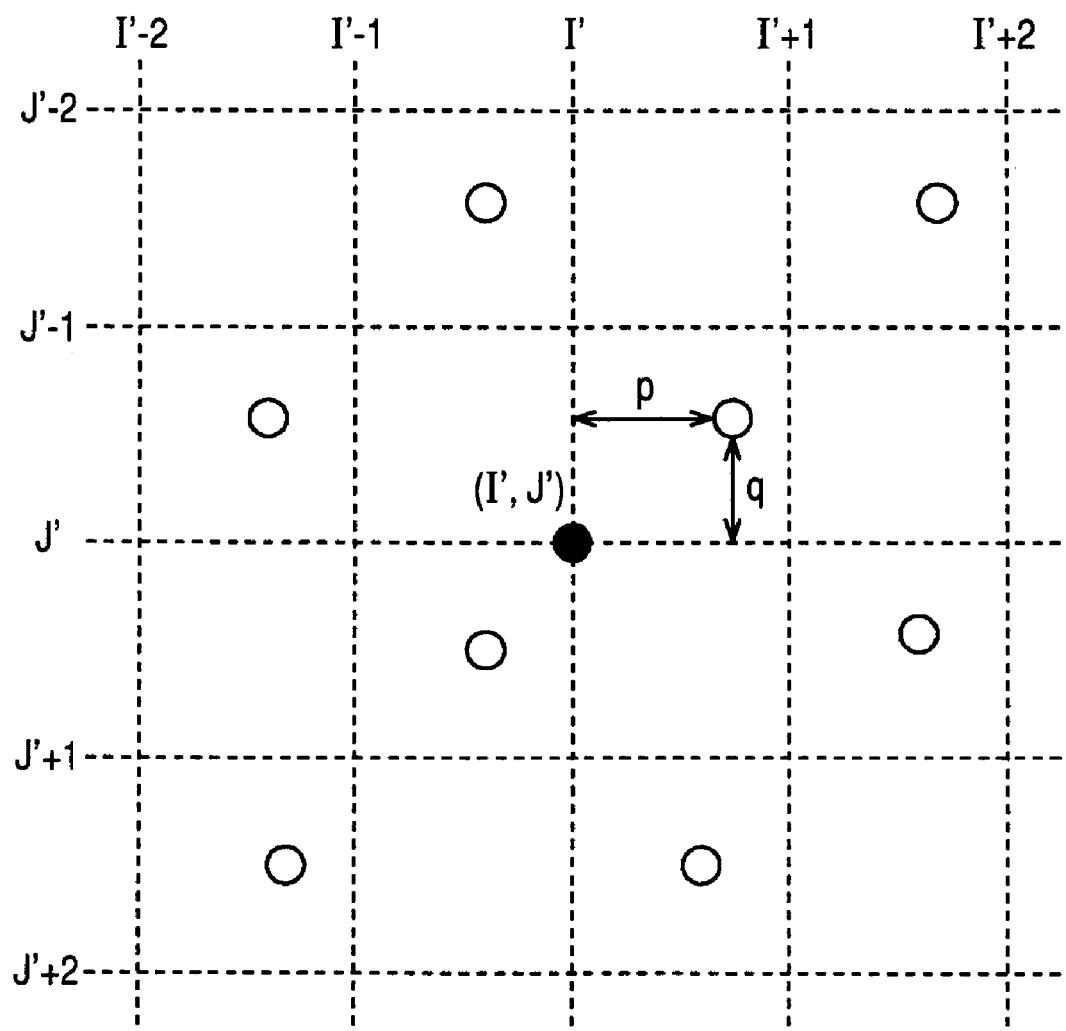
FIG. 15 is a diagram showing eight G pixels present in a 4×4 contributing area of a photographed image of the Bayer array.

Since the imaging element 4 of the Bayer array is adopted, if the photographed images after the positioning overlap over the entire contributing area of 4×4 for the position (I',J'), for example, as indicated by circles in FIG. 15, eight pixels are present as G pixels for one photographed image after the positioning in the contributing area. On the other hand, four pixels are present as R pixels and B pixels, respectively, for one photographed image after the positioning in the contributing area.

The interpolation function w((x,y), (I',J')) of Equations (6) to (8) will be explained.

As described above, the variable "p" is defied by the equation p=x−I', the variable "q" is defined by the equation q=y−J', and a function f(p,q) having the variables "p" and "q" as arguments is adopted as the interpolation function w((x,y), (I',J')).

In this case, it is possible to adopt, for example, a bilinear function and a bicubic function as the interpolation function f(p,q).

A bilinear function (p,g) is a product of two linear functions Linear (z) and represented by, for example, Equation (9).

$$f(p, q) = \quad (9)$$
$$\text{Bilinear}(p, q) = \text{Linear}(p) \times \text{Linear}(q),$$
$$\text{Linear}(z) = \begin{cases} z+1 & (-1 < z \le 0) \\ -z+1 & (0 \le z < 1) \\ 0 & (1 \le |z|) \end{cases}$$

Figure 16:
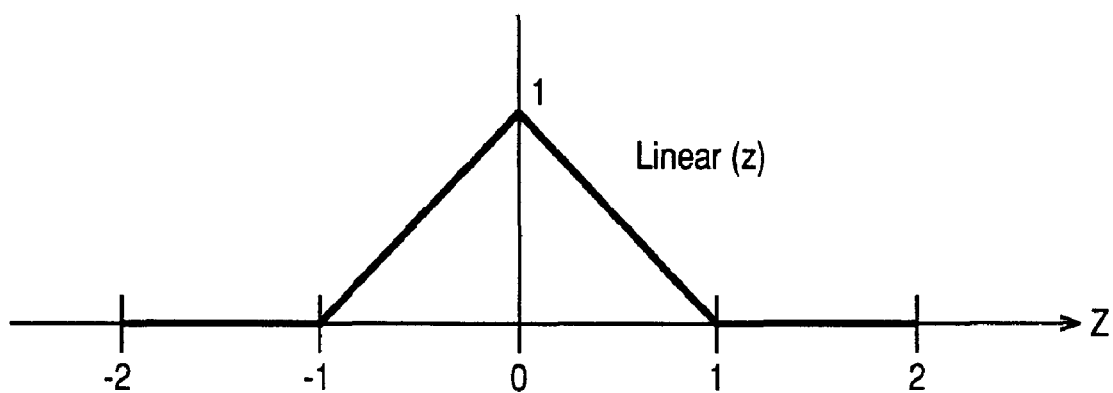
FIG. 16 is a waveform chart showing a linear function Linear(z)

The linear function Linear (s) of Equation (9) is shown in FIG. 16.

The bicubic function Bicubic(p,q) is a product of two cubic functions Cubic(z) and represented by, for example, Equation (10).

$$f(p, q) =$$ (10)

$$\text{Bicubic}(p, q) = \text{Cubic}(p) \times \text{Cubic}(q),$$

$$\text{Cubic}(z) = \begin{cases} |z|^3 - 2|z|^2 + 1 & (|z| < 1) \\ -|z|^3 + 5|z|^2 - 8|z| + 4 & (1 \le |z| < 2) \\ 0 & (2 \le |z|) \end{cases}$$

Figure 17:
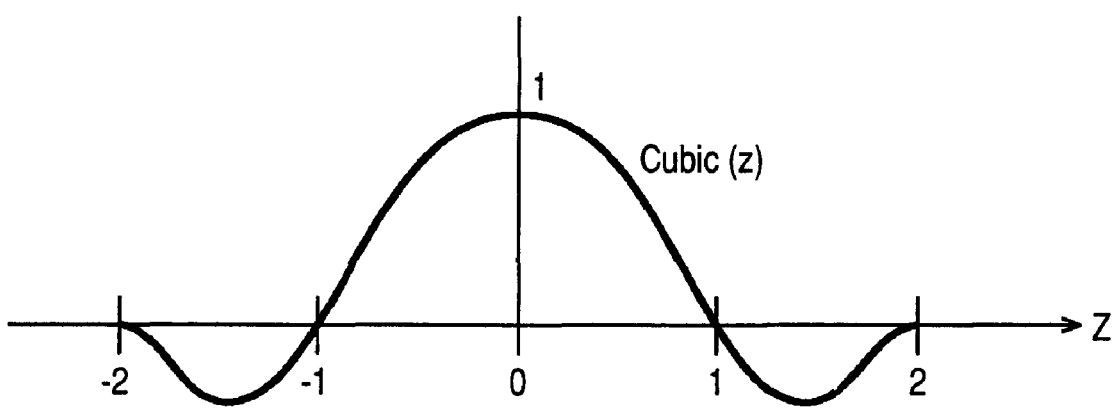
FIG. 17 is a waveform chart showing a cubic function Cubic (z)

The cubic function Cubic(z) of Equation (10) is shown in FIG. 17.

For example, the bilinear function of Equation (9) is adopted as the interpolation function f(p,q), the G signal, the R signal, or the B signal, which is a pixel value of a pixel in the position (i,j) of the kth image among the N photographed images, is represented as inputPixel (k,i,j), and the G signal, the R signal, or the B signal, which is a pixel value of an output pixel in the position (I',J'), is represented as outputPixel (I',J'). Then, Equations (6) to (8) can be represented by Equation (11).

$$\text{outputPixel}(I', J') = \sum_{\substack{\text{All photographed} \\ \text{images } k}} \left( \frac{\sum_{\substack{\text{All pixels }(i,j) \text{ of} \\ \text{photographed images } k}} \text{Bilinear}(p(k,i,j), q(k,i,j)) \times \text{inputPixel}(k, i, j)}{\sum_{\substack{\text{All pixels }(i,j) \text{ of} \\ \text{photographed images } k}} \text{Bilinear}(p(k, i, j), q(k, i, j))} \right)$$ (11)

However, in Equation (11), p(k,i,j) and q(k,i,j) are represented by the following equation with a position (a position on the reference coordinate system) after the positioning of the pixel in the position (i,j) of the kth image set as (x,y).

$$p(k,i,j) = x - I'$$

$$q(k,i,j) = y - J'$$ (12)

In Equation (11), Σ before parentheses on the right-hand side indicates a sum for the N photographed images.

Moreover, in Equation (11), the G signal among the G signal, the R signal, and the E signal is calculated as the pixel value outputPixel(I',J') of the output pixel in the position (I',J'). In this case, Σ of the denominator and the numerator of the fraction on the right-hand side of Equation (11) indicates a sum for all the G pixels in the contributing area among the pixels of the N photographed images after the positioning. Input Pixel (k,i,j) indicates a pixel value of the G pixel in the position (i,j) of the kth image, a position of which after the positioning is a position in the contributing area.

In Equation (11), the R signal is calculated as the pixel value outputPixel (I',J') of the output pixel in the position (I',J'). In this case, Σ of the denominator and the numerator of the fraction on the right-hand side of Equation (11) indicates a sum for all the R pixels in the contributing area among the pixels of the N photographed, images after the positioning. InputPixel (k,i,j) indicates a pixel value of the B pixel in the position (i,j) of the kth image, a position of which after the positioning is a position in the contributing area.

Moreover, in Equation (11), the B signal is calculated as the pixel value outputPixel(I',J') of the output pixel in the position (I',J'). In this case, Σ of the denominator and the numerator of the fraction on the right-hand, side of Equation (11) indicates a sum for all the B pixels in the contributing area among the pixels of the N photographed images after the positioning. InputPixel (k,i,j) indicates a pixel value of the B pixel in the position (i,j) of the kth image, a position of which after the positioning is a position in the contributing area.

When, for example, the G signal among the G signal, the R signal, and the B signal of the pixel value outputPixel(I',J') of the output pixel is calculated, only pixel values of the G pixels among the pixels of the photographed images, i.e., only the G signals are used. However, it is also possible to calculates the G signal of the pixel value outputPixel(I',J') of the output pixel using the R signals as the pixel values of the R pixels or the B signals as the pixel values of the B pixels other than the G signals as the pixel values of the G pixels among the pixels of the photographed images. The R signal and the B signal of the pixel value outputPixel(I',J') of the output pixel are calculated in the same manner.

The image generation processing in step 34 in FIG. 10 for generating an output image by interpolating the G signal, the R signal, and the B signal as the pixel values of the output pixel will be explained with reference to a flowchart in FIG. 18.

First, in step S71, the arithmetic circuit 24 selects, with a certain output pixel on the reference coordinate system, set as a pixel of interest, a position (I',J') of the pixel of interest as a position of interest (I',J').

The arithmetic circuit 24 proceeds from step S71 to step S72. The arithmetic circuit 24 calculates sets of (k,ig,jg), with which the positions (x,y) on the reference coordinate system obtained by affine-transforming the positions (ig−1,jg−1) of the G pixel of the kth image (a pixel of the G signal Gobs(k, ig,jg)) with the transformation parameters $(a_k, b_k, c_k, d_k, s_k, t_k)$ satisfy the expression I'−2≦x<I'+2 and the expression J'2≦y<J'+2 which represent the contributing area for the position of interest (I',J'), for all of the first to Nth images. The arithmetic circuit 24 specifies the G pixels represented by (k,ig,jg) as contributing pixels contributing to interpolation of the pixel of interest and proceeds to step S73.

The transformation parameters $(a_k, b_k, c_k, d_k, s_k, t_k)$ in affine-transforming the position of the G pixel of the kth image to the position (x,y) on the reference coordinate system is supplied from the motion detecting circuit $23_{k-1}$ to the arithmetic circuit 24. For the first image as the reference image, i.e., for the case of k=1, (1,0,0,1,0,0) is sued as the transformation parameters $(a_1, b_1, c_1, d_1, s_1, t_1)$. Therefore, the first image is not substantially affine-transformed.

The position (x,y) after the affine transformation of the position of the pixel of the kth image onto the reference coordinate system is also referred to as a transformed position (x,y) as appropriate.

In step S73, the arithmetic circuit 24 calculates Equation (6) (Equation (11)) using all the sets of (k,ig,jg) calculated in step S72 to calculate a G signal Lg(I',J') (outputPixel(I',J')) of the pixel value of the pixel of interest and proceeds to step S74.

The arithmetic circuit 24 calculates the G signal Lg(I',J') (outputPixel (I',J')) of the pixel value of the pixel of interest by interpolation of Equation (6) (Equation (11)) using the G signals Gobs(k,ig,jg) as all pixel values of the contributing pixels specified by (k,ig,jg) calculated in step S72 and a bilinear function Bilinear (p(k,i,j),q(k,i,j)) as the interpolation function w((x,y),(I',J')) that changes according to the transformed position (x,y).

In step S74, the arithmetic circuit 24 calculates sets of (k,ir,jr), with which the positions (x,y) on the reference coordinate system obtained by affine-transforming the positions (ir−1, jr−1) of the R pixel of the kth image (a pixel of the R signal Robs (k,ir,jr)) with the transformation parameters ($a_k$, $b_k,c_k,d_k,s_k,t_k$) satisfy the expression I'−2≦x<I'+2 and the expression J'−2≦y<J'+2 which represent the contributing area for the position of interest (I',J'), for all of the first to Nth images. The arithmetic circuit 24 specifies the R pixels represented by (k,ir,jr) as contributing pixels contributing to interpolation of the pixel of interest and proceeds to step S75.

In step S75, the arithmetic circuit 24 calculates Equation (7) (Equation (11)) using all the sets of (k,ir,jr) calculated in step 374 to calculate an R signal Lr(I',J') (outputPixel(I',J')) of the pixel value of the pixel of interest and proceeds to step S76.

The arithmetic circuit 24 calculates the R signal Lr (I',J') (outputPixel (I',J')) of the pixel value of the pixel of interest by interpolation of Equation (7) (Equation (11)) using the R signals Robs(k,ir,jr) as all pixel values of the contributing pixels specified by (k,ir,jr) calculated in step S74 and a bilinear function Bilinear (p(k,i,j),q(k,i,j)) as the interpolation function w((x,y),(I',J')) that changes according to the transformed position (x,y).

In step S76, the arithmetic circuit 24 calculates sets of (k,ib,jb), with which the positions (x,y) on the reference coordinate system obtained, by affine-transforming the positions (ib−1,jb−1) of the B pixel of the kth image (a pixel of the E signal Bobs(k,ib,jb)) with the transformation parameters ($a_k$, $b_k,c_k,d_k,s_k,t_k$) satisfy the expression I'−2≦x<I'+2 and the expression J'−2≦y<J'+2 which represent the contributing area for the position of interest (I',J'), for all of the first to Nth images. The arithmetic circuit 24 specifies the B pixels represented by (k,ib,jb) as contributing pixels contributing to interpolation of the pixel of interest and proceeds to step S77.

In step S77, the arithmetic circuit 24 calculates Equation (3) (Equation (11)) using all the sets of (k,ib,jb) calculated in step S76 to calculate a B signal Lb(I',J') (outputPixel(I',J')) of the pixel value of the pixel of interest and proceeds to step S78.

The arithmetic circuit 24 calculates the B signal Lb (I',J') (outputPixel (I',J')) of the pixel value of the pixel of interest by interpolation of Equation (8) (Equation (11)) using the 3 signals Gobs(k,ib,jb) as all pixel values of the contributing pixels specified by (k,ib,jb) calculated in step S76 and a bilinear function Bilinear (p(k,i,j),q(k,i,j)) as the interpolation function w((x,y),(I',J')) that changes according to the transformed position (x,y).

In step S78, the arithmetic circuit 24 determines whether all the output pixels of the output image have been set as the pixel of interest, i.e., whether the G signal Lg(I',J'), the R signal Lr(I',J'), and the B signal Lb(I',J'), which are the pixel values of all the output pixels of the output image, have been calculated.

When it is determined in step S78 that there is an output pixel that has not been set as the pixel of interest, the arithmetic circuit 24 returns to step S71 and the processing in steps S71 to S78 is repeated. The arithmetic circuit 24 sets the output pixel, which has not been set as the pixel of interest yet, as a new pixel of interest and calculates the G signal Lg(I',J'), the E signal Lr(I',J'), an a the B signal Lb(I',J') of the new pixel of interest.

On the other hand, when it is determined in step S78 that all the output pixels have been set as the pixel of interest, the arithmetic circuit 24 proceeds to step 379. The arithmetic circuit 24 generates an output image having the G signal Lg(I',J'), the R signal Lr(I',J'), and the B signal Lb(I',J') calculated for all the output pixels as pixel values, supplies the output image to the D/A converter 9 or the CODEC 12, and returns to the start of the processing.

As described above, the positional relation among the plural photographed images obtained by high-speed imaging is detected, the pixel values of the output pixels are calculated using the pixel values of the plural photographed images after the positioning subjected to the positioning on the basis of the positional relation and the interpolation function that changes according to the positions of the pixels of the plural photographed images after the positioning, and the output image is generated from the pixel values. Consequently, it is possible to obtain a clear output image without camera shake.

As explained with reference to FIG. 18, when an output image is generated using the N photographed images, if a moving object appears in the photographed images, an unnatural output image in which, for example, sipper noise, false colors, and a lost area appear may foe obtained.

Thus, the arithmetic circuit 24 (FIG. 12) determines whether an output pixel is a motion pixel, which is a pixel in an area in which a moving subject appears, and adjusts a high-pass characteristic of an interpolation function used for interpolation of the output pixel on the basis of a result of the determination on whether the output pixel is the motion pixel. Consequently, it is possible to reduce unnaturalness of the output image caused by the moving object in the photographed image.

In the arithmetic circuit 24, the determination on whether the output pixel is the motion pixel is performed, for example, as described below.

The arithmetic circuit 24 sets a near area in a range near from the position of the pixel of interest of the output image in the photographed images after the positioning; as a determination area used for determining whether the pixel of interest is the motion pixel. The arithmetic circuit 24 determines whether the pixel of interest is the motion pixel on the basis of pixel values of pixels in the determination area among the pixels of the photographed, images after the positioning.

Figure 19:
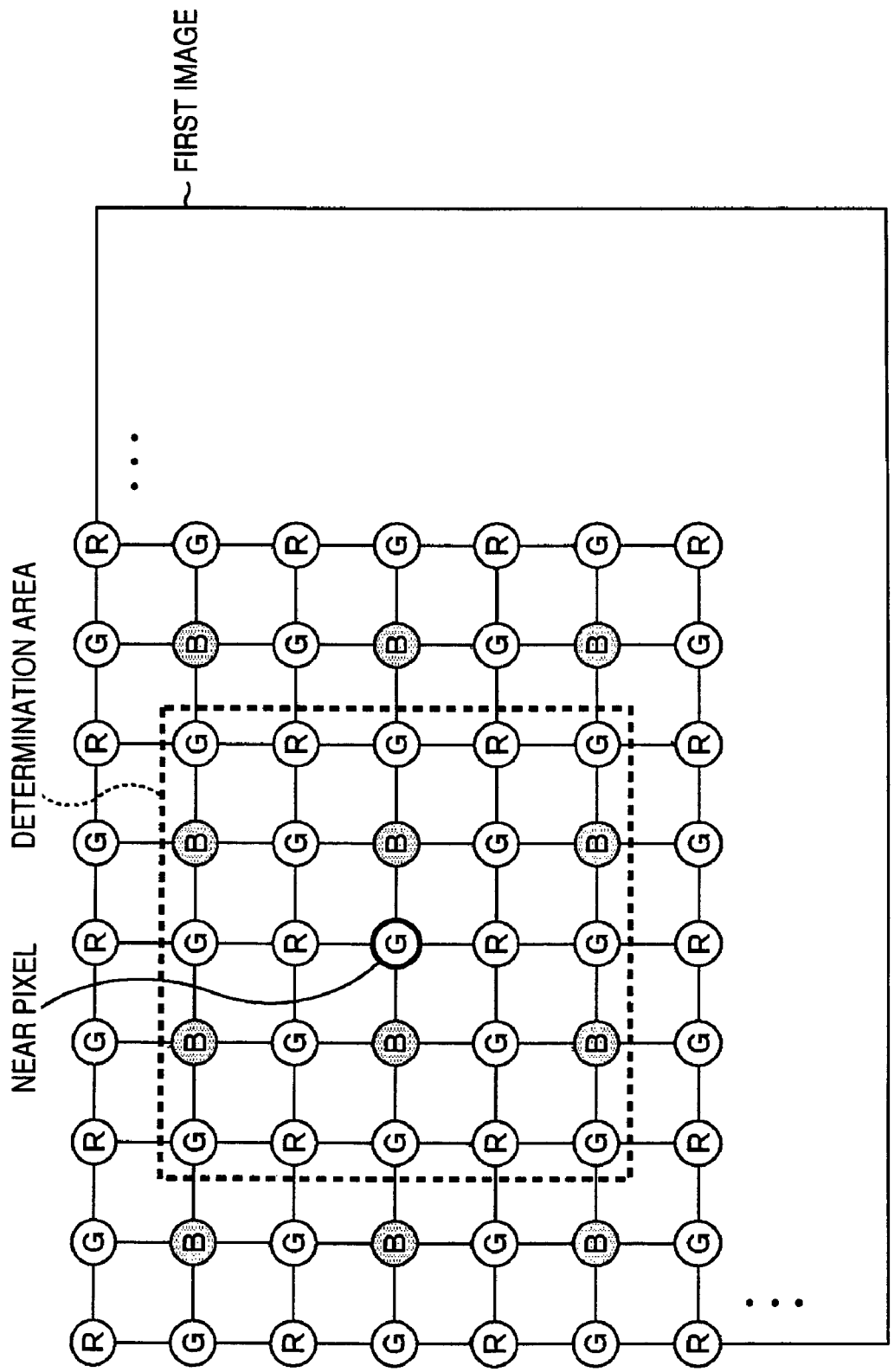
FIG. 19 is a diagram showing a determination area for a first image after positioning.
Figure 20:
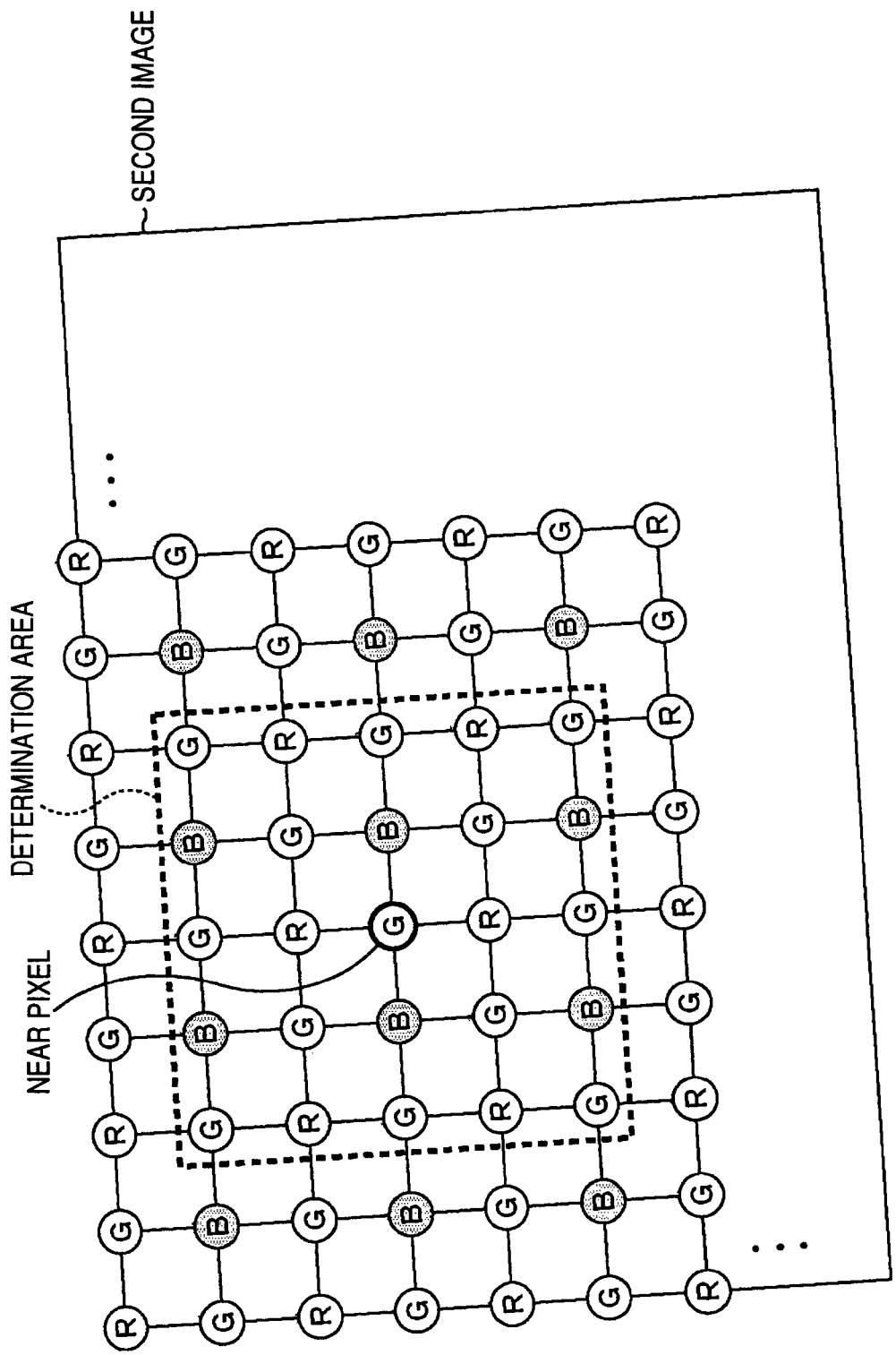
FIG. 20 is a diagram showing a determination area for a second image after positioning.

Specifically, for example, in order to simplify the explanation, it is assumed that an output image is generated from two photographed images, a first image and a second image. As shown in FIG. 19, the arithmetic circuit 24 sets an area of 5×5 pixels around a pixel in a position nearest from the position of the pixel of interest among pixels of the first, image as a determination area for the first, image. As shown in FIG. 20, the arithmetic circuit 24 sets an area of 5×5 pixels around a pixel in a position nearest from the position of the pixel of interest among pixels of the second image as a determination area for the second image. The arithmetic circuit 24 determines whether the pixel of interest is the motion pixel on the basis of pixel values of the 5×5 pixels in the determination areas for each of the first, image and the second image.

Figure 21:
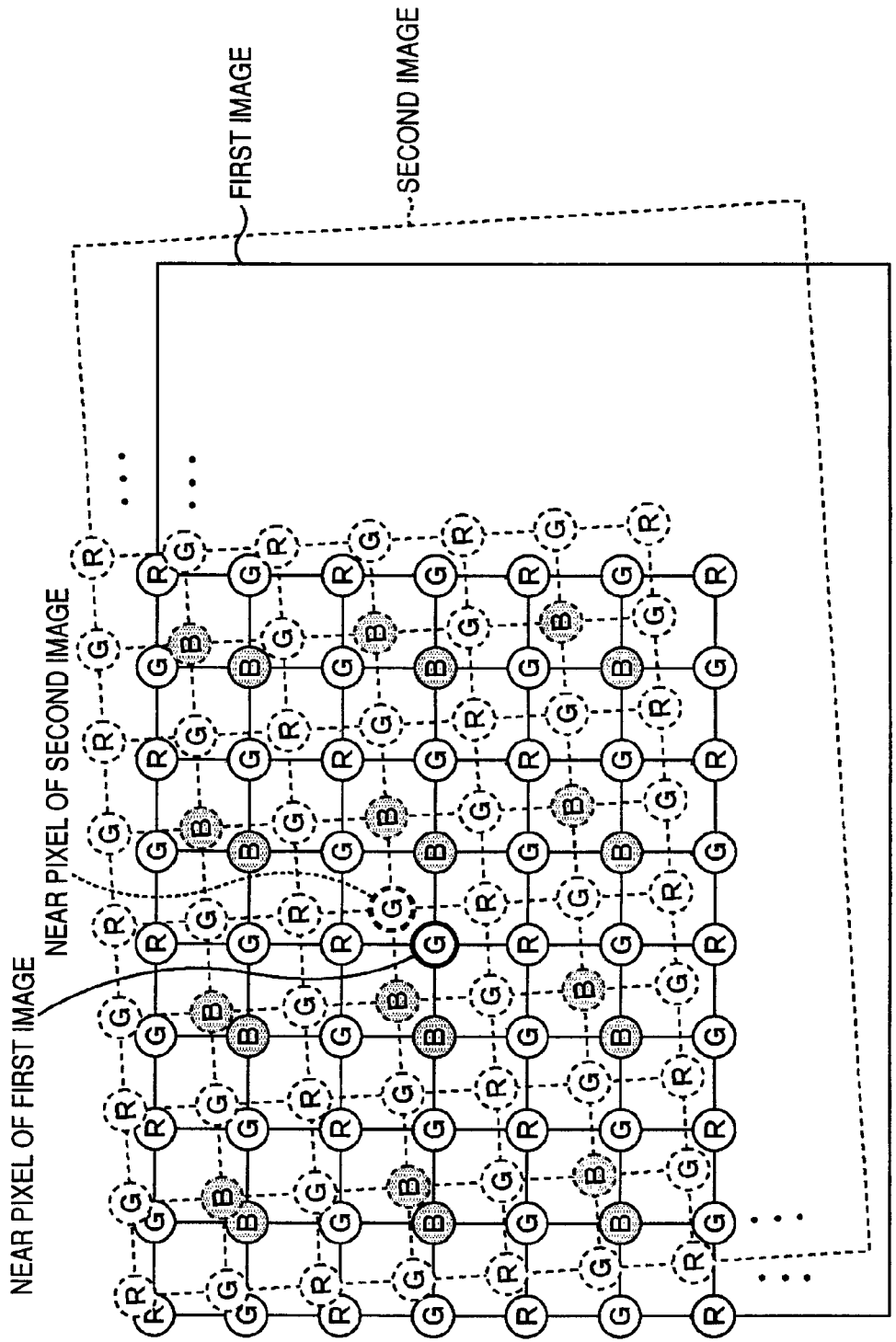
FIG. 21 is a diagram showing pixels of the first image and the second image after the positioning.

FIG. 19 shows the pixels of the first image after the positioning. FIG. 20 shows the pixels of the second image after the positioning. FIG. 21 shows the pixels of both the first image and the second image after the positioning.

As shown in FIG. 21, positions of the pixels of the first image after the positioning and positions of the pixels of the second image after the positioning do not always coincide with each, other. Thus, it is difficult to compare pixel values of the first image after the positioning and pixel values of the second image after the positioning by a unit of pixel.

Thus, as shown in FIG. 19, the arithmetic circuit 24 sets an area of 5×5 pixels around a near pixel, which is a pixel in a position nearest to the pixel of interest, among the pixels of the first image after the positioning as a determination area for the first image. As shown in FIG. 20, the arithmetic circuit 24 sets an area of 5×5 pixels around, a near pixel, which is a pixel, in a position nearest to the pixel of interest, among pixels of the second, image after the positioning as a determination area for the second image. The arithmetic circuit 24 determines whether the output pixel is the motion pixel by comparing the pixel values by a unit of the determination area.

Specifically, a total value (a sum) of the pixel values of the 5×5 pixels in the determination area for the first image in FIG. 19 is represented as reg1, a total value of the pixel values of the 5×5 pixels in the determination area for the second image in FIG. 20 is represented as reg2, and a predetermined threshold is represented as ratioTH. The arithmetic circuit 24 determines whether the pixel of interest is the motion pixel in accordance with, for example, a rule (R1) described below.

$$\begin{aligned}&\text{if(reg1>reg2) \{}\\&\quad\text{reg1/reg2>ratioTH}\\&\text{\}else\{}\\&\quad\text{reg2/reg1>ratioTH}\\&\text{\}}\end{aligned} \quad (R1)$$

In the rule (R1), when the total value reg1 of the pixel values in the determination area for the first image is larger than the total value reg2 of the pixel values in the determination area for the second image, if reg1/reg2 is larger than the threshold ratioTH, it is determined that the output pixel is the motion pixel. If reg1/reg2 is not larger than the threshold ratioTH, it is determined that the output pixel is not the motion pixel.

In the rule (R1), when the total value reg1 of the pixel values in the determination area for the first image is not larger than the total value reg2 of the pixel values in the determination area for the second image, if reg2/reg1 is larger than the threshold ratioTH, it is determined that the output pixel is the motion pixel. If reg2/reg1 is not larger than the threshold ratioTH, it is determined that the output pixel is not the motion pixel.

Besides, the arithmetic circuit 24 can determine whether the pixel of interest is the motion pixel in accordance with, for example, the following rule (R2) for comparing a difference absolute value |reg1−reg2| between the total value real and the total value reg2 with a threshold absTH.

$$|\text{reg1}-\text{reg2}|>\text{absTH} \quad (R2)$$

According to the rule (R2), if the difference absolute value |reg1−reg2| is larger than the threshold absTH, it is determined that the pixel of interest is the motion pixel. If the difference absolute value |reg1−reg2| is not larger than the threshold absTH, it is determined that the pixel of interest is not the motion pixel.

In the above-mentioned, case, in order to simplify the explanation, the output image is generated from the two photographed images, the first image and the second image, as the N photographed image. However, when an output image is generated from two or more photographed images, with distribution of total values of pixel values of pixels in determination areas for the respective N photographed images set as dev and a predetermined threshold set as devTH, the arithmetic circuit 24 can determine whether the pixel of interest is the motion pixel in accordance with the following rule (R3).

$$\text{dev}>\text{devTH} \quad (R3)$$

According to the rule (R3), if the distribution dev is larger than the threshold devTH, it is determined that the pixel of interest is the motion pixel. If the distribution dev is not larger than the threshold devTH, it is determined that the pixel of interest is not the motion pixel.

Besides, for example, with a maximum value of the total value of the pixel values of the pixels in the determination area of the respective N photographed images set as maxReg, a minimum value of the total value set as minReg, and a threshold set as diffTH, the arithmetic circuit 24 can determine whether the pixel of interest is the motion pixel in accordance with the following rule (R4).

$$\text{maxReg}-\text{minReg}>\text{diffTH} \quad (R4)$$

According to the rule (R4), if a difference maxReg−minReg between the maximum value maxReg and the minimum value minReg is larger than the threshold diffTH, it is determined that the pixel of interest is the motion pixel. If the difference maxReg−minReg is not larger than the threshold diffTH, it is determined that the pixel of interest is not the motion pixel.

In the above-mentioned case, the 5×5 pixels around the near pixel, which is the pixel in the position nearest to the position of the pixel of interest, among the pixels of the photographed images are set as the determination area. However, a size of the determination area is not limited to the 5×5 pixels. It is possible to determine, for example, by performing experiments, a size with which highest accuracy of determination on whether the pixel of interest is the motion pixel is obtained as the size of the determination area.

As the total value of the pixel values of the pixels in the determination area, it is also possible to adopt a total value of all the G signals as the pixel values of the G pixels, the R signals as the pixel values of the R pixels, and the B signals as the pixel, values of the B pixels in the determination area. It is also possible to adopt a total value of only pixel values (color signals) of pixels having a color signal of a type identical with the near pixel (in FIGS. 19 and 20, the G signals).

Moreover, as the total value of the pixel values of the pixels in the determination area, it is also possible to adopt a total value of pixel values obtained by converting the pixel values of the pixels in the determination area into appropriate color spaces (e.g., a luminance signal Y in a YUV space).

A method of adjusting the high-pass characteristic of the interpolation function on the basis of a result of the determination on whether the pixel of interest of the output image is the motion picture and interpolating the pixel of interest will be explained.

As the interpolation function, for example, a bilinear function is adopted.

When the high-pass characteristic of the interpolation function is adjusted on the basis of a result of the determination on whether the pixel of interest is the motion pixel to interpolate the pixel of interest, as a bilinear function Bilinear(x,y) as the interpolation function, for example, a bilinear function Bilinear(x,y) represented by Equation (13) is adopted.

$$\text{Bilinear}(x,y) = \text{Linear}\left(\frac{x}{scaleX}\right) \times \text{Linear}\left(\frac{y}{scaleY}\right) \quad (13)$$

In Equation (13), scaleX and scaleY are filter parameters for adjusting a high-pass characteristic of the bilinear function Bilinear(x,y) as the interpolation function. As the filter parameters scaleX and scaleY are larger, an effect of the interpolation function as a low-pass filter is larger. In other words, as the filter parameters scaleX and scaleY are larger, the interpolation function is a low-pass filter that limits higher-frequency components.

When a moving object is not in the photographed images, it is desirable to set the filter parameters scaleX and scaleY small to thereby maintain high-frequency components such as edges in the photographed images such that the interpolation function functions as a low-pass filter with which artifact is not caused in an output image.

However, when a moving object appears in the photographed images, if the filter parameter scaleX or scaleX is small, zipper noise and false colors explained with reference to FIGS. 2 and 6 tend to occur in a portion in which the moving object appears.

Thus, when the pixel of interest is not the motion pixel, the arithmetic circuit 24 maintains the high-frequency components such as the edges by setting the filter parameters scaleX and scaleY small. On the other hand, when the pixel of interest is the motion pixel, the arithmetic circuit 24 set the effect of the interpolation function as the low-pass filter large by setting the filter parameters scaleX and scaleY large to prevent (reduce) the occurrence of zipper noise and false colors.

Figure 22:
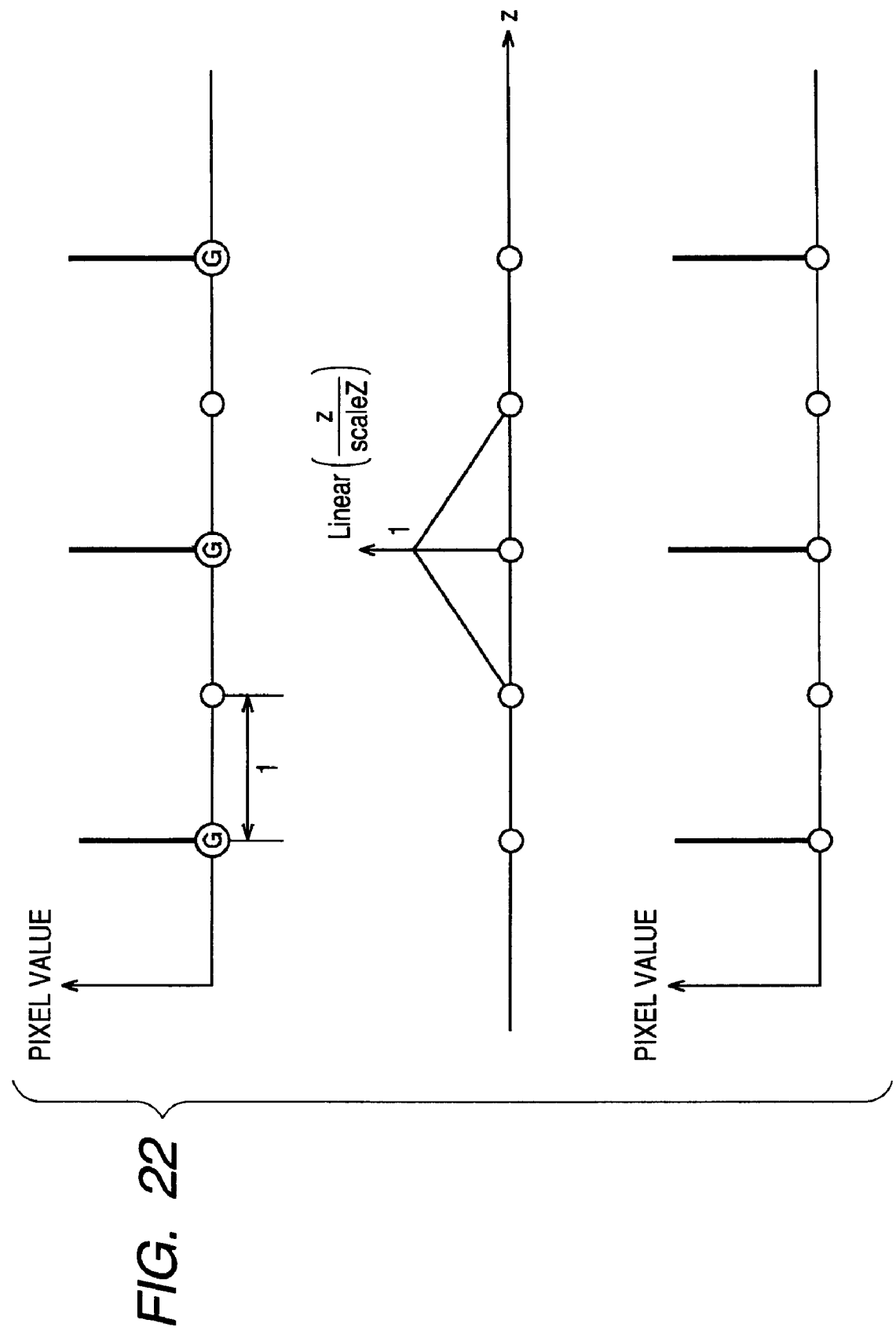
FIG. 22 is a diagram for explaining interpolation of pixel values of output pixels performed by adjusting filter parameters scaleX and scaleY of a bilinear function Bilinear(x,y)
Figure 23:
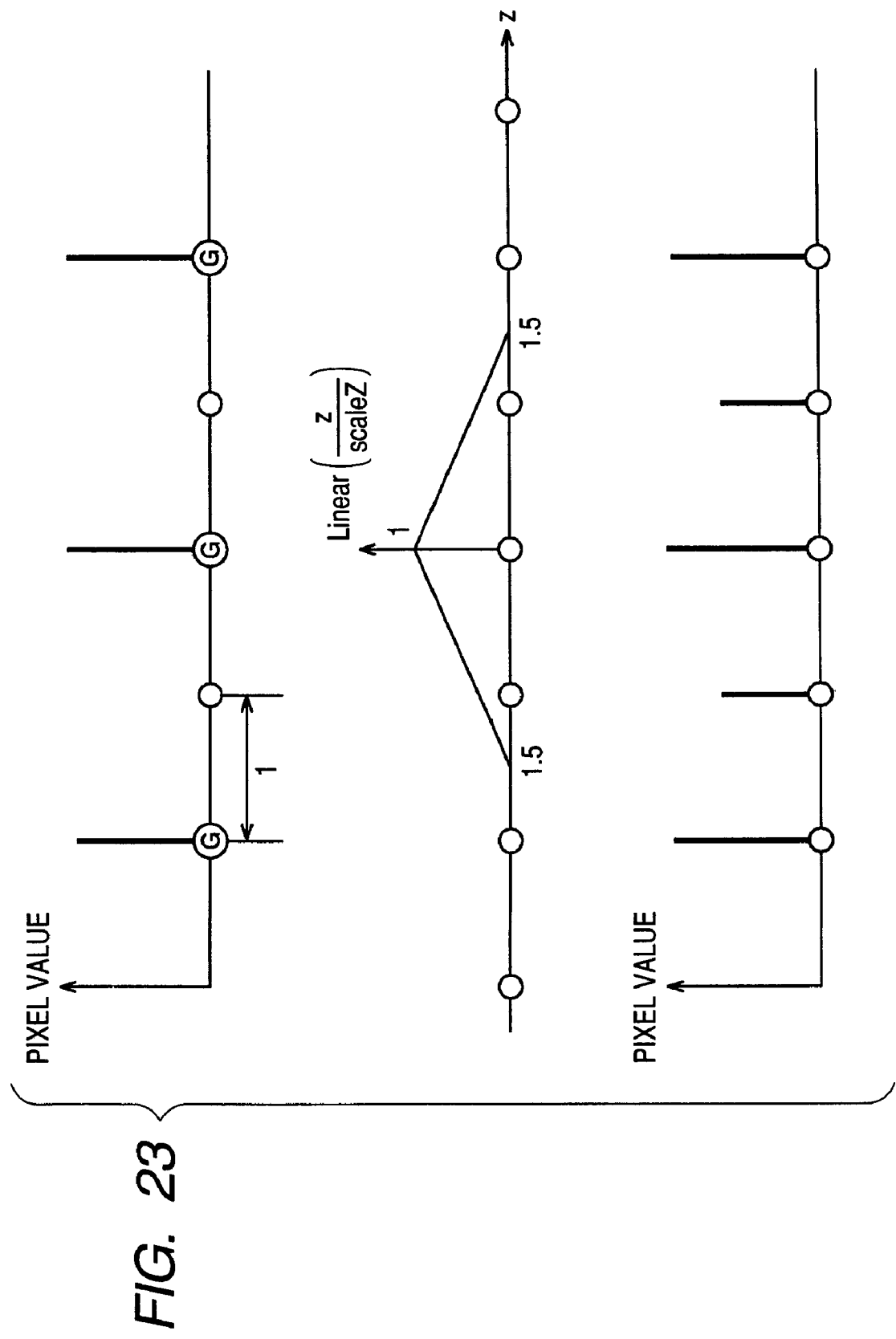
FIG. 23 is a diagram for explaining the interpolation of pixel values of output pixels performed by adjusting the filter parameters scaleX and scaleY of the bilinear function Bilinear(x,y)
Figure 24:
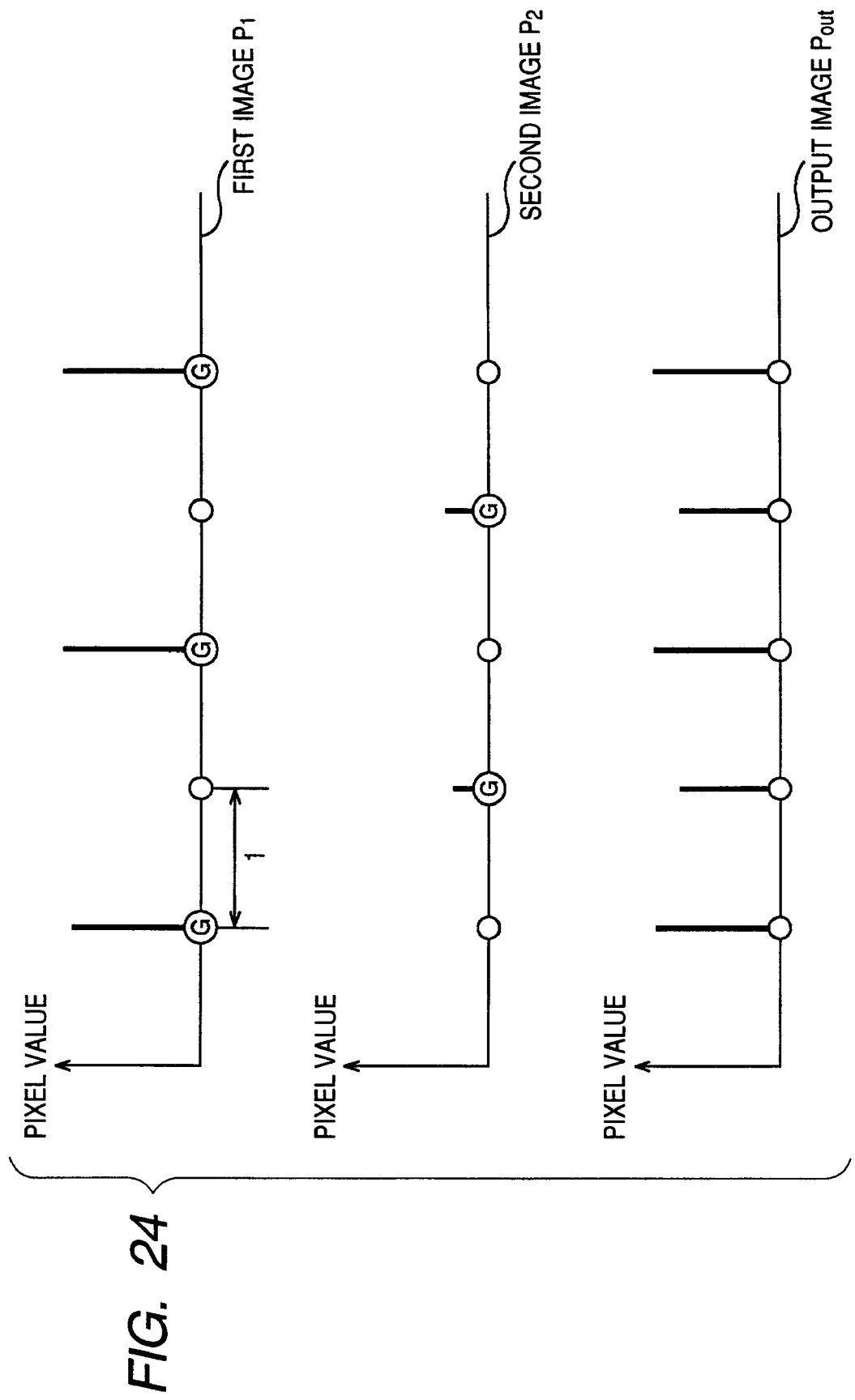
FIG. 24 is a diagram for explaining the interpolation of pixel values of output pixels performed by adjusting the filter parameters scaleX and scaleY of the bilinear function Bilinear(x,y)

FIGS. 22 to 24 shows a state of interpolation of pixel values of output pixels performed by adjusting the filter parameters scaleX and scaleY of the bilinear function Bilinear(x,y) of Equation (13).

In FIGS. 22 to 24, pixel values of photographed images and an output image and the bilinear function Bilinear(x,y) are shown. However, as the pixel values, only G signals of pixels arranged in a direction of one line are shown. As the bilinear function Bilinear(x,y), the bilinear function Bilinear(x,y) with attention paid in the direction in which the pixel values are arranged, i.e., a linear function Linear(z/scaleZ) is shown. Z indicates a distance from the pixel of interest and scaleZ is a filter parameter.

In FIGS. 22 to 24, to simplify the explanation, positions of the pixels of the photographed images after the positioning coincide with each other. Moreover, positions of the pixels of the photographed images after the positioning and the pixels of the output image coincide with each other.

Figure 5:
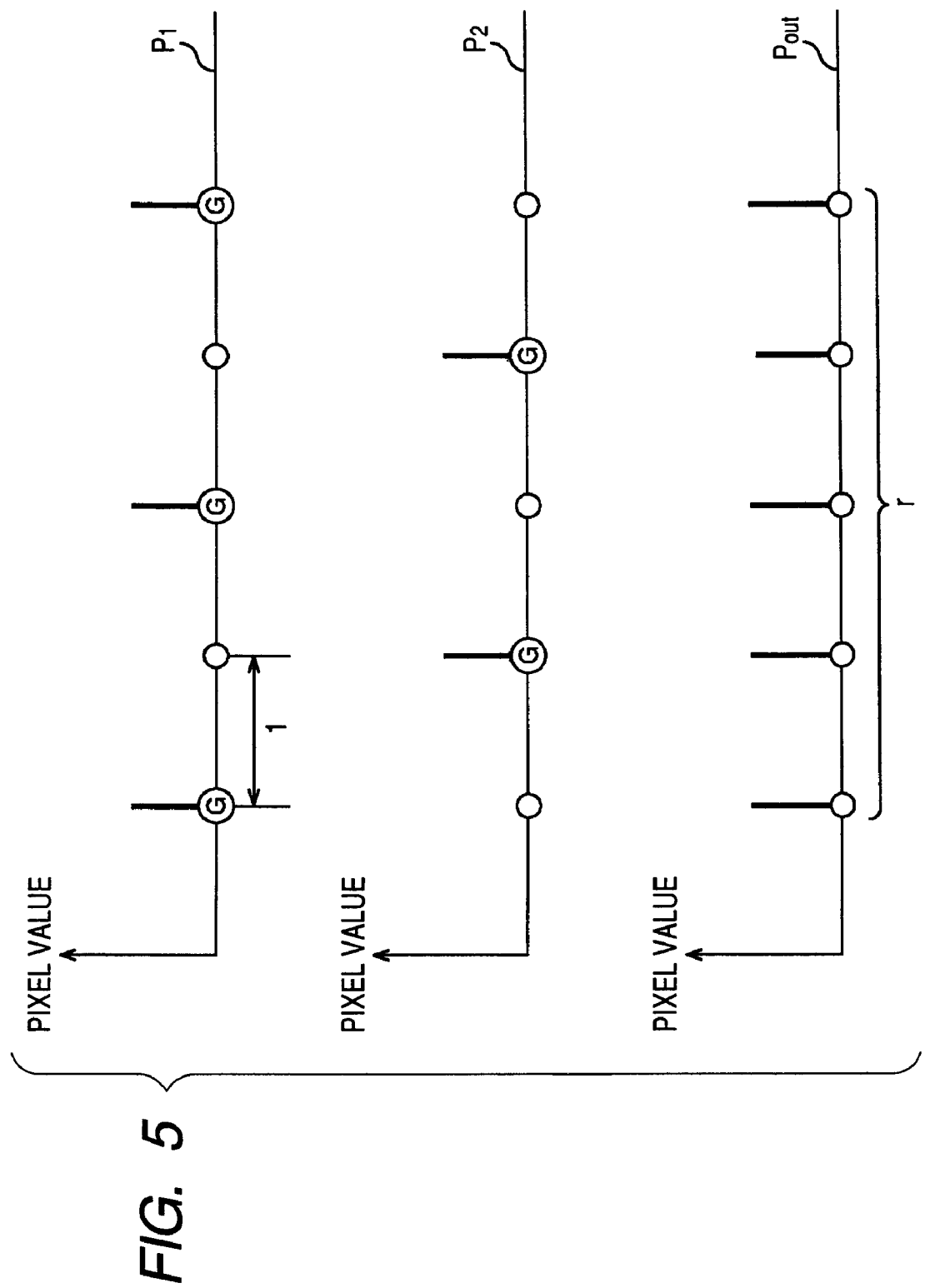
FIG. 5 is a diagram showing photographed pixels after positioning.

A first figure from the top of FIG. 22 shows the pixels values (the G signals) of the pixels of the photographed image after the positioning. Pixel values of non-zero values and pixel values of 0 are alternately arranged. The first, figure from the top of FIG. 22 is the same as the first figures from the top of FIGS. 5 and 6.

In the second figure from the top of the FIG. 22, the linear function Linear(z/scaleZ) with the filter parameter scaleZ of 1.0 is shown.

A third figure from the top of FIG. 22 shows pixel values as contributing components contributing to interpolation of the pixel values of the first photographed image from the top of FIG. 22 in interpolation performed by using the first photographed image from the top of FIG. 22 and the second linear function Linear(s/scaleZ) from the top of FIG. 22.

When the filter parameter scaleZ is 1.0, the linear function Linear(z/scaleZ) is 0 for pixel values of pixels adjacent to a pixel in the position of the pixel of interest, i.e., pixel values of pixels apart from the pixel of interest by a distance 2 equal to or larger than 1.0 among the pixels of the photographed image. Since the pixel values do not contribute to the interpolation of the pixel of interest, contributing components of the pixel values of the first photographed image from the top of FIG. 22 contributing to the interpolation coincide with the pixel values of the first photographed image from the top of FIG. 22 as shown in the third figure from the top of FIG. 22.

Like FIG. 22, FIG. 23 shows the pixel values of the photographed images, the linear function Linear(z/scaleZ), and the contributing components of the pixel values of the photographed images contributing to interpolation.

However, in FIG. 23, the filter parameter scaleX of the linear function Linear(z/scaleZ) is larger than 1.0, for example, 1.5.

A first figure from the top of FIG. 23 shows pixel values (G signals) of the pixels of the photographed images after the positioning identical with those in the first figure from the top of FIG. 22.

A second figure from the top of FIG. 23 shows the liner function Linear(z/scaleZ) with the filter parameter scales of 1.5.

A third figure from the top of FIG. 23 shows pixel values as contributing components contributing to interpolation of the pixel values of the first photographed image from the top of FIG. 23 in interpolation performed by using the first photographed image from the top of FIG. 23 and the second linear function Linear(z/scaleZ) from the top of FIG. 23.

When the filter parameter scales is 1,5, the linear function Linear(s/scaleZ) is 0 for pixel values of pixels distant from the pixel of interest by 1.5 or more among the pixels of the photographed image.

Therefore, unlike the case of FIG. 22, the linear function Linear(z/scaleZ) is not 0 for pixels adjacent to a pixel in the position of the pixel of interest, i.e., pixel values of pixels distant from the pixel of interest by 1.0 or more among the pixels of the photographed image. Thus, the pixel values contribute to the interpolation of the pixel of interest. As a result, contributing components of the pixel values of the first photographed image from the top of FIG. 23 contributing to the interpolation are contributing components obtained by smoothing the pixel values of the first photographed image from the top of FIG. 22 as shown in a third figure from the top of FIG. 23.

FIG. 24 shows pixel values of pixels on one line of two photographed images $P_1$ and $P_2$ after the positioning, the two photographed images $P_1$ and $P_2$ after the positioning, and pixel values of pixels of an output image $P_{out}$ generated, by interpolation performed by using the linear function Linear (z/scaleZ) with the filter parameter scales of 1.5 in the case in which a subject in the two photographed images $P_1$ and $P_2$ is moving.

A first figure from the top of FIG. 24 shows the pixel values of the pixels of the first photographed image $P_1$ among the pixels of the two photographed, images after the positioning. A second figure from the top of FIG. 24 shows the pixel values of the pixels of the second photographed image $P_2$.

Figure 6:
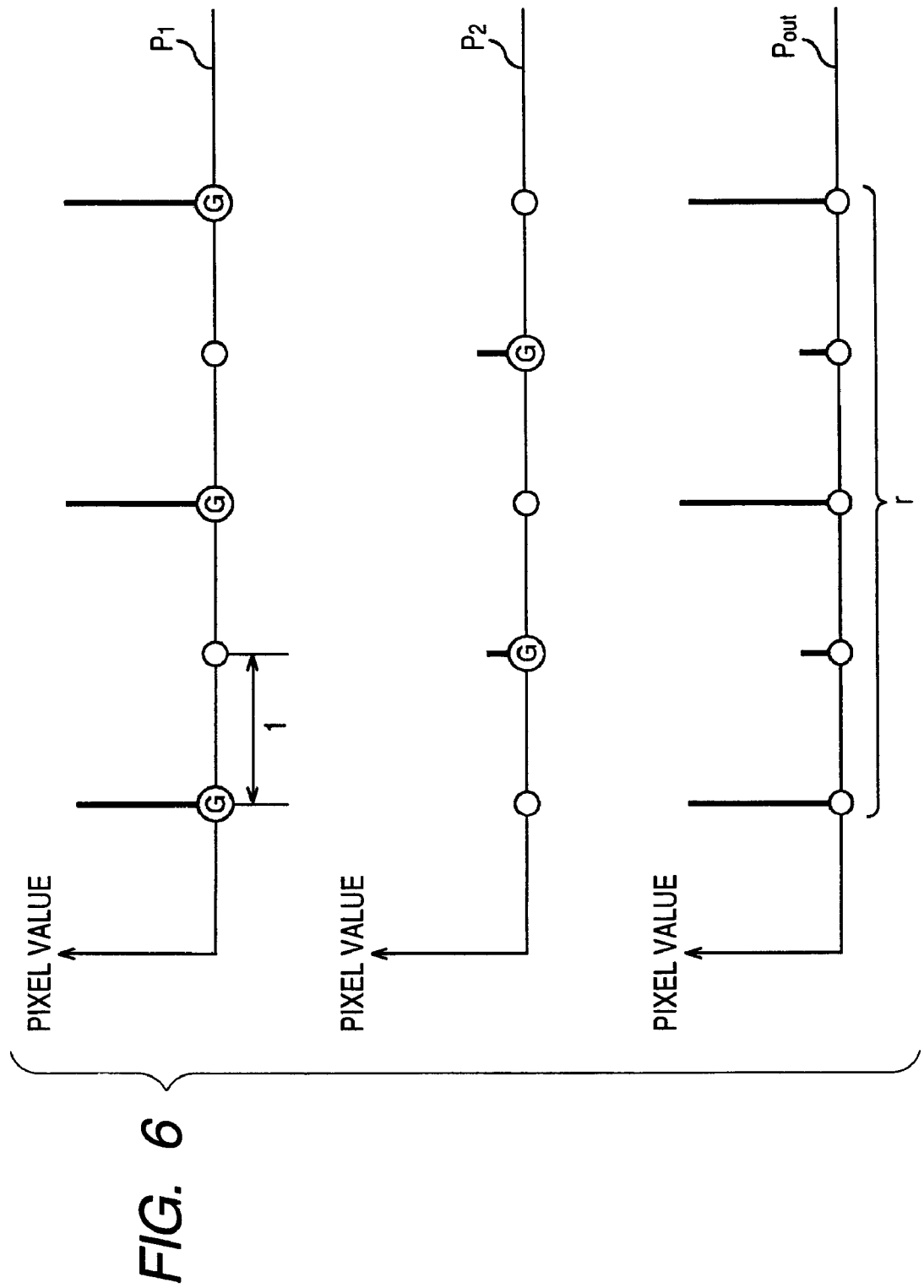
FIG. 6 is a diagram showing photographed pixels after positioning.

The first and second figures from the top of FIG. 24 are identical with the first and second figures from the top of FIG. 6. Therefore, positions of the pixels in the second figure from the fop of FIG. 24 deviate by one pixel from the pixels in the first figure from the top of FIG. 24. A moving object appears in the two photographed images $P_1$ and $P_2$.

Since the moving object appears in the two photographed images $P_1$ and $P_2$, different subjects appear in the pixels of the photographed image $P_1$ after the positioning and the pixels of the photographed image $P_2$ after the positioning close to the pixels. As a result, G signals of the pixels of the photographed image $P_1$ after the positioning and the pixels of the photographed image $P_2$ after the positioning close to the pixels take significantly different values.

A third figure from the top of FIG. 24 shows pixel values of the output image $P_{out}$ generated by interpolation performed by using the first photographed image $P_1$ from the top of FIG. 24, the second photographed image $P_2$ from the top of FIG. 24, and the linear function Linear (z/scaleZ) with the filter parameter scaleZ of 1.5.

When the filter parameter scaler, is 1.5, as explained with reference to FIG. 23, contributing components of pixel values of a photographed image contributing to the interpolation are contributing components obtained by smoothing the pixel values of the photographed image.

The pixel values of the output image $P_{out}$ are pixel values obtained by superimposing (adding up) contributing components obtained by smoothing the pixel values of the photographed image $P_1$ and contributing components obtained by smoothing the pixel values of the photographed image $P_2$. Thus, as shown in the third figure from the top of FIG. 24, the contributing components take a value that smoothly changes (an average value).

As a result, it is possible to prevent zipper noise and false colors from occurring in the output image $P_{out}$.

The image generation processing in step S4 in FIG. 10 for generating an output image by interpolating G signals, R signals, and B signals as pixel values of output pixels while adjusting filter parameters of the interpolation function as described above will foe explained with reference to a flowchart in FIG. 25.

Figure 18:
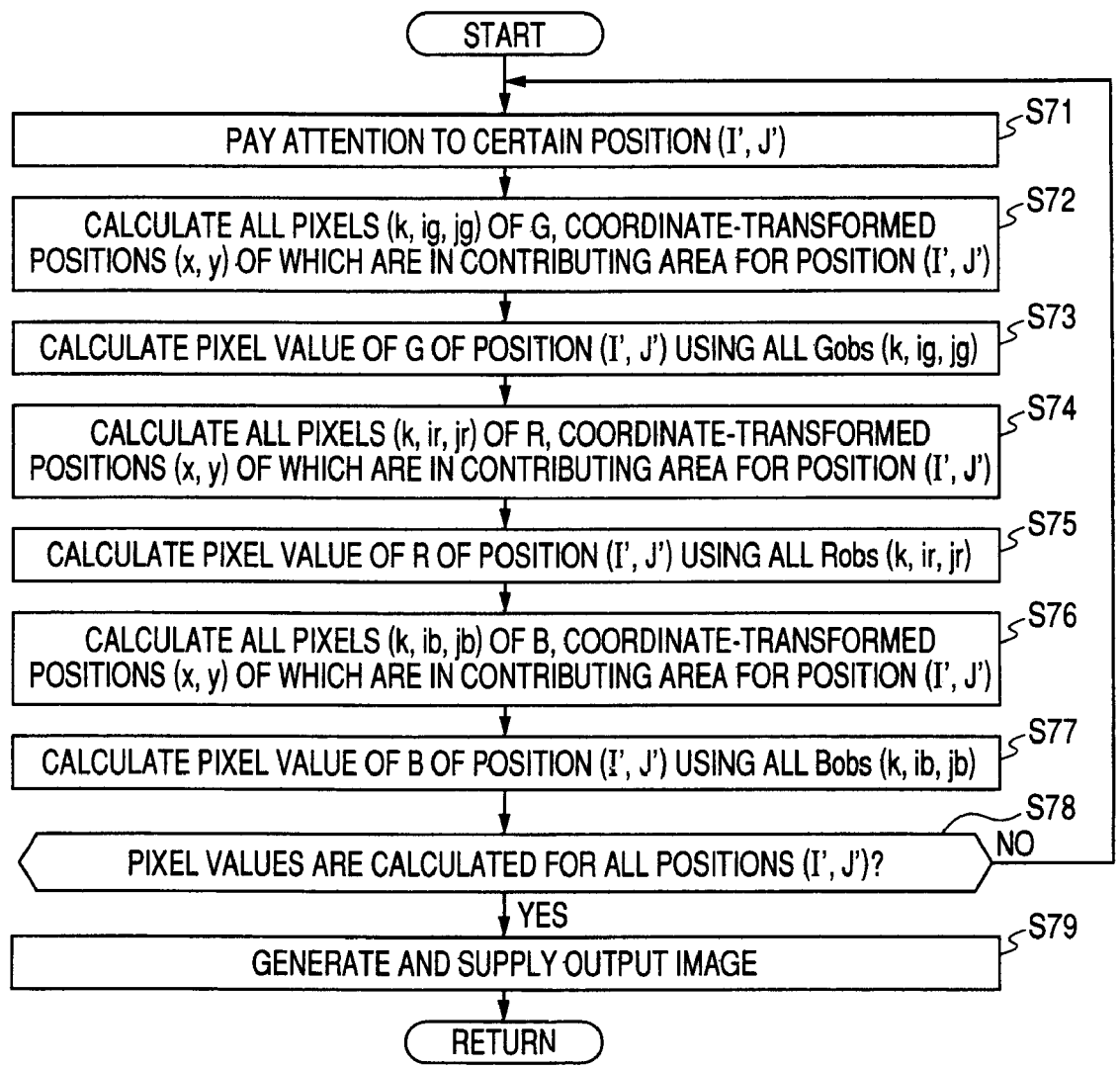

First, in step S101, as in step S71 in FIG. 18, the arithmetic circuit 24 selects, with a certain output pixel on the reference coordinate system set as a pixel of interest, a position (I',J') of the pixel of interest as a position of interest (I',J') and proceeds to step S102.

In step S102, the arithmetic circuit 24 recognizes, for each of the N photographed images, 5×5 pixels around, a near pixel, which is a pixel in a position nearest to the position of the pixel of interest, as a determination area and proceeds to step S103.

In step S103, the arithmetic circuit 24 performs, on the basis of a total value of the pixels in the determination area for each of the N photographed images, motion determination for determining whether the pixel of interest is the motion pixel as described above and proceeds to step S104.

In step S104, the arithmetic circuit 24 adjusts, on the basis of a result of the motion determination for the pixel of attention, for example, the filter parameters scaleX and scaleY of the bilinear function Bilinear(x,y)=Linear(x/scaleX)×Linear (y/scaleY) as the interpolation function.

When a result of the motion determination indicating that the pixel of interest is the motion pixel in step S103, the arithmetic circuit 24 determines the filter parameter scaleX as a constant pX and determines the filter parameter scaleY as a constant pY.

When a result of the motion determination indicating that the pixel of interest is not the motion pixel in step S103, the arithmetic circuit 24 determines the filter parameter scaleX as a constant pX' and determines the filter parameter scaleY as a constant pY'.

The constants pX, pY, pX', and pY' have a relation satisfying an expression pX>pX' and an expression pY>pY'. For example, the constants pX and pY are 1.5 and the constants pX' and pY' are 1.0.

Thereafter, in steps S105 to S112, processing same as that in steps S72 to S79 in FIG. 1S is performed and an output image is obtained. However, in steps S106, S108, and S110, a pixel value outputPixel (I',J') of the pixel of interest is calculated by interpolation performed by using, as the bilinear function Bilinear(p(k,i,j),q(k,i,j)) as the interpolation function in Equation (11), a bilinear function Bilinear(x,y) =Linear(x/scaleX)×Linear(y/scaleY) that is capable of adjusting the high-pass characteristic by the filter parameters scaleX and scaleY.

As described above, the arithmetic circuit 24 determines whether the pixel of interest is the motion pixel, adjusts the filter parameters scaleX and scaleY to the small values pX'and pY', respectively, when the pixel of interest is not the motion pixel, and adjusts the filter parameters scaleX and scaleY to the large values pX and pY, respectively, when the pixel of interest is the motion pixel. Consequently, it is possible to obtain a natural output image without zipper noise and false colors (with zipper noise and false colors reduced) while maintaining the high-frequency components of the photographed images (without deteriorating resolution unnecessarily).

Figure 2:
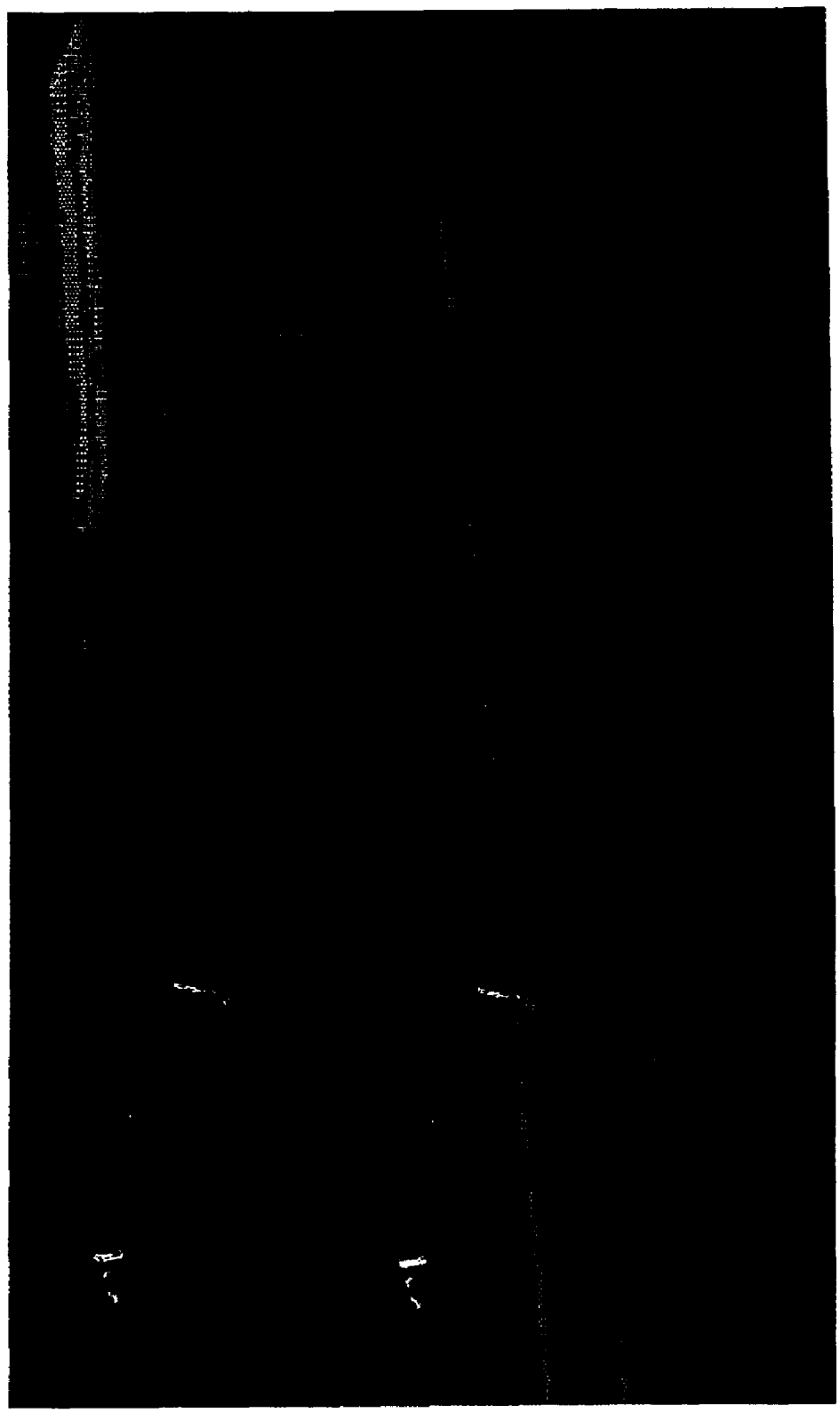
FIG. 2 is a diagram showing an output image obtained by superimposing plural photographed images.
Figure 3:
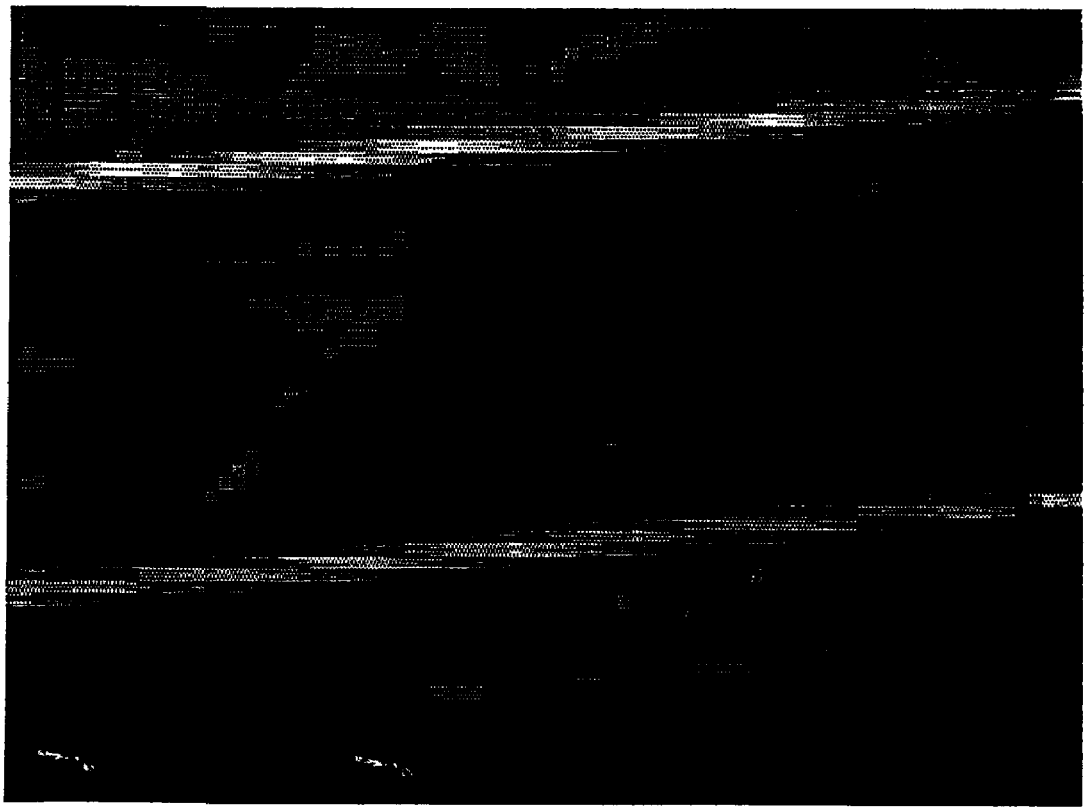
FIG. 3 is a diagram showing an enlarged image obtained by enlarging a part of the output image.
Figure 4:
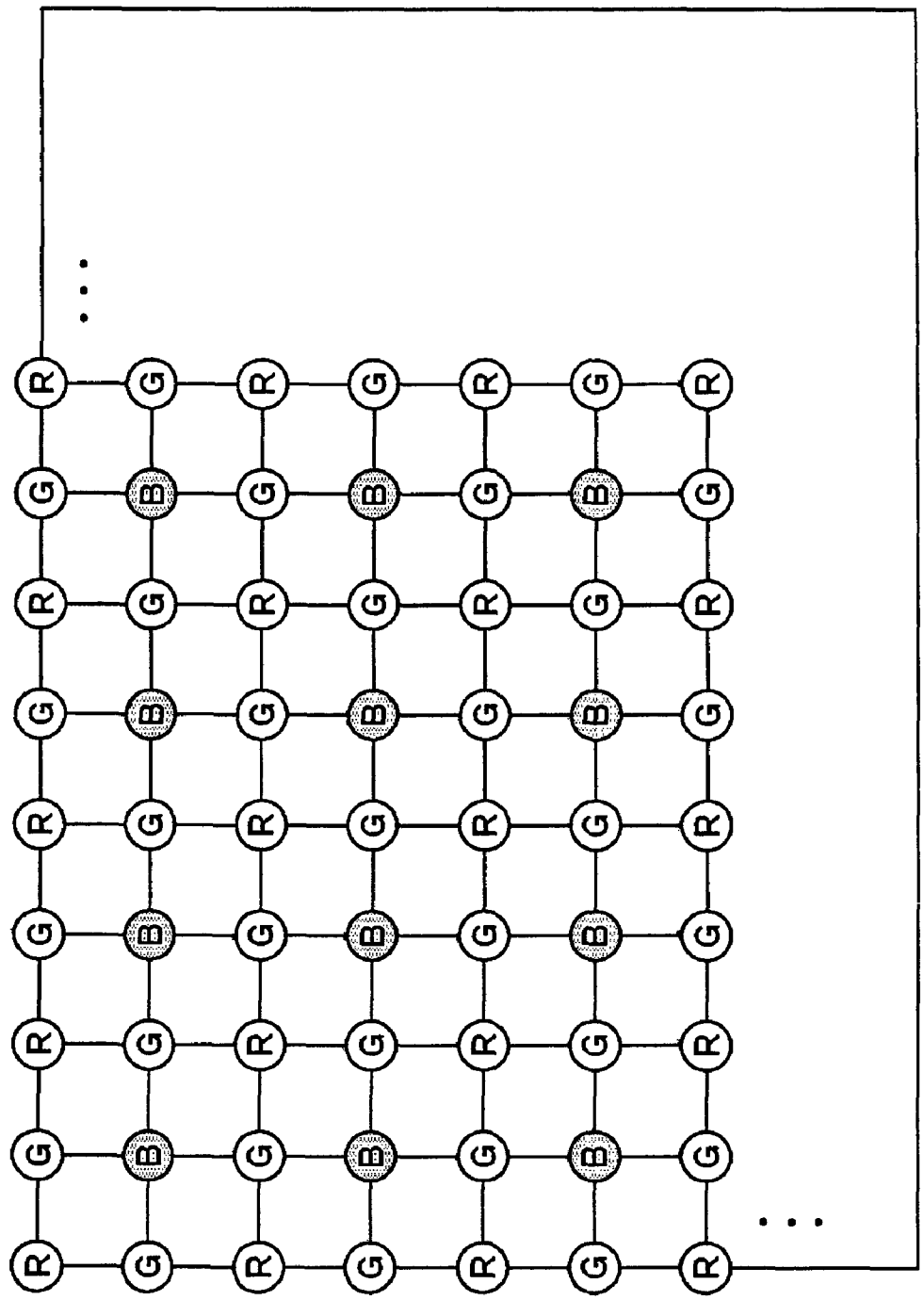
FIG. 4 is a diagram showing a photographed image obtained from an imaging element of the Bayer array.
Figure 25:
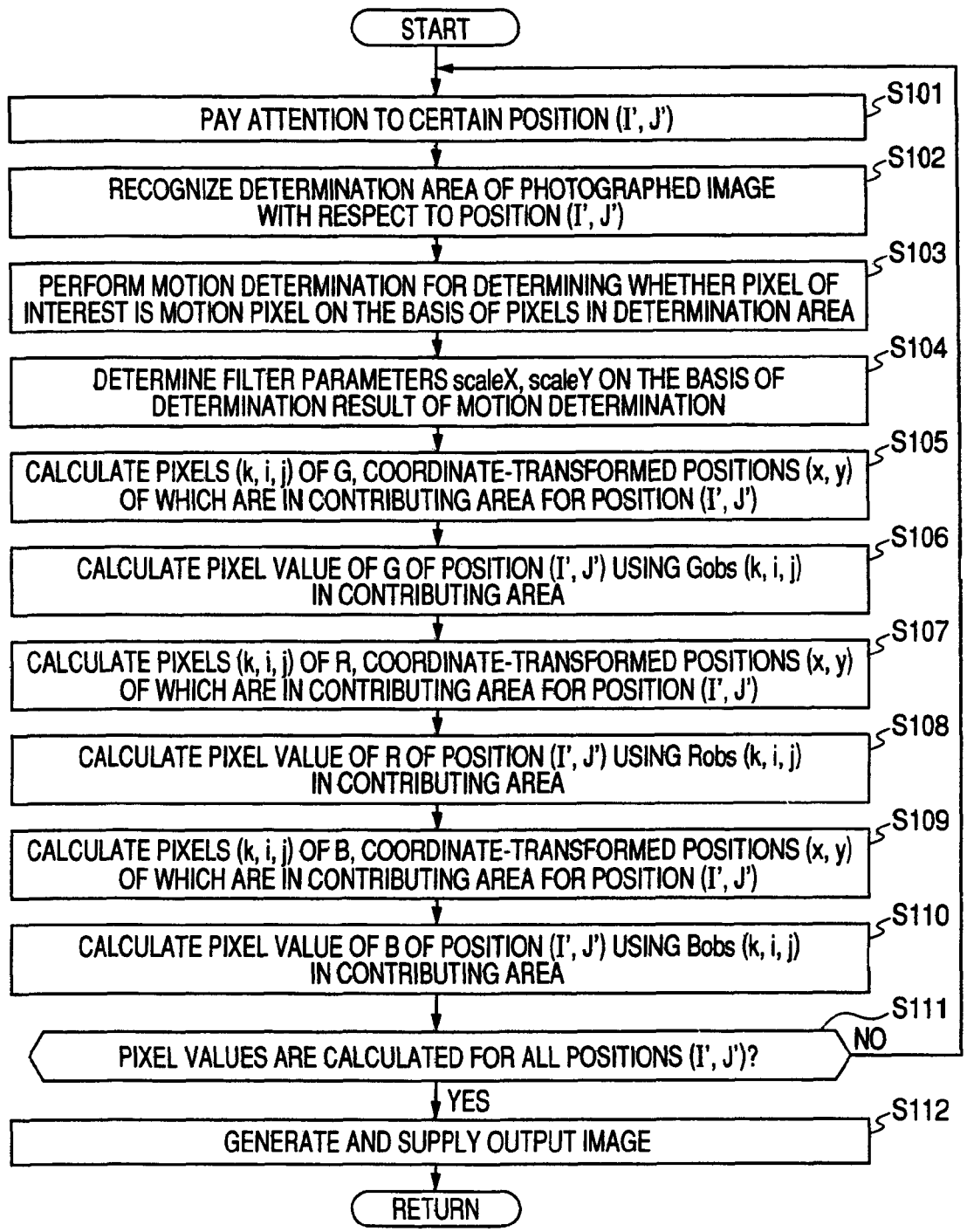
FIG. 25 is a flowchart for explaining image generation processing.
Figure 26:
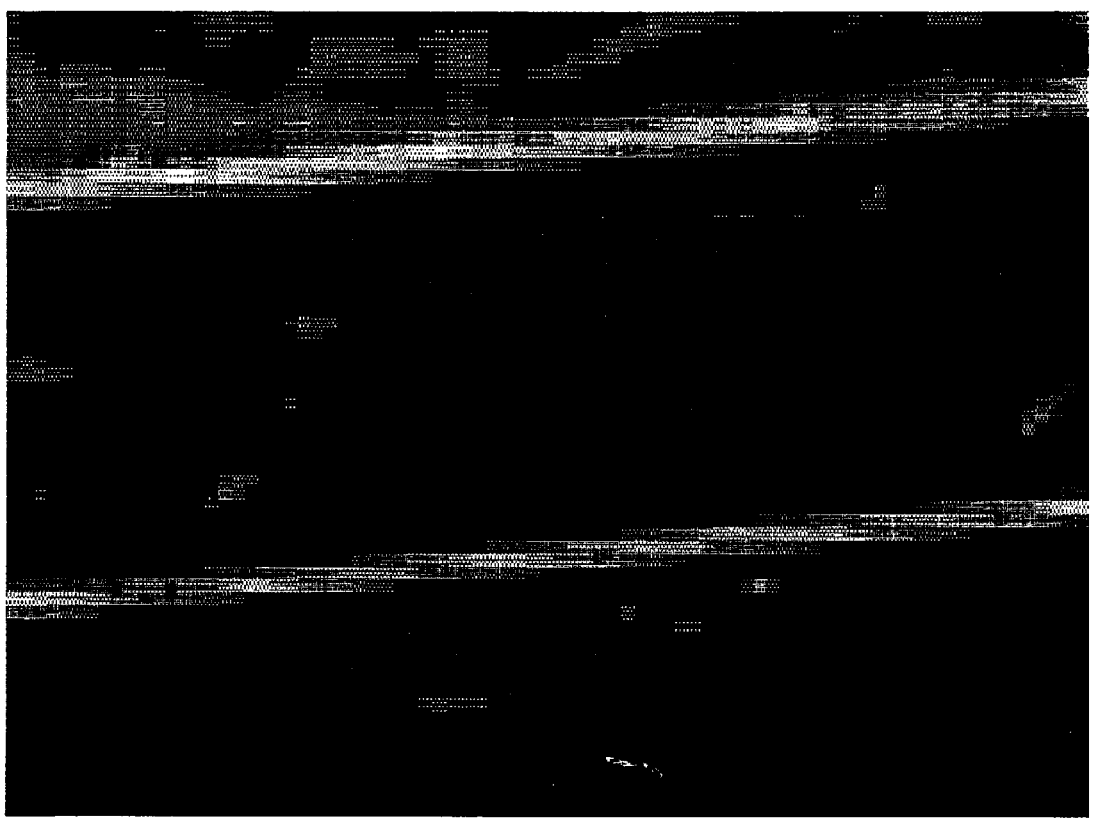
FIG. 26 is a diagram showing an enlarged image obtained by enlarging a part of an output image.

FIG. 26 shows an enlarged image obtained by enlarging a part of the output image, which is the same as that shown in FIG. 2, obtained by the image generation processing in FIG. 25.

In FIG. 26, zipper noise is reduced.

In the interpolation of (the pixel values of) the pixel of interest, as explained with reference to FIG. 18, sets of (k,i,j), with which the transformed positions (x,y) on the reference coordinate system obtained by affine-transforming the positions (i−1,j−1) of the pixels of the kth image with the transformation parameters $(a_k,b_k,c_k,d_k,s_k,t_k)$ satisfy the expression I'−2≦x<I'+2 and the expression J'−2≦y<J'+2 representing a contributing area for the position of interest (I',J') with, so to speak, a fixed size, are calculated for all of the first to Nth images. The pixels represented by (k,i,j) are specified as contributing pixels contributing to interpolation of the pixel of interest. The interpolation of the pixel of interest is performed using the contributing pixels.

According to the explanation with reference to FIGS. 22 and 23, in the interpolation by the bilinear function Bilinear (x,y)=Linear(x/scaleX)×Linear (y/scaleY) capable of performing adjustment of the high-pass characteristic by filter parameters scaleX and scaleY, pixels, the transformed position (x,y) of which satisfies an expression |x|<scaleX and an expression |y|<scaleY, among the pixels of the photographed images contribute to the interpolation of the pixel of interest.

Therefore, in the image generation processing in FIG. 25, pixels, the transformed, position (x,y) of which is in the contributing area with the fixed size for the position of interest (I',J') and satisfies the expression |x|<scaleX and the expression |y|<scaleY, contribute to the interpolation of the pixel of interest.

With an area with a size variable according to the filter parameters scaleX and scaleX, i.e., for example, an area satisfying an expression |x−I'|<scaleX and an expression |y−J'|<scaleY set as the contributing area, it is possible to perform the interpolation of the pixel of interest in the position (I',J') using all pixels, the transformed position (x,y) of which is in this contributing area. In this case, as the filter parameters scaleX and scaleY are larger or smaller, the contributing area is larger or smaller.

In the image generation processing in FIG. 25, it is determined whether the output image is the motion image on the basis of the total value of the pixels in the determination area for the photographed images. Besides, for example, it is possible to determine that other output pixels for which interpolation is performed using the pixels of the photographed images used for the interpolation of the output pixel determined as the motion pixel are motion pixels and not to perform (to skip) the determination on whether the output pixels are the motion pixels on the basis of the total value of the pixels in the determination area.

Moreover, in the image generation processing in FIG. 25, the filter parameters scaleX and scaleY are adjusted to the small values pX' and pY', respectively, when the pixel of interest is not the motion pixel and the filter parameters scaleX and scaleY: are adjusted to the large values pX and pY, respectively, when the pixel of interest is the motion pixel. However, it is possible to adjust values of the filter parameters scaleX and scaleY according to a degree of motion of the pixel of interest.

For example, with the distribution dev of the total value of the pixel values of the pixels in the determination area for each of the N photographed images explained in the rule (R3) set as a value indicating a degree of motion of the pixel of interest, it is possible to adjust the filter parameters scaleX and scaleY to a value proportional to the distribution dev.

The above explanation also applies to image generation processing in FIG. 31 described later.

Figure 8:
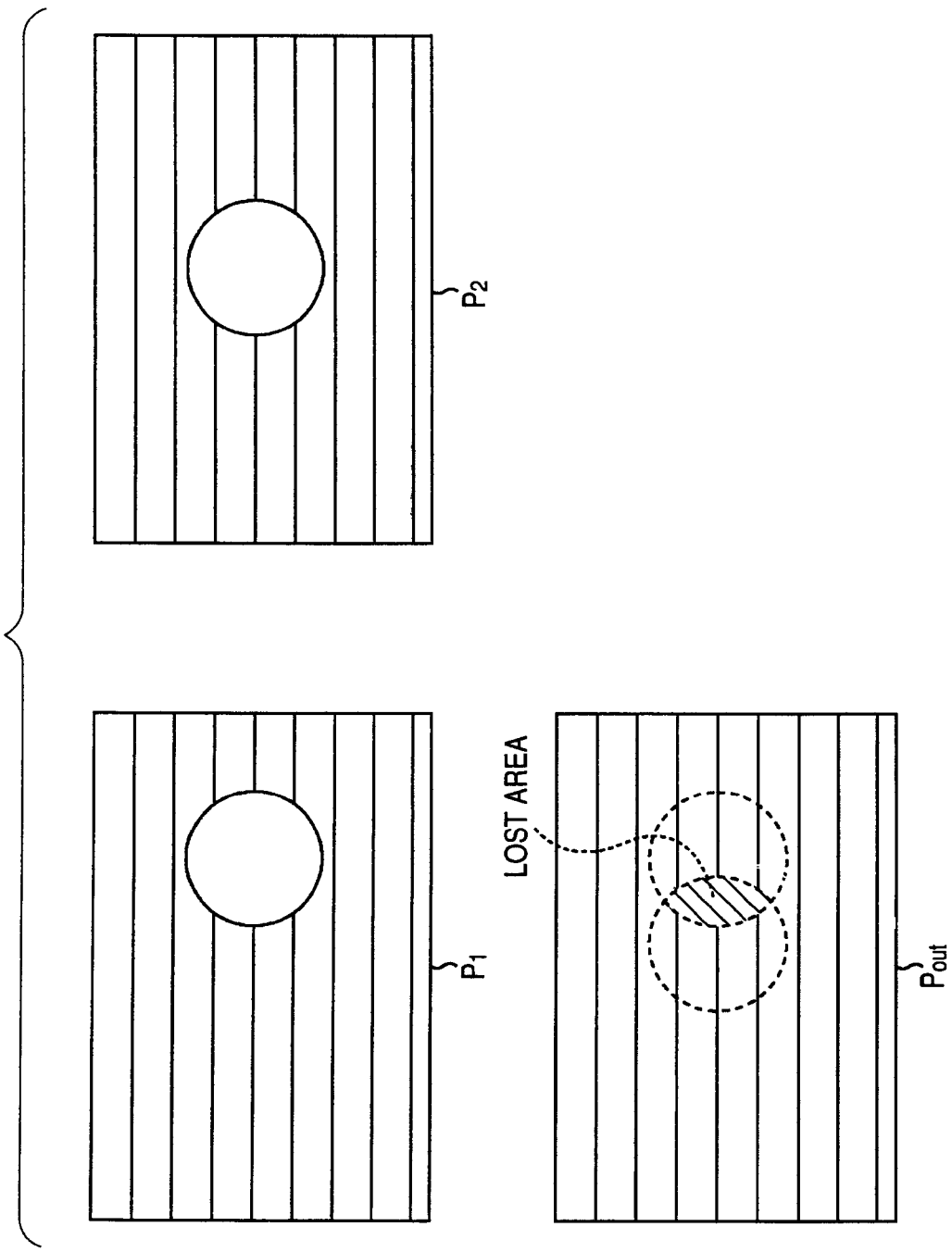
FIG. 8 is a diagram showing an output image in which a lost area appears.

In the image generation processing in FIGS. 16 and 25, since the output pixels are interpolated by the pixels of the N photographed images, even if a moving object, appears in the photographed images, a lost area in which a background is lost explained with reference to FIG. 8 is not generated in an output image. However, it is still likely that an output image in which the moving object or the background appears unnaturally is obtained.

Thus, the arithmetic circuits 24 (FIG. 12) sets a near area in a range near from the position of the pixel of interest of the output image in the photographed images after the positioning as an influential area used for calculating an influence parameter indicating a degree of an influence of the pixel values of the pixels of the photographed images after the positioning on the pixel value of the pixel of interest. The arithmetic circuit 23 calculates the influence parameter on the basis of pixel values of pixels in the influential area among the pixels of the photographed images after the positioning. The arithmetic circuit 24 performs interpolation using the influence parameter other than the pixel values of the pixels of the photographed images after the positioning and the interpolation function to, so to speak, appropriately blend pixel values of pixels in which the moving object appears of the photographed images and pixel value of pixels in which the background appears. Consequently, it is possible to obtain a natural output image without a sense of incongruity.

In the arithmetic circuit 24, the interpolation of the output pixels using the influence parameter, i.e., the appropriate blend of the pixel values of the pixels of the photographed images is performed, for example, as described below.

Figure 27:
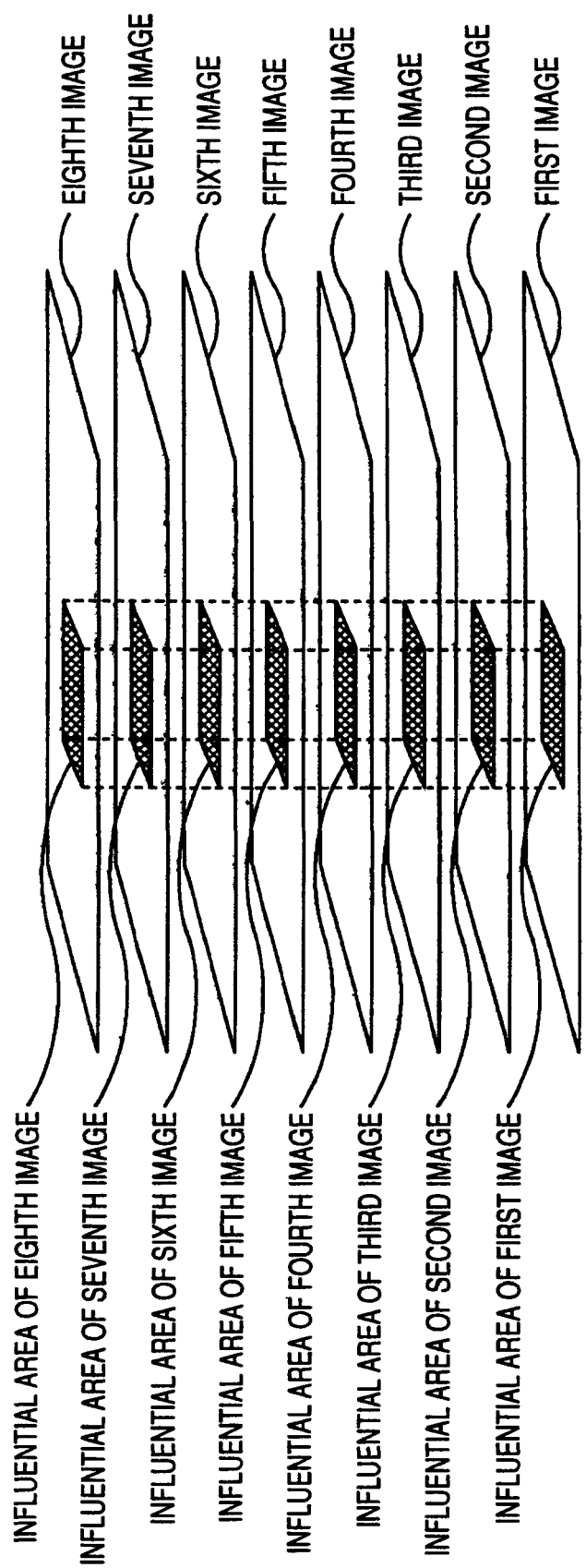
FIG. 27 is a diagram showing N photographed images after positioning.

FIG. 27 shows the N photographed images after the positioning.

In FIG. 27, eight photographed images are shown as the N photographed images.

As shown in FIG. 27, the arithmetic circuit 24 sets an area of, for example, 5×5 pixels around a pixel in a position nearest from the position of the pixel of interest among pixels of a first image after the positioning as an influential area for the first image. Similarly, the arithmetic circuit 24 sets an area of 5×5 pixels around a pixel in a position nearest from the position of the pixel of interest among pixels of each of a second to eighth images after the positioning as an influential area.

The influential area is an area identical with the determination area described above. However, the influential area does not have to be the area identical with the determination area. It is possible to set an area identical with the contributing area with the fixed size or the contributing area with the variable size described above as the influential area. Moreover, it is possible to adopt an area of an appropriate size calculated by experiments or the like as the influential area.

The arithmetic circuit 24 calculates an influence parameter used for the interpolation of the pixel of interest on the basis of pixel values in the influential area for each of the first to eighth images, i.e., for example, a histogram of a total value of the pixel values in the influential area for each of the first to eighth images.

Figure 28:
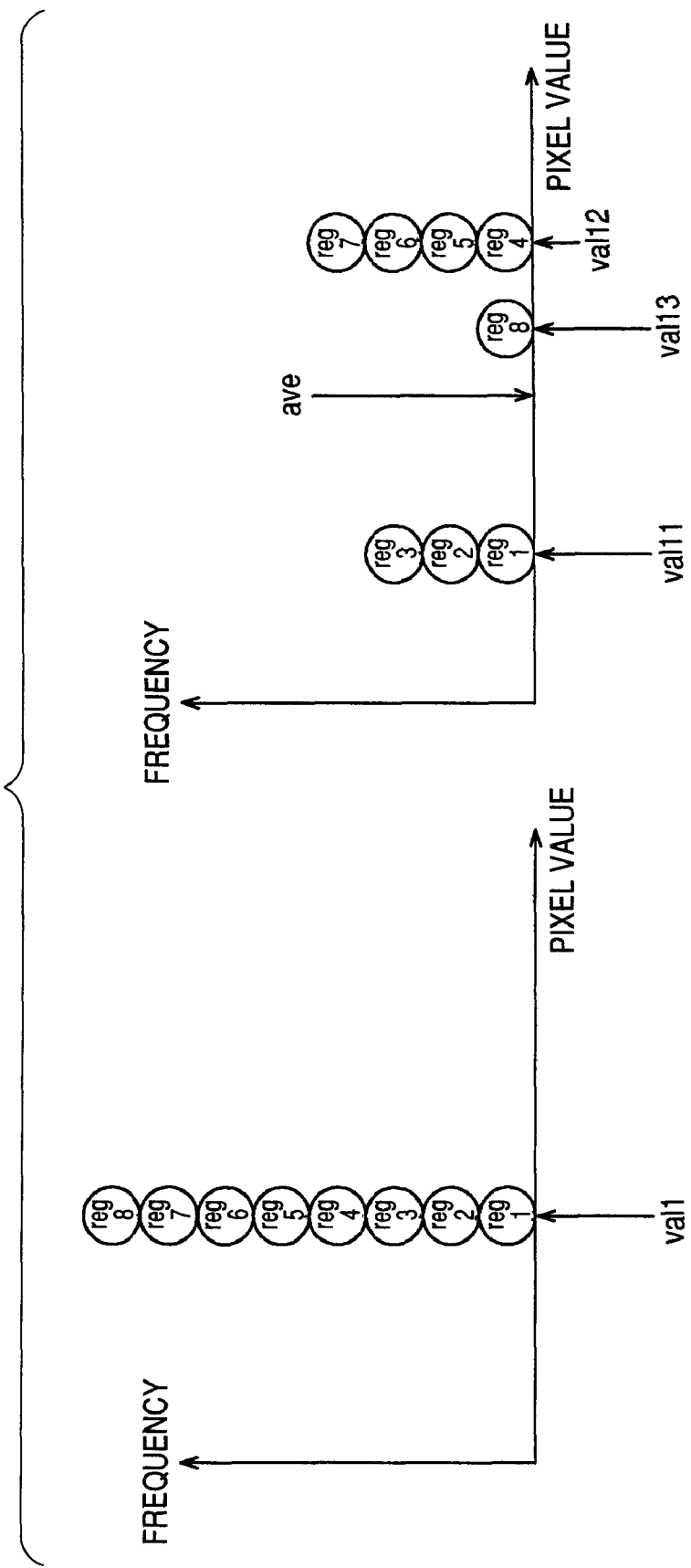
FIG. 28 is a diagram showing a histogram of a total value of pixel values in an influential area for each of first to eighth images.

FIG. 28 shows the histogram of the total value of the pixel values in the influential area for each of the first to eighth images.

In FIG. 28, the total value of the pixel values in the influential area of a kth image among the first to eighth images is indicated by $reg_k$.

In a histogram on the left in FIG. 28, for example, a background appears in all the influential areas for the first to eighth images. Therefore, total values $reg_1$, to $reg_8$; of the pixel values in the influential areas for the first to eighth images are an identical value val1.

On the other hand, in a histogram on the right in FIG. 28, a moving body appears in the photographed images. In other words, a certain subject appears in a certain influential area among the influential areas for the first to eighth images and other subjects appear in the other influential areas. Therefore, the total values $reg_1$ to $reg_8$ of the pixel values in the influential areas for the first to eighth images are not an identical value.

In the histogram on the right in FIG. 28, the total value $reg_1$ to $reg_3$ of the pixel values in the influential areas for the first to third images are a value val11 and total values $reg_4$ to $reg_7$ of the pixel values in the influential areas for the fourth to seventh images are a value val12 larger than the value val11. A total value $reg_8$ of the pixel values in the influential area for the eighth image is a value val13 larger than the value val11 and smaller than the value val12.

When the total values $reg_1$ to $reg_8$ of the pixel values in the influential areas for the first to eighth images are an identical value as shown on the left in FIG. 28, the arithmetic circuit 24 calculates a pixel value of the output pixels by blending pixel values of pixels in contributing areas of the first to eighth images at an identical ratio.

On the other hand, when the total values $reg_1$ to $reg_8$ of the pixel values in the influential areas for the first to eighth images are not an identical value as shown on the right in FIG. 28, the arithmetic circuit 24 calculates a pixel value of the output pixels by blending pixel values of pixels in contributing areas of the first, to eighth images at different ratios.

The arithmetic circuit 24 calculates a reference value ref that is a pixel value serving as a reference for calculating a ratio in blending the pixel values of the pixels in the contributing areas for the first to eighth images. The arithmetic circuit 24 calculates, on the basis of the reference value ref, a ratio in blending the pixel values of the pixels in the contributing area for the kth image, i.e., an influence parameter eg indicating a degree for causing the pixel values of the pixels in the contributing area for the kth image to affect the pixel values of the output pixels when the pixel values of the output pixels are interpolated.

Specifically, the arithmetic circuit 24 calculates an average of the total values $reg_1$ to $reg_8$ of the pixel values in the influential areas for the first to eighth images as the reference value ref in accordance with, for example, Equation (14).

$$ref = \left(\sum_{k=1}^{8} reg_k\right) / 8 \tag{14}$$

According to Equation (14), the value val1 is the reference value ref on the left in FIG. 28 and a value ave is the reference value ref on the right in FIG. 28.

The arithmetic circuit 24 calculates a median of the total values $reg_1$ to $reg_8$ of the pixel values in the influential areas for the first to eighth images as the reference value ref in accordance with, for example, Equation (15).

$$ref = med(rec_k) \quad (15)$$

In Equation (15), a function med( ) is a function for returning a median in parentheses. The suffix k of $req_k$ takes integer values from 1 to 8 in FIG. 28.

According to Equation (15), the value val1 is the reference value ref on the left in FIG. 28 and the value val13 is the reference value ref on the right in FIG. 28.

Besides, the arithmetic circuit 24 can calculate a mode indicating a highest frequency of the total values $reg_1$ to $reg_8$ of the pixel values in the influential areas for the first to eighth images as the reference value ref in accordance with, for example, Equation (16).

$$ref = maxfreq(reg_k) \quad (16)$$

In Equation (16), a function maxfreq( ) is a function for returning a mode in parentheses. The suffix k of $req_k$ takes integer values from 1 to 8 in FIG. 28.

According to Equation (16), the value val1 is the reference value ref on the left in FIG. 28 and the value val12 is the reference value ref on the right in FIG. 28.

After calculating the reference value ref, the arithmetic circuit 24 calculates the influence parameter $\alpha_k$ in accordance with, for example, a rule (R5) described below.

```
if(req_k<ref) {
  α_k=g×req_k/ref
}else{
  α_k=g×ref/req_k
}
if(α_k>1){
  α_k=1
}
```
(R5)

In the rule (R5), g is a coefficient of a positive value.

According to the rule (R5), when the total value $reg_k$ of the pixel values in the influential area for the kth image is smaller than the reference value ref, a provisional influence parameter $\alpha_k$ is calculated in accordance with an expression $\alpha_k = g \times req_k/ref$. When the total value $reg_k$ of the pixel values in the influential area for the kth image is not smaller than the reference value ref, the provisional influence parameter $\alpha_k$ is calculated in accordance with an expression $\alpha_k = g \times ref/reg_k$.

When the provisional influence parameter $\alpha_k$ is larger than 1, 1 is determined as a final influence parameter $\alpha_k$. When the provisional influence parameter $\alpha_k$ is not larger than 1, the provisional influence parameter $\alpha_k$ is directly determined as the final influence parameter $\alpha_k$. Therefore, a maximum value of the influence parameter $\alpha_k$ is 1.

After determining the final influence parameter $\alpha_k$, the arithmetic circuit 24 calculates a pixel value outputPixel (I',J') of the output pixel (the pixel of interest) in accordance with Equation (17) instead of Equation (11).

$$outputPixel(I, J) = \frac{\sum_{Allphotographed\ images\ k} \left( \frac{\sum_{Allpixels(i,j)\ of\ photographed\ images\ k} Bilinear(p(k,i,j), q(k,i,j)) \times inputPixel(k,i,j) \times \alpha_k}{\sum_{Allpixels(i,j)\ of\ photographed\ images\ k} Bilinear(p(k,i,j), q(k,i,j)) \times \alpha_k} \right)}{} \quad (17)$$

According to Equation (17), pixel values inputPixel(k,i,j) of the pixels in the contributing area of the kth image affect outputPixel(I',J') of the pixel of interest by a degree of a value of the influence parameter $\alpha_k$.

According to the rule (R5), when total value $reg_k$ of the pixel values inputPixel (k,i,j) of the pixels in the influential area of the kth image is significantly different from the reference value ref, the influence parameter $\alpha_k$ is small. When the total value $reg_k$ is a value same as the reference value ref, the influence parameter $\alpha_k$ is large.

For example, concerning the N photographed images including a small moving object moving at a certain degree of speed, in general, when only a background appears in the contributing area of the kth image, the total value $reg_k$ of the pixel values in the influential area is a value close to the reference value ref and the influence parameter $\alpha_k$ is a value close to 1. On the other hand, when only the moving object appears in the contributing area of the kth image or when both the moving object and the background appear in the contributing area, the total value $reg_k$ of the pixel values in the influential area is a value (significantly) different from the reference value ref and the influence parameter $\alpha_k$ is a value smaller than 1 (a value close to 0).

Therefore, when only the moving object appears in the contributing area of the kth image or when both the moving object and the background appear in the contributing area, pixel values in the contributing area hardly affect the pixel value outputPixel (I',J') of the pixel of interest much. However, when only the background appears in the contributing area of the kth image, pixel values in the contributing area significantly affect the pixel value outputPixel (I',J') of the pixel of interest. As a result, the pixel value outputPixel (I',J') of the pixel of interest is a pixel value hardly affected by the moving object and significantly affected by the background.

In the rule (R5), the constant "g" is a variable constant. It is possible to adjust, according to the constant "g", a degree of causing pixel values of pixels in which the moving object appears to affect the pixel value outputPixel(I',J') of the pixel of interest.

The degree of causing the pixel values of the pixels in which the moving object appears to affect the pixel value outputPixel(I',J') of the pixel of interest is decreased by setting the constant "g" small. Consequently, it is possible to make the moving object less conspicuous in the output image.

Figure 7:
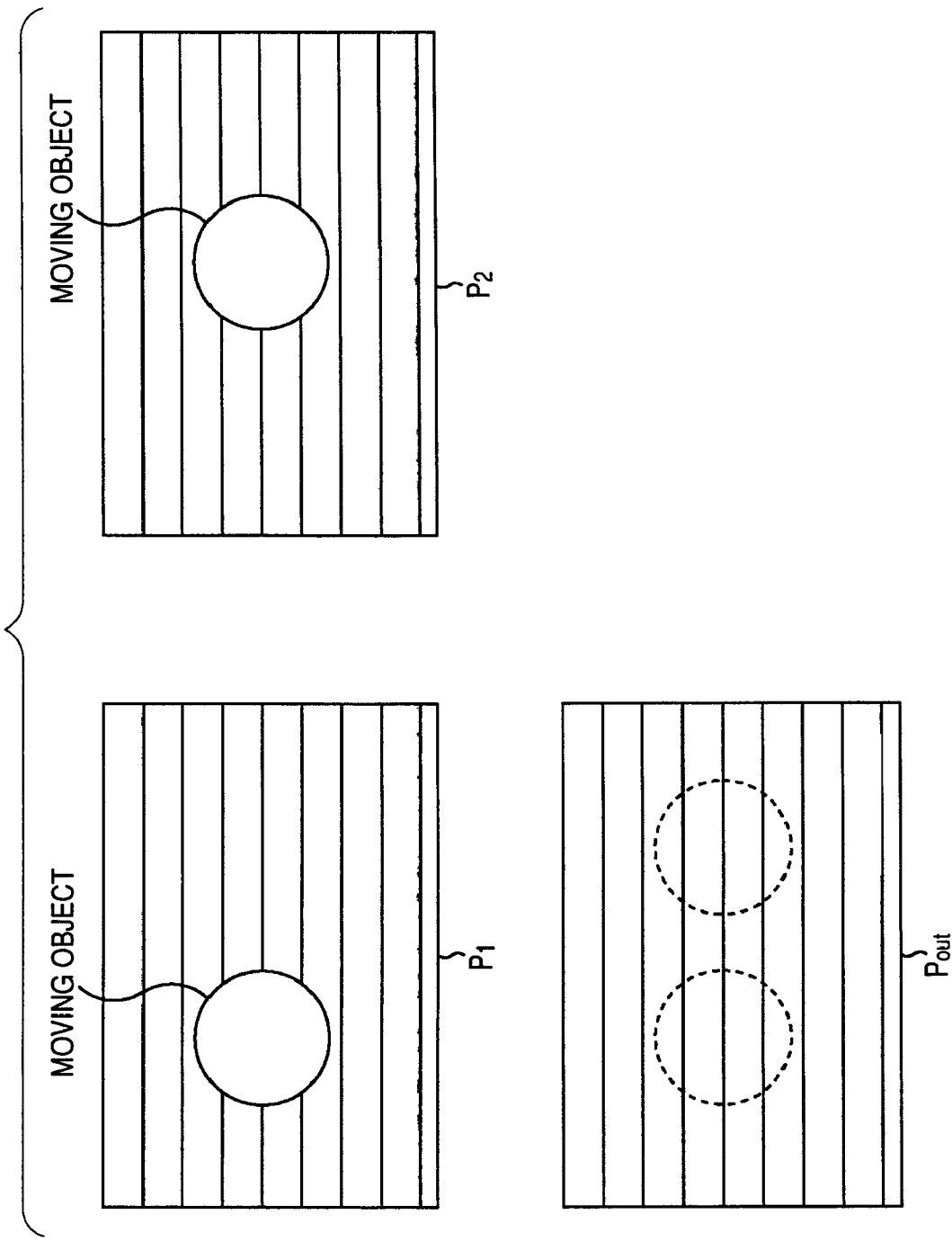
FIG. 7 is a diagram for explaining a method of generating an output image with a moving object removed.

For example, as described with reference to FIG. 7, when an output image is generated using the two photographed images $P_1$ and $P_2$ including the moving object, when areas in which the moving object appears do not overlap, it is possible to obtain an output image in which the moving object is not conspicuous by setting the constant "g" small.

On the other hand, the degree of causing the pixel values of the pixels in which the moving object appears to affect, the pixel value outputPixel(I',J') of the pixel of interest is increased by setting the constant "g" large. Consequently, it is possible to make the moving object conspicuous in the output image.

Figure 29:
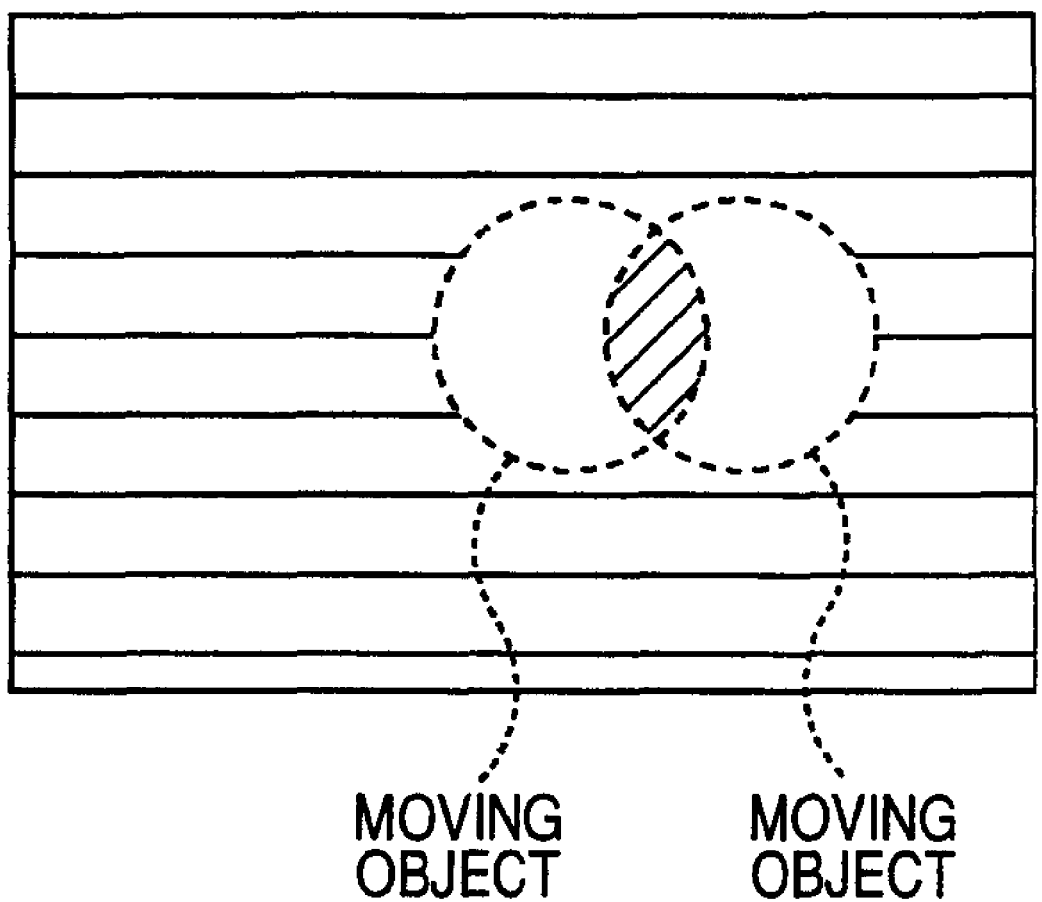
FIG. 29 is a diagram showing an output image in which a lost area is prevented from appearing.

For example, as described with reference to FIG. 8, when an output image is generated using the two photographed images $P_1$ and $P_2$ including the moving object, if areas in which the moving object appears do overlap, it is possible to obtain a natural output image in which the moving object is made conspicuous to prevent a lost area from appearing as shown in FIG. 29 by setting the constant "g" large.

As described above, it is desirable to set the constant "g" to an appropriate value according to a situation.

The image generation processing in step 34 in FIG. 10 for calculating an influence parameter and generating an output image by interpolating G signals, R signals, and B signals as pixel values of output pixels using the influence parameter as described above will be explained with reference to a flowchart in FIG. 30.

First, in step S131, as in step 371 in FIG. 18, the arithmetic circuit 24 selects, with a certain output pixel on the reference coordinate system set as a pixel of interest, a position (I',J') of the pixel of interest as a position of interest (I',J') and proceeds to step 3132.

In step S132, the arithmetic circuit 24 recognizes, for each of the N photographed images, 5×5 pixels around a near pixel, which is a pixel in a position nearest to the position of the pixel of interest, as a determination area and proceeds to step S133.

In step S133, the arithmetic circuit 24 calculates, on the basis of a total value of the pixels in the determination area for each of the N photographed images, the reference value ref and calculates, on the basis of the reference value ref, the influence parameter $\alpha_k$ for each of the N photographed images in accordance with the rule (R5) as described above.

Thereafter, in steps S134 to S141, processing same as that in steps S72 to S79 in FIG. 18 is performed and an output image is obtained. However, in steps S135, S137, and S139, the pixel value outputPixel(I',J') of the pixel of interest is calculated by interpolation performed by using the pixel values of the N photographed images after the positioning, the bilinear function Bilinear(p(k,i,j),q(k,i,j)) as the interpolation function, and the influence parameter $\alpha_k$ in accordance with Equation (17) instead of Equation (11).

As described above, the arithmetic circuit 24 calculates an influence parameter on the basis of the pixel values of the pixels in the influential area among the pixels of the photographed images after the positioning and performs the interpolation using the influence parameter in addition to the pixel values of the pixels of the photographed, images after the positioning and the interpolation function. Consequently, it is possible to, so to speak, appropriately blend the pixel values of the pixels in which the moving object appears of the photographed images and the pixel values of the pixels in which the background appears. As a result, it is possible to obtain a natural output image without a sense of incongruity.

Figure 30:
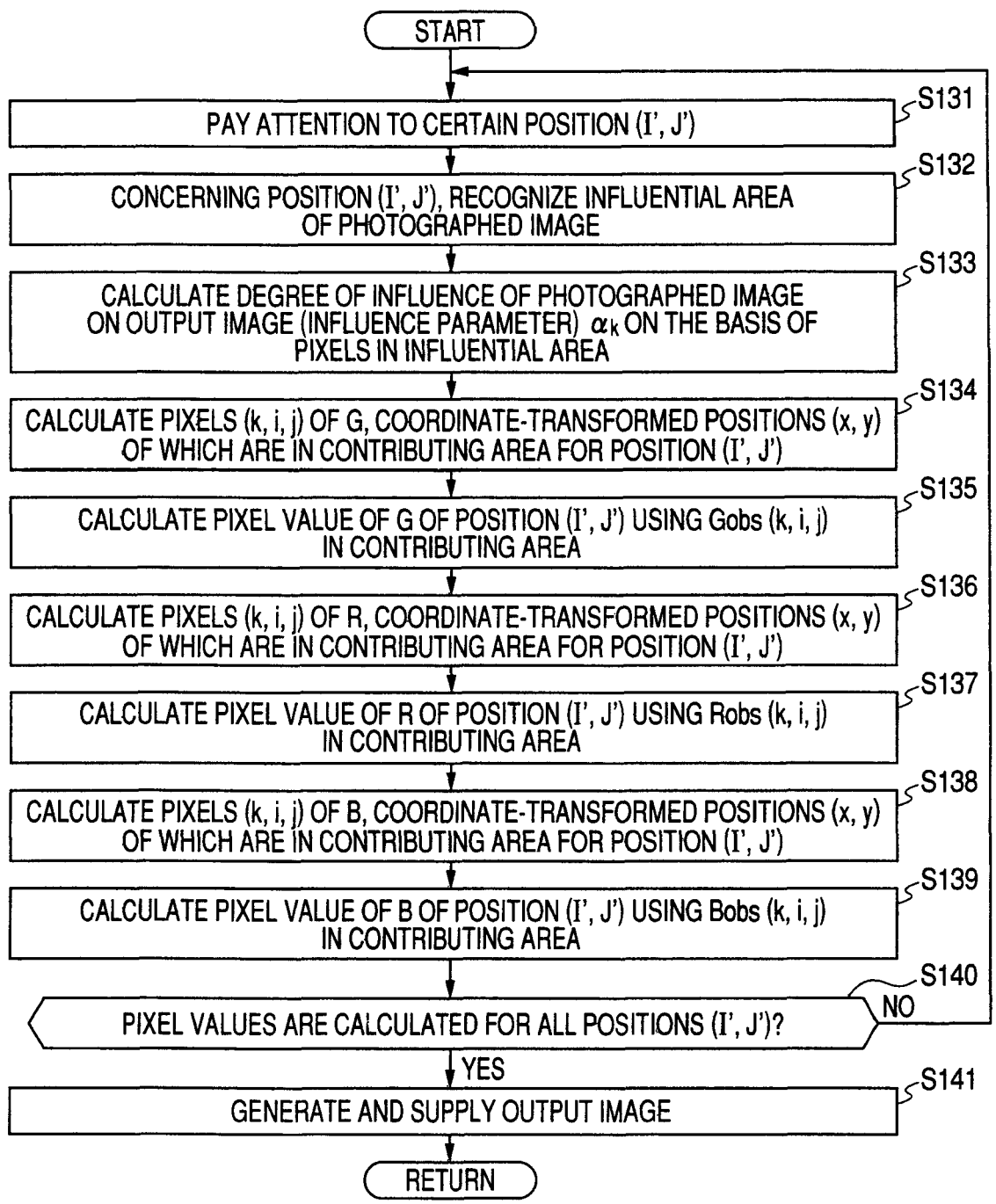
FIG. 30 is a flowchart for explaining image generation processing.

In the image generation processing in FIG. 30, the interpolation of all the output pixels of the output images is performed using the influence parameter $\alpha_k$ calculated in accordance with the rule (R5). Besides, for example, as explained with reference to FIG. 25, it is possible to determine whether an output pixel is the motion pixel, perform interpolation of the output pixel not determined as the motion pixel using the influence parameter $\alpha_k$ in which 1 is set, and perform interpolation of the output pixel determined as the motion pixel using the influence parameter $\alpha_k$ calculated in accordance with the rule (R5).

The arithmetic circuit 24 (FIG. 12) can perform interpolation of the output pixels using both the interpolation function capable of adjusting the high-pass characteristic and the influence parameter $\alpha_k$ described above.

The image generation processing in step S4 in FIG. 10 for generating an output image by interpolating G signals, B signals, and B signals as pixel values of output pixels using, for example, the bilinear function Bilinear(x,y)=Linear(x/scaleX)×Linear(y/scaleY) as the interpolation function capable of adjusting the nigh-pass characteristic by the filter parameters scaleX and scaleY and the influence parameter $\alpha_k$ will be explained with reference to a flowchart in FIG. 31.

First, in step S161, as in step 871 in FIG. 18, the arithmetic circuit 24 selects, with a certain output pixel on the reference coordinate system set as a pixel of interest, a position (I',J') of the pixel or interest as a position of interest (I',J') and proceeds to step S162.

In step S162, as in step S102 in FIG. 25, the arithmetic circuit 24 recognizes, for each of the N photographed images, 5×5 pixels around a near pixel, which is a pixel in a position nearest to the position of the pixel of interest, as a determination area and proceeds to step 3163.

In step S163, as in step S103 in FIG. 25, the arithmetic circuit 24 performs, on the basis of a total value of the pixels in the determination area for each of the N photographed images, motion determination for determining whether the pixel of interest is the motion pixel and proceeds to step S164.

In step S164, as in step S104 in FIG. 25, the arithmetic circuit 24 adjusts, on the basis of a result of the motion determination for the pixel of attention, the filter parameters scaleX and scaleY of the bilinear function Bilinear(x,y)=Linear(x/scaleX)×Linear (y/scaleY) as the interpolation function and proceeds to step S165.

In step 3165, as in step S132 in FIG. 30, the arithmetic circuit 24 recognizes, for each of the R photographed images, 5×5 pixels around a near pixel, which is a pixel in a position nearest to the position of the pixel of interest as an influential area an a proceeds to step S166.

The area of 5×5 pixels around the near pixel in the position nearest to the position of the pixel of interest is adopted as both the determination area and the influenced area. Therefore, it is possible to directly use the determination area obtained in step S162 as the influential area. In this case, it is possible to skip the processing in step S165.

In step S166, as in step S133 in FIG. 30, the arithmetic circuit 24 calculates, on the basis of a total value of the pixels in the determination area for each of the N photographed images, the reference value ref and calculates, on the basis of the reference value ref, the influence parameter $\alpha_k$ for each of the N photographed images in accordance with the rule (R5).

Thereafter, in steps S167 to S174, processing same as that in steps S72 to S79 in FIG. 18 is performed and an output image is obtained. However, in steps S168, S170, and S172, the pixel value outputPixel(I',J') of the pixel of interest is calculated by interpolation performed by using Equation (17) instead of Equation (11), which is interpolation performed by using, as the bilinear function Bilinear(p(k,i,j), q(k,i,j)) as the interpolation function of Equation (17), the bilinear function Bilinear(x,y)=Linear(x/scaleX)×Linear(y/scaleY) capable of adjusting the high-pass characteristic with the filter parameters scaleX and scaleY.

Figure 31:
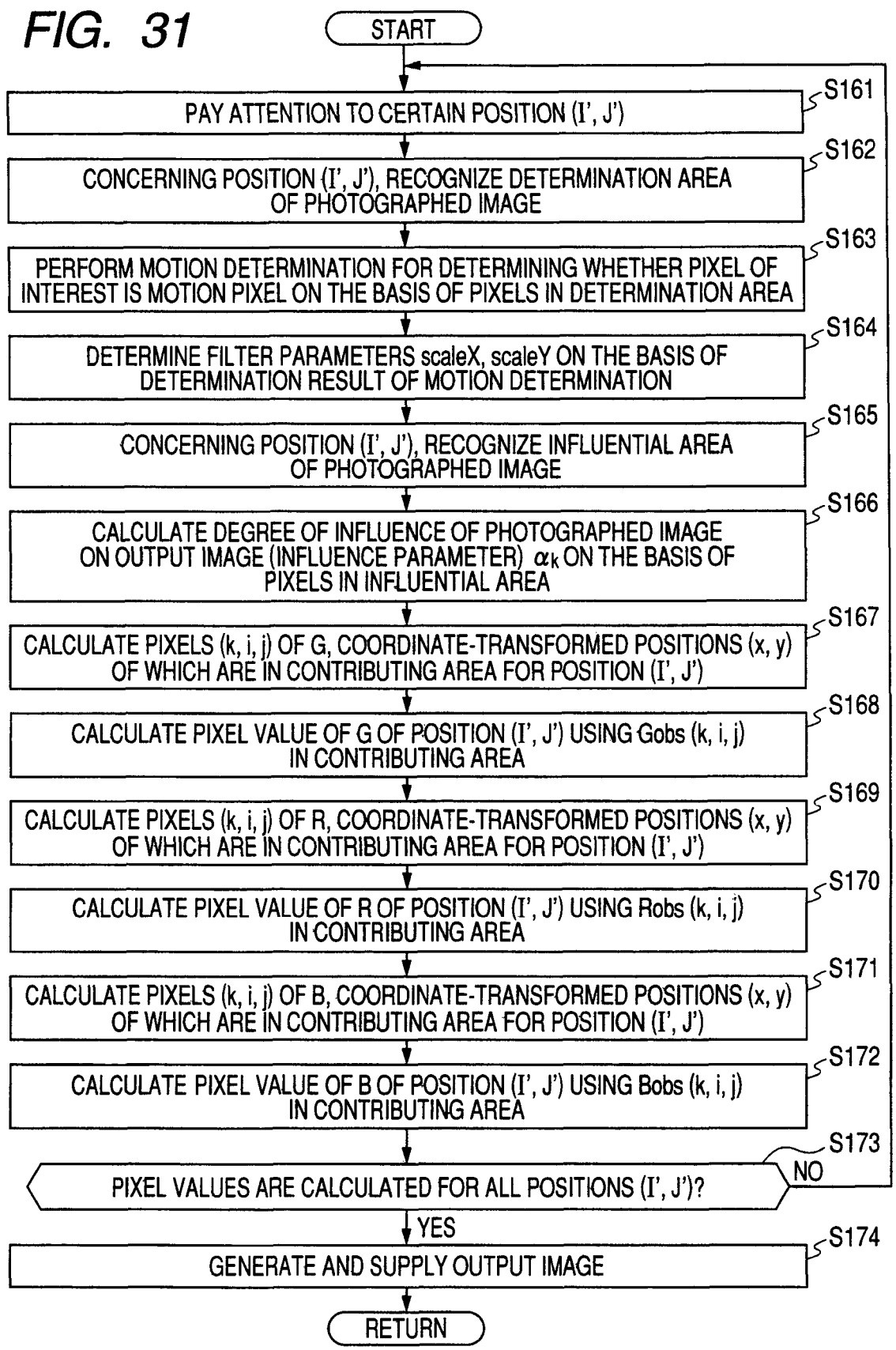
FIG. 31 is a flowchart for explaining the image generation processing.

In the image generation processing in FIG. 31, as in the image generation processing in FIG. 30, the interpolation of all the output pixels of the output images is performed using the influence parameter $\alpha_k$ calculated in accordance with the rule (R5). Besides, for example, it is possible to perform interpolation of the output pixel not determined as the motion pixel using the influence parameter $\alpha_k$ in which 1 is set and perform interpolation of the output pixel determined as the motion pixel using the influence parameter $\alpha_k$ calculated in accordance with the rule (R5).

As described above, by performing the interpolation of the output pixels using the interpolation function capable of adjusting the high-pass characteristic with the filter parameters scaleX and scaleY and the influence parameter $\alpha_k$, it is possible to obtain a natural output image without zipper noise, false colors, and a lost area while maintaining the high-frequency components of the photographed images.

It is possible to perform the series of processing described above using hardware or software. In performing the series of processing using the software, a computer program forming the software is installed in a general-purpose computer or the like.

Figure 32:
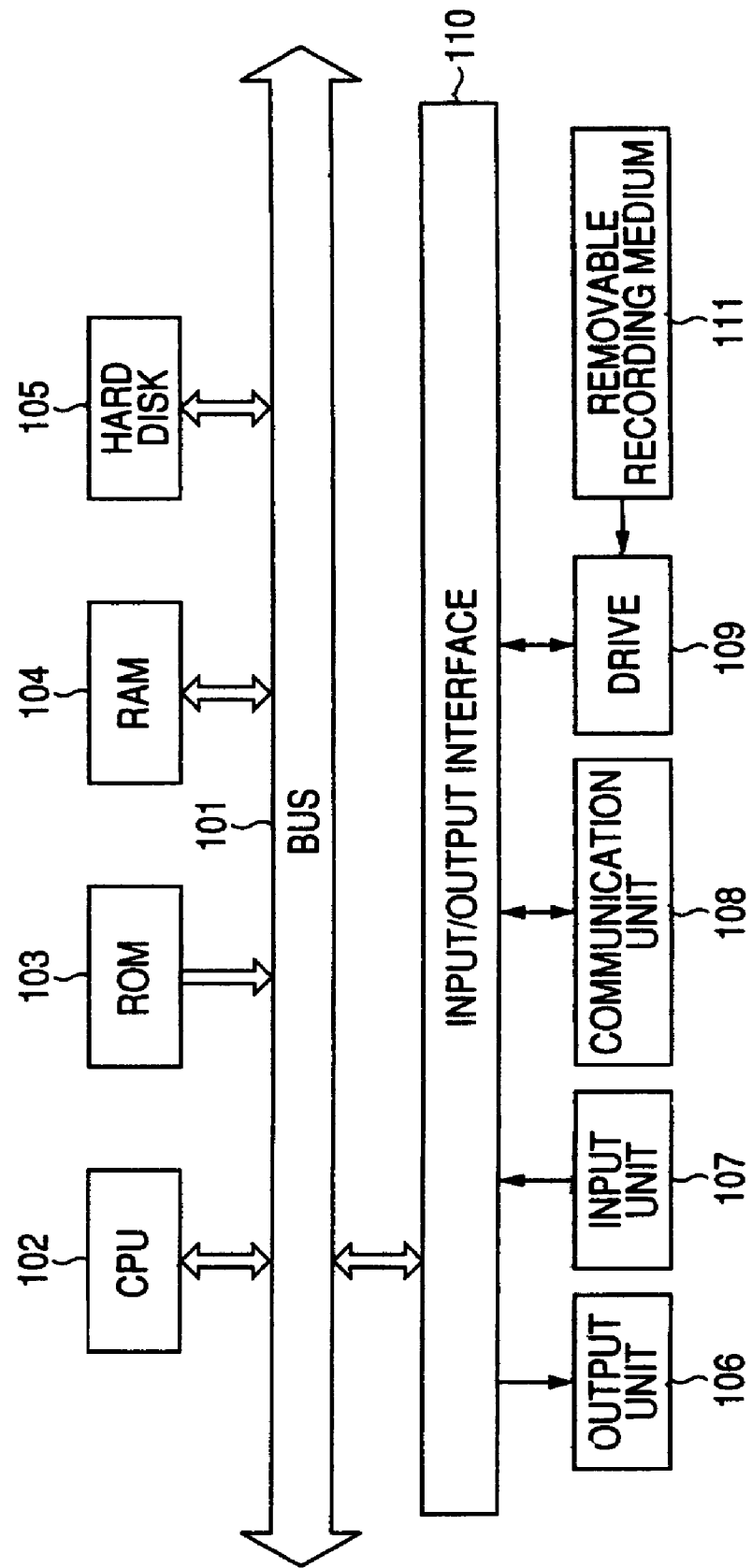
FIG. 32 is a block diagram showing an example of a structure of a computer according to one embodiment of the present invention.

FIG. 32 shows an example of a structure of a computer according to an embodiment of the present, invention in which the computer program for executing the series of processing is installed.

It is possible to record the computer program in a hard disk 105 and a ROM 103, which are recording media built in the computer, in advance.

Alternatively, it is possible to temporarily or permanently store (record) the computer program in a removable recording medium 111 such as a flexible disk, a CD-ROM (Compact Disc Read Only Memory), an MO (Magneto Optical) disk, a DVD (Digital Versatile Disc), a magnetic disk, or a semiconductor memory. It is possible to provide such a removable recording medium 111 as so-called package software.

Other than installing the computer program in the computer from the removable recording medium 111 described above, it is also possible to transfer the computer program from a download site to the computer by radio through an artificial satellite for a digital satellite broadcast or transfer the computer program from the download site to the computer by wire through a network such as a LAN (Local Area Network) or the Internet, The computer can receive the computer program transferred in a communication unit 108 and install the computer program in the hard disk 105 built therein.

The computer has a CPU (Central Processing Unit) 102 built therein. An input/output interface 110 is connected to the CPU 102 through a bus 101. When the user inputs a command by operating an input unit 107 including a keyboard, a mouse, and a microphone through the input/output interface 110, the CPU 102 executes the computer program stored in the ROM (Read Only Memory) 103. Alternatively, the CPU 102 loads the computer program stored in the hard disk 105, the computer program transferred through the satellite or the network, received by the communication unit 108, and installed in the hard disk 105, or the computer program read out from the removable medium 111 inserted in a drive 109 and installed in the hard disk 105 to a RAM (Random Access Memory) 104 and executes the computer program. Consequently, the CPU 102 performs the processing conforming to the flowcharts described above or the processing per formed by the components in the block diagrams described above. For example, the CPU 102 outputs a result of the processing from an output unit 106 including an LCD (Liquid Crystal Display) and a speaker, transmits the result from the communication unit 108, or record the result in the hard disk 105 through the input/output interface 110 when necessary.

In this specification, processing steps describing the computer program for causing the computer to perform various kinds of processing do not always have to be processed in time series according to the order described as the flowcharts. The processing steps also include processing executed in parallel or individually (e.g., parallel processing or processing executed according to an object).

The computer program may be a computer program processed by one computer or may be a computer program distributedly processed by plural computers. Moreover, the computer program may be a computer program transferred to a remote computer and executed.

The present invention applied to the digital still camera has been explained. However, it is also possible to apply the present invention to image processing apparatuses that process images such as a digital video camera other than the digital still camera.

In this embodiment, an output image is generated using the photographed images of the Bayer array. However, it is also possible to generate an output image using photographed images of other color arrays.

In this embodiment, an output image is generated using the photographed images of the Bayer array that has one kind of color signal as a pixel value for one pixel. However, it is also possible to generate an output image using photographed images that have plural kinds of color signals as pixel values for one pixel.

In other words, it is possible to generate an output image according to, for example, interpolation performed by using color signals of kinds identical with color signals to be obtained as pixel values of output pixels of photographed images obtained by 3CCD imaging element that outputs three color signals, an R signal, a G signal, and a B signal, for one pixel.

The arithmetic circuit 24 can calculate the influence parameter $\alpha_k$ in accordance with, for example, a rule (R6) described below instead of the rule (R5), $$\begin{aligned}&\text{if}(\text{req}_k < \text{ref}) \{\\ &\quad \alpha_k = g \times \text{ref}/\text{req}_k \\ &\}\text{else}\{ \\ &\quad \alpha_k = g \times \text{reg}_k / \text{ref} \\ &\}\end{aligned} \quad (R6)$$

According to the rule (R6), when the total value $\text{reg}_k$ of the pixel values in the influential area for the kth image is smaller than the reference value ref, the influence parameter $\alpha_k$ is calculated in accordance with an expression $\alpha_k = g \times \text{ref}/\text{req}_k$. When the total value $\text{reg}_k$ of the pixel values in the influential area for the kth image is not smaller than the reference value ref, the influence parameter $\alpha_k$ is calculated in accordance with an expression $\alpha_k = g \times \text{reg}_k / \text{ref}$.

According to the rule (R5), when the total value $\text{reg}_k$ of the pixel values inputPixel(k,i,j) of the pixels in the influential area of the kth image is significantly different from the reference value ref, the influence parameter $\alpha_k$ is small and, when the total value $\text{reg}_k$ a value same as the reference value ref, the influence parameter $\alpha_k$ is large.

However, according to the rule (R6), when the total value $\text{reg}_k$ of the pixel values inputPixel(k,i,j) of the pixels in the influential area of the kth image is significantly different from the reference value ref, the influence parameter $\alpha_k$ is large and, when the total value $\text{reg}_k$ is a value same as the reference value ref, the influence parameter $\alpha_k$ is small.

Therefore, according to the rule (R6), for example, when a small moving object moving at a certain degree of speed appears in the N photographed images, if an output pixel is a motion pixel in which the moving object appears, a pixel value intensely affected by the moving object is calculated as a pixel value of the output pixel. As a result, it is possible to obtain an output image in which the moving object is conspicuous.

It is particularly useful for, for example, a security monitoring system that highlights a suspicious person or vehicle as a moving object, photographed by a monitor camera to obtain the output image in which the moving object is conspicuous.

Embodiments of the present invention are not limited to the embodiment described above. Various modifications of the embodiment are possible without departing from the spirit of the present invention.

It should be understood by those skilled in the art that various modifications, combinations, sub-combinations, and alterations may occur depending on design requirements and other factors insofar as they are within the scope of the appended claims or the equivalents thereof.

What is claimed is:

1. An image processing apparatus that generates one output image from plural input images, the image processing apparatus comprising:
    detecting means for detecting a positional relation among the plural input images photographed by imaging means for photographing an image;
    pixel-value calculating means for calculating a pixel value of a pixel of the output image using pixel values of pixels of the input images and an interpolation function that changes according to positions of the pixels of the input images after positioning obtained by performing positioning of the plural input images on the basis of the positional relation;
    determining means for determining whether the pixel of the output image is a motion pixel that is a pixel in an area in which a moving subject appears; and
    adjusting means for adjusting a high-pass characteristic of the interpolation function on the basis of a result of the determination on whether the pixel of the output image is a motion pixel.

2. An image processing apparatus according to claim 1, wherein the determining means determines, with a near area in a range near from a position of the pixel of the output image in the input images after the positioning set as a determination area used for determining whether the pixel of the output image is the motion pixel, whether the pixel of the output image is the motion pixel on the basis of pixel values of pixels in the determination area among the pixels of the input images after the positioning.

3. An image processing apparatus according to claim 1, further comprising influence-parameter calculating means for calculating, with a near area in a range near from a position of the pixel of the output image in the input images after the positioning set as an influential area used for calculating an influence parameter indicating a degree of an influence of the pixel values of the pixels of the input images after the positioning on the pixel value of the pixel of the output image, the influence parameter on the basis of pixels values of pixels in the influential area among the pixels of the input images after the positioning, wherein
    the pixel-value calculating means calculates the pixel value of the pixel of the output image using the pixel values of the pixels of the input images, the interpolation function, and the influence parameter.

4. An image processing method of generating one output image from plural input images, the image processing method comprising the steps of:
    detecting a positional relation among the plural input images photographed by imaging means for photographing an image;
    calculating a pixel value of a pixel of the output image using pixel values of pixels of the input images and an interpolation function that changes according to positions of the pixels of the input images after positioning obtained by performing positioning of the plural input images on the basis of the positional relation;
    determining whether the pixel of the output image is a motion pixel that is a pixel in an area in which a moving subject appears; and
    adjusting a high-pass characteristic of the interpolation function on the basis of a result of the determination on whether the pixel of the output image is a motion pixel.

5. A non-transitory computer-readable medium encoded with a computer program loadable into a memory of a computer, the computer program causing the computer to execute an image processing for generating an output image from plural input images, the image processing comprising:
    a step of detecting a positional relation among the plural input images photographed by imaging means for photographing an image;
    a step of calculating a pixel value of a pixel of the output image using pixel values of pixels of the input images and an interpolation function that changes according to positions of the pixels of the input images after positioning obtained by performing positioning of the plural input images on the basis of the positional relation;
    a step of determining whether the pixel of the output image is a motion pixel that is a pixel in an area in which a moving subject appears; and
    a step of adjusting a high-pass characteristic of the interpolation function on the basis of a result of the determination on whether the pixel of the output image is a motion pixel.

6. An image processing apparatus that generates one output image from plural input images, the image processing apparatus comprising:
    detecting means for detecting a positional relation among the plural input images photographed by imaging means for photographing an image;
    pixel-value calculating means for calculating a pixel value of a pixel of the output image using pixel values of pixels of the input images, an interpolation function that changes according to positions of the pixels of the input images after positioning obtained by performing positioning of the plural input images on the basis of the positional relation, and an influence parameter indicating a degree of an influence of the pixel values of the pixels of the input images after the positioning on the pixel value of the pixel of the output image; and
    influence-parameter calculating means for calculating, with a near area in a range near from a position of the pixel of the output image in the input images after the positioning set as an influential area used for calculating the influence parameter, the influence parameter on the basis of pixels values of pixels in the influential area among the pixels of the input images after the positioning.

7. An image processing method of generating one output image from plural input images, the image processing method comprising the steps of:
    detecting a positional relation among the plural input images photographed by imaging means for photographing an image;
    calculating a pixel value of a pixel of the output image using pixel values of pixels of the input images, an interpolation function that changes according to positions of the pixels of the input images after positioning obtained by performing positioning of the plural input images on the basis of the positional relation, and an influence parameter indicating a degree of an influence of the pixel values of the pixels of the input images after the positioning on the pixel value of the pixel of the output image; and calculating, with a near area in a range near from a position of the pixel of the output image in the input images after the positioning set as an influential area used for calculating the influence parameter, the influence parameter on the basis of pixels values of pixels in the influential area among the pixels of the input images after the positioning.

8. A non-transitory computer-readable medium encoded with a computer program loadable into a memory of a computer, the computer program causing the computer to execute an image processing for generating an output image from plural input images, the image processing comprising:

a step of detecting a positional relation among the plural input images photographed by imaging means for photographing an image;

a step of calculating a pixel value of a pixel of the output image using pixel values of pixels of the input images, an interpolation function that changes according to positions of the pixels of the input images after positioning obtained by performing positioning of the plural input images on the basis of the positional relation, and an influence parameter indicating a degree of an influence of the pixel values of the pixels of the input images after the positioning on the pixel value of the pixel of the output image; and a step of calculating, with a near area in a range near from a position of the pixel of the output image in the input images after the positioning set as an influential area used for calculating the influence parameter, the influence parameter on the basis of pixels values of pixels in the influential area among the pixels of the input images after the positioning.

9. An image processing apparatus that generates one output image from plural input images, the image processing apparatus comprising:

a detecting unit detecting a positional relation among the plural input images photographed by imaging means for photographing an image;

a pixel-value calculating unit calculating a pixel value of a pixel of the output image using pixel values of pixels of the input images and an interpolation function that changes according to positions of the pixels of the input images after positioning obtained by performing positioning of the plural input images on the basis of the positional relation;

a determining unit determining whether the pixel of the output image is a motion pixel that is a pixel in an area in which a moving subject appears; and an adjusting unit adjusting a high-pass characteristic of the interpolation function on the basis of a result of the determination on whether the pixel of the output image is a motion pixel.

10. An image processing apparatus that generates one output image from plural input images, the image processing apparatus comprising:

a detecting unit detecting a positional relation among the plural input images photographed by imaging means for photographing an image;

a pixel-value calculating unit calculating a pixel value of a pixel of the output image using pixel values of pixels of the input images, an interpolation function that changes according to positions of the pixels of the input images after positioning obtained by performing positioning of the plural input images on the basis of the positional relation, and an influence parameter indicating a degree of an influence of the pixel values of the pixels of the input images after the positioning on the pixel value of the pixel of the output image; and an influence-parameter calculating unit calculating, with a near area in a range near from a position of the pixel of the output image in the input images after the positioning set as an influential area used for calculating the influence parameter, the influence parameter on the basis of pixels values of pixels in the influential area among the pixels of the input images after the positioning.

* * * * *